United States Patent
Doyle

(10) Patent No.: US 10,467,122 B1
(45) Date of Patent: Nov. 5, 2019

(54) METHODS, SYSTEMS, AND COMPUTER PROGRAM PRODUCT FOR CAPTURING AND CLASSIFICATION OF REAL-TIME DATA AND PERFORMING POST-CLASSIFICATION TASKS

(71) Applicant: INTUIT INC., Mountain View, CA (US)

(72) Inventor: Timothy B. Doyle, Dallas, TX (US)

(73) Assignee: INTUIT INC., Mountain View, CA (US)

( * ) Notice: Subject to any disclaimer, the term of this patent is extended or adjusted under 35 U.S.C. 154(b) by 162 days.

(21) Appl. No.: 15/499,305

(22) Filed: Apr. 27, 2017

(51) Int. Cl.
  G06F 9/44 (2018.01)
  G06F 11/36 (2006.01)

(52) U.S. Cl.
  CPC ...... G06F 11/3612 (2013.01); G06F 11/3672 (2013.01)

(58) Field of Classification Search
  CPC .......... G06F 8/71; G06F 9/44505; G06F 8/20; G06F 8/61; G06F 8/36
  USPC ........................................................ 717/121
  See application file for complete search history.

(56) References Cited

U.S. PATENT DOCUMENTS

| | | | |
|---|---|---|---|
| 6,094,652 A | 7/2000 | Faisal | |
| 6,360,227 B1 | 3/2002 | Aggarwal | |
| 6,766,316 B2 | 7/2004 | Caudill | |
| 7,603,348 B2 | 10/2009 | He | |
| 8,560,539 B1 | 10/2013 | Engebretsen | |
| 9,182,952 B2 | 11/2015 | Qi | |
| 9,201,778 B2 | 12/2015 | Northcutt | |
| 9,288,285 B2 | 3/2016 | Li | |
| 9,292,797 B2 | 3/2016 | He | |
| 9,569,110 B2 | 2/2017 | Dolph | |
| 9,619,165 B1 | 4/2017 | Shelton | |
| 9,710,377 B1 | 7/2017 | Kuznnin | |
| 2004/0260677 A1 | 12/2004 | Malpani | |
| 2006/0005172 A1 | 1/2006 | Fuchs | |
| 2006/0143175 A1 | 6/2006 | Ukrainczyk | |
| 2008/0010629 A1 | 1/2008 | Berg | |
| 2008/0183685 A1 | 7/2008 | He | |
| 2010/0030734 A1 | 2/2010 | Chunilal | |
| 2010/0174670 A1 | 7/2010 | Malik | |

(Continued)

OTHER PUBLICATIONS

U.S. Appl. No. 15/498,929 filed Apr. 27, 2017.

(Continued)

*Primary Examiner* — Chuck O Kendall
(74) *Attorney, Agent, or Firm* — DLA PIPER LLP US

(57) ABSTRACT

Disclosed are techniques for capturing and classification of digital data and providing recommendations in real-time or nearly real-time. These techniques identify a plurality of agent computing or communication devices in communication with a server and identify a plurality of communications between the plurality of agent computing or communication devices and a plurality of user communication or computing devices of a plurality of users into real-time service data. One or more actions are determined for a communication of the plurality of communications based in part or in whole upon at least one communication class into which the communication is classified. One or more post-classification tasks are performed based in part or in whole upon the one or more actions determined at the recommendation module.

20 Claims, 48 Drawing Sheets

(56) References Cited

U.S. PATENT DOCUMENTS

| | | |
|---|---|---|
| 2010/0241673 A1 | 9/2010 | Wu |
| 2011/0286584 A1* | 11/2011 | Angel ............... H04M 3/42221 379/88.02 |
| 2012/0166366 A1 | 6/2012 | Zhou |
| 2012/0209858 A1 | 8/2012 | Lamba |
| 2012/0278788 A1 | 11/2012 | Crapo |
| 2014/0317105 A1 | 10/2014 | Jain |
| 2015/0066594 A1 | 3/2015 | Li |
| 2015/0347620 A1 | 12/2015 | Cai |
| 2016/0306898 A1 | 10/2016 | Yoo |
| 2017/0011289 A1 | 1/2017 | Gao |
| 2017/0063881 A1 | 3/2017 | Doganata |
| 2017/0076451 A1 | 3/2017 | Pauly |
| 2017/0099675 A1 | 4/2017 | Gineste |
| 2017/0109358 A1 | 4/2017 | Dhara |
| 2017/0228361 A1 | 8/2017 | Zhang |

OTHER PUBLICATIONS

U.S. Appl. No. 15/499,048 filed Apr. 27, 2017.
U.S. Appl. No. 15/499,148 filed Apr. 27, 2017.
Kennedy, Lyndon S., et al., "Automatic Discovery of Query-Class-Dependent Models for Multimodal Search", MM '05, Singapore, Nov. 6-11, 2005, pp. 882-891.
Zamani, Flamed, et al., "Estimating Embedding Vectors for Queries", ICTIR '16, Newark, DE, Sep. 12-16, 2016, pp. 123-132.
Rose, Lovelyn, et al., "Normalized Web Distance Based Web Query Classification", Journal of Computer Science, vol. 8, Issue 5, 2012, pp. 804-808.
Hu, Jian, et al., "Understanding User's Query Intent with Wikipedia", VVVVW 2009, Madrid, Spain, Apr. 20-24, 2009, pp. 471-480.
Li, Lin, et al., "A feature-free search query classification approach using semantic distance", Expert Systems with Applications, vol. 39, 2012, pp. 10739-10748.
"Canonicalization", Wikipedia, downloaded from: https://en.wikipedia.org/wiki/Canonicalization on Jun. 5, 2019, pp. 1-3.
Microsoft Computer Dictionary, 5th Edition, Microsoft Press, Redmond, WA, 2002, pp. 269-270.
Kosina et al., Very Fast Decision Rules for multi-class problems, 2012, 6 pages.
Lakkaraju et al., Interpretable Decision Sets: A Joint Framework for Description and Prediction, 2016, 10 pages.

* cited by examiner

600E

| Class ID | Hier. | Associated Information | Link(s) to Rule(s) |
|---|---|---|---|
| Shop/Buy | 1 | Buy, bought, bough, purchas, purchase, etc. | ID1 |
| Eval/Trial | 2 | Eval, evaluation, demo, | &ID21 |
| Seminar | 2 | Seminar, semina, webinar, webina, etc. | &ID22 |
| Renewal | 2 | Renew, license, licens, etc. | &ID23 |
| Auto Renew | 3 | ... | &ID31 |
| Price/Inquiry | 3 | ... | &ID32 |
| Discount | 3 | ... | &ID33 |
| E-Signature | 3 | ... | &ID34 |
| Other | 3 | ... | &ID35 |
| Order Status | 2 | ... | &ID24 |
| Accnt Maint. | 2 | ... | &ID25 |
| Update Accnt Name | 3 | ... | ... |
| Update Address | 3 | ... | ... |
| Update Payment | 3 | ... | ... |
| ... | ... | ... | ... |

FIG. 6E

| # | Primary Access | # | Contrib. | # | Voting Records | # | Misc. Data |
|---|---|---|---|---|---|---|---|
| 71 | Searches | 2 | Article Feedback | 119 | Votes Up | 409 | Emails |
| 42 | Views | 8 | Missing Content | 11 | Votes Down | 532 | Favorites Added |
| 82 | Views / Search | 4 | Engine Feedback | 130 | Total Votes | 279 | Favorites Classified |
| ... | ... | ... | ... | ... | ... | ... | ... |

1002B SUMMARY OF ACTIVITY

| Co. | Search | Views | Votes Up | Votes Down | Emails | Fav. Add. | Fav. Class. |
|---|---|---|---|---|---|---|---|
| A | 379 | 270 | 4 | 7 | 6 | 54 | 14 |
| B | 1,185 | 1,084 | 1 | 0 | 172 | 106 | 39 |
| C | 2,595 | 2,079 | 46 | 0 | 112 | 178 | 71 |
| D | 338 | 193 | 0 | 0 | 20 | 16 | 11 |
| E | 1,365 | 1,143 | 68 | 4 | 99 | 177 | 144 |
| ... | ... | ... | ... | ... | ... | ... | ... |

1004B ACTIVITY BY COMPANY

FIG. 10C

- Account Name
- 11/18/16 13:33:54 CST John Doe (jdoe) searched on "standalone inviting users in proseries" [C= Tracy Manilla, Co=ABC Corp., L=Mountain View, S=One Experience, P = Proseries]
- 11/18/16 13:33:52 CST Mary Smith (msmith) searched on "HOW22842 – Sign up for ProSeries DPP (Deferred Payment Plan)" [C= Dina Goo, XYZ Corp., L=Tucson, S = Service, P = Proseries]
- 11/18/16 13:33:51 CST John Aspen (jaspen) searched on "family estate" [C= Jane Austin, AXY Corp., L=Paris, S = Tax, P=Lacerte]
- 11/18/16 13:33:48 CST Adam Smith (asmith) searched on "clean uninstall of ProFile" [C= The Boss, 123 Corp., L=Tokyo, S = Service, P = profile-Japanese] GLOBAL OTHER
- EWS Found Connected Services
- 11/18/16 13:33:47 CST George Washington (gwashington) searched on "standalone inviting users in Proseries" [C= Tom John, Co=EFG Corp., L=Beijing, S=One Experience, P = Proseries] GLOBAL OTHER 1002D
- . . .

1000D REAL-TIME SERVICE DATA

METHODS, SYSTEMS, AND COMPUTER PROGRAM PRODUCT FOR CAPTURING AND CLASSIFICATION OF REAL-TIME DATA AND PERFORMING POST-CLASSIFICATION TASKS

CROSS-REFERENCE TO RELATED APPLICATIONS

The present application is related to U.S. patent application Ser. No. 15/498,929, filed Apr. 27, 2017 entitled "METHODS, SYSTEMS, AND COMPUTER PROGRAM PRODUCT FOR IMPLEMENTING REAL-TIME OR NEAR REAL-TIME CLASSIFICATION AND RECOMMENDATIONS", U.S. patent application Ser. No. 15/499,048, filed Apr. 27, 2017 entitled "METHODS, SYSTEMS, AND COMPUTER PROGRAM PRODUCT FOR IMPLEMENTING REAL-TIME OR NEAR REAL-TIME CLASSIFICATION OF DIGITAL DATA", and U.S. patent application Ser. No. 15/499,148, filed Apr. 27, 2017 entitled "METHODS, SYSTEMS, AND COMPUTER PROGRAM PRODUCT FOR AUTOMATIC GENERATION OF SOFTWARE APPLICATION CODE". The contents of the aforementioned patent applications are hereby expressly incorporated by references in their entireties for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Users of stand-alone or hosted software programs often encounter issues in installation, configuration, or execution of the software programs. With the advent of software as a service (SaaS) and subscription-based software delivery models, users may further have additional issues with, for example, subscription, accounts, renewal, etc. Conventional approaches address these issues with statically coded responses such as online or offline documentation or help files that often fall short of answering the exact issues or inquiries that hamper the users' experiences with or uses of the software applications.

These conventional approaches fall short due to many reasons such as a variety and often unpredicted ways of expressing or describing even the same inquiry from various users. For example, different users may use different vocabularies or different expressions (e.g., complete sentences, incomplete sentences, phrases, colloquialism, slangs, one or more words, etc.) in free text or natural language to describe an inquiry. Such a variety of expressions and vocabularies render these conventional, statically coded software help systems inadequate at best and often difficult, if not entirely impossible, to replace live support personnel in responding to users' inquiries.

Moreover, statically coded support engineering systems not only have difficulties in understanding and hence addressing users' inquiries but also in providing adequate or accurate recommendations to respond to the users' inquiries due to their limited coverage of a great variety of possible ways of expressing these inquiries. In addition, even dynamically coded support engineering systems have difficulties in understanding terms that are not covered by or contained in the existing data sets. As a result, conventional approaches, even deployed to replace live support personnel, often fail to provide satisfactory user experiences and leave much to be desired in terms of accuracy and hence usefulness.

Data classification and data clustering have been employed to a data set using variables and their known values in predicting (e.g., data classification) and describing (e.g., data clustering) data for various purposes. Conventional data classification and data clustering techniques seeking better accuracy in the description and prediction of data often employ iterative processes driven by complex classifier or clustering algorithms.

These conventional data classification and clustering techniques often attain better accuracy at the expense of speed and computational resource utilization. These conventional data classification and clustering techniques are often performed in a batch process that is run overnight due to the complexities of the computation involved. Other data classification and clustering techniques trade accuracy for speed and resource utilization and often fall short on the accuracy of their results of description and prediction and hence the usefulness of these convention approaches.

In both approaches, the encounter with terms that are not covered by or contained in the data sets upon which the classification or clustering engines are built often result in the result of no classification or no cluster. Such terms may only be captured after the classification or clustering engines are adjusted to accommodate such new terms. Nonetheless, such adjustments may require modification to the source code, re-compilation of the source code, etc. before the modified classification or clustering engines may be placed in service. Any attempts to deploy such modified engines to the Web often demands much manual effort to convert the code into interpreted runtime language. To further exacerbate these problems, the aforementioned deficiencies of these conventional classification and clustering approaches not only negatively affect the classification or clustering of data but also impede any subsequent actions that rely on the results of classification or clustering.

Therefore, there exists a need for a method, system, and computer program product for classifying digital data using real-time computing techniques to address at least the aforementioned shortcomings of conventional approaches.

SUMMARY

Disclosed are methods for classifying data and providing recommendations in a user interface in some embodiments. These techniques identify or generate a data model that receives and classifies an inquiry into at least one class in real-time or nearly real-time. One or more actions may be determined based at least in part on the at least one class and presented in a user interface to a user who first submitted the inquiry.

In some of these embodiments, the data model may be transformed into a transformed data model, wherein the transformed data model is installed on the user computing or communication device or on a remote computing system, and the data model is configured in the first programming language, and the transformed data model is transformed from the first programming language into a second programming language.

In addition or in the alternative, the inquiry or information therefor may be transmitted to the transformed data model, and a determination may be made to decide whether the inquiry can be classified into at least one recognized class. In some embodiments, the one or more classes may be determined based at least in part on the inquiry at the transformed data model when it is determined that the inquiry can be classified into the at least one recognized class.

In some embodiments where it is determined that the inquiry cannot be classified into the at least one recognized class, a first link between the inquiry and the one or more classes may be determined; a first custom question that seeks a first additional input from the user may be formulated with at least the first link or information therefor; and the first custom question may be presented in the user interface of the user computing or communication device to the user.

In addition or in the alternative, the first additional input may be received from the user via the user interface of the user computing or communication device; and a determination may be made to decide whether the inquiry can be classified into the at least one recognized class with the first additional input at the transformed data model.

In some of these embodiments where it is determined that the inquiry can be classified into the at least one recognized class with the first additional input, classifying the inquiry into the one or more classes with at least the first additional input. In some embodiments where it is determined that the inquiry cannot be classified into the at least one recognized class with the first additional input, one or more second links between the inquiry and the one or more classes may be iteratively determined all at once or in separate instances; a second custom question that seeks a second additional input from the user may be formulated with at least one of the one or more second links or information therefor; and the second custom question may be presented in the user interface of the user computing or communication device to the user.

In some embodiments, the second additional input from the user may be received via the user interface of the user computing or communication device; and a determination may be made to decide whether the inquiry can be classified into the at least one recognized class with at least the second additional input at the transformed data model.

In some of these embodiments, the one or more classes may be determined for the inquiry with at least the second additional input at the transformed data model; a plurality of terms, tokens, patterns, or relations may be determined for the inquiry; and the one or more classes may be determined at least by hierarchically applying a plurality of checks to the plurality of terms, tokens, patterns, or relations for the inquiry. In addition or in the alternative, the one or more classes may be ranked into one or more ranked classes; and a final class may be optionally determined from the one or more classes or from the one or more ranked classes for the inquiry.

In some embodiments, a determination may be made to decide whether one or more actions can be determined for the one or more classes or for a final class identified from the one or more classes or the one or more ranked classes. In some of these embodiments where when the one or more actions cannot be determined for the one or more classes or for the final class, the one or more actions may be determined or identified with term embedding techniques or one or more hierarchical data structures. In some embodiments where the one or more actions cannot be determined for the one or more classes or for the final class, a first action link between the one or more actions and the one or more classes may be iteratively determined; a third custom question that seeks a third additional input from the user may be formulated with at least the first action link or information therefor; and the third custom question may be presented in the user interface of the user computing or communication device to the user.

In addition or in the alternative, the third additional input may be received from the user via the user interface of the user computing or communication device; a determination may be made to decide whether the one or more actions can be determined for the one or more classes or for the final class with the third additional input; the one or more actions may be identified or determined for the one or more classes or for the final class with at least the third additional input; and the one or more actions may be optionally into one or more ranked actions.

Some embodiments are directed to methods for classifying inquiries in real-time or nearly real-time. These techniques identify or generate a data model that receives and determine one or more classes for the inquiry in real-time or nearly real-time at least by applying a hierarchical set of rules in the data model to the inquiry. A hierarchical class data structure at least by storing and indexing the one or more classes based in part or in whole upon a hierarchical structure of the one or more classes in a non-transitory computer memory.

In some of these embodiments, a data set comprising a plurality of inquiries may be identified; the plurality of inquiries may be normalized into a plurality of normalized inquiries; and the plurality of normalized inquiries in the data set may be transformed into a plurality of inquiry vectors in a vector space at least by applying a term embedding process to the plurality of normalized inquiries.

In addition or in the alternative, the plurality of inquiries may be classified into a plurality of classes at least by grouping the plurality of inquiry vectors in the vector space based in part or in whole upon vector distances among the plurality of inquiry vectors; and the plurality of classes may be stored in a hierarchical class data structure at least by referencing parent-child relations among the plurality of classes in the hierarchical class data structure.

In some of the aforementioned embodiments, a set of rules that is arranged in a hierarchical rule data structure that corresponds to a plurality of classes in the hierarchical class data structure may be identified; the inquiry from the user computing or communication device may be received at the data model; and the inquiry may be normalized into a normalized inquiry based in part or in whole upon a plurality of tokens or terms in the inquiry, one or more variants or equivalents of the plurality of tokens or terms, or syntactical requirements.

In some embodiments, a hierarchy traversing module may be identified for the hierarchical set of rules; an indexing data structure may also be identified for the hierarchical set of rules or a hierarchical set of classes; and a determination may be made to decide whether the inquiry satisfies one or more rules in the hierarchical set of rules using at least the traversing scheme and the indexing data structure. In some of these embodiments where it is determined that the inquiry does not satisfy the one or more rules in the hierarchical set of rules, a no-classification process may be performed for the inquiry.

In some embodiments where it is determined that the inquiry satisfies the one or more rules in the hierarchical set of rules, the one or more rules may be identified from the hierarchical set of rules and one or more rule hierarchies at which the one or more rules are located in the hierarchical set of rules; one or more parent hierarchies or one or more child hierarchies of the one or more rule hierarchies may be identified from the hierarchical set of rules; and one or more parent rules or one or more child rules associated with the one or more parent hierarchies or one or more child hierarchies may also be identified from the hierarchical set of rules. In some of these embodiments, a determination may be made to decide whether the inquiry satisfied the one or more parent rules or one or more child rules to the inquiry.

In addition or in the alternative, a lowest hierarchy may be determined from the one or more rule child hierarchies or the rule hierarchy based in part or in whole upon a specific child rule in the one or more child rules, the specific child rule satisfied by the inquiry and corresponding to the lowest hierarchy in the hierarchical set of rules. In some of these embodiments, a specific class that corresponds to the lowest hierarchy of the specific child rule may be identified from the hierarchical class data structure; and the inquiry may be classified into the specific class.

Some embodiments are directed to methods for automatic generation of software application code. These techniques identify or generate a data model in a first programming language. At least one rule is identified or generated from the data model. This at least one rule is tokenized into a plurality of subparts based at least in part upon a second programming language. A rule hierarchy at which the plurality of sub-parts is located is determined based in part or in whole upon a corresponding class hierarchy of a class with which the at least one rule is associated. A transformed data model is generated in the second programming language using at least the plurality of sub-parts and the rule hierarchy.

In some of these embodiments, a decision logic block or one or more patterns in the data model for the class may be transformed into the at least one rule. In addition or in the alternative, the second programming language, a second platform, or a second environment may be identified into the second programming language; and one or more data model attributes may be determined for the second programming language.

In some embodiments, one or more decision logic blocks or one or more patterns in the data model may be identified and transformed into a hierarchical set of rules; and the data model may be transformed into a rule-based data model based in part or in whole upon the hierarchical set of rules. In addition or in the alternative, a plurality of classes comprising one or more parent classes and one or more child classes in the data model or in the transformed data model may be identified; and the class may be identified from the plurality of classes and the corresponding class hierarchy at which the class is located in a hierarchical class data structure.

In addition or in the alternative, a set of terms or tokens that represents at least one pattern upon which at least one decision logic block is predicated may be determined for the class; a hierarchical rule data structure may be identified or generated for storage of rules; and the at least one rule in the hierarchical set of rules or at least one decision logic block associated with the class may be processed at least by splitting on one or more first characters and looping through non-blank terms or tokens of the set of terms or tokens.

In some of these embodiments, a rematch may be performed for at least one non-blank item with respect to one or more types of characters; and the at least one non-blank item may be added as the at least one rule into the hierarchical rule data structure. In addition or in the alternative, the at least one rule may be converted or transformed into a plurality of sub-parts based in part or in whole upon syntactical requirements of the second programming language; and the plurality of sub-parts may be joined based in part or in whole upon the syntactical requirements of the second programming language.

In some embodiments, the rule hierarchy may be determined for the at least one rule at least by looping through one or more child hierarchies of the corresponding class hierarchy; and the hierarchical class data structure may be generated based at least in part upon frequencies of terms or word or term embedding processing. In addition or in the alternative, the transformed data model may be generated in the second programming language by using at least the plurality of sub-parts and the one or more data model attributes for the second programming language.

Some embodiments are directed to methods for capturing and classification of digital data and providing recommendations in real-time or nearly real-time. These techniques identify a plurality of agent computing or communication devices in communication with a server and identify a plurality of communications between the plurality of agent computing or communication devices and a plurality of user communication or computing devices of a plurality of users into real-time service data. One or more actions are determined for a communication of the plurality of communications based in part or in whole upon at least one communication class into which the communication is classified. One or more post-classification tasks are performed based in part or in whole upon the one or more actions determined at the recommendation module.

In some of these embodiments, types and capabilities of a plurality of user agents on a plurality of user computing or communication devices may be determined. In addition or in the alternative, a plurality of agent computing or communication devices in communication with the server may be identified; an agent computing or communication device may be identified from the plurality of agent computing or communication devices; one or more first sessions between the agent computing or communication device and the server may be identified; and one or more second sessions between the agent computing or communication device and one or more user computing or communication devices may also be identified.

In addition or in the alternative, communications between the agent computing or communication device and the one or more user computing or communication devices may be captured at a listening module; information about an activity initiated from the agent computing or communication device and directed toward the server may be captured; and the communications or the information about the activity may be stored as the real-time service data.

In some embodiments, data reduction filtering may be performed on the real-time service data to transform the real-time service data into reduced real-time service data. In addition or in the alternative, one or more analytics tasks that comprise a web analytics task, a software analytics task, a digital analytics task, or a data mining task on the reduced real-time service data or the filtered real-time service data may be performed; and one or more reports may be generated based in part or in whole upon the reduced real-time service data or the filtered real-time service data.

In some of these embodiments, collaborative filtering may be performed on the real-time service data or the reduced real-time service data to transform the real-time service data or the reduced real-time service data into filtered real-time service data. In addition or in the alternative, the plurality of users may be classified into a plurality of user classes; respective sets of information or respective sets of actions for the plurality of user classes may be identified; one or more user classes may be identified or determined for a user of the plurality of users and one or more communications involving the user; and one or more actions may be predicted or infer for the user based in part or in whole upon the one or more classes of the user, the respective sets of information, or the respective sets of actions for the plurality of user classes.

In some embodiments, one or more recommendations provided by an agent computing or communication device to the user may be identified; and deviation between the one or more actions and the one or more recommendations may be determined. In some embodiments, the deviation may be presented in a user interface of the agent computing or communication device in a communication channel transparent to the user; or a communication session between the user computing or communication device and the agent computing or communication devices may be intervened with information about the deviation.

Some embodiments are directed at one or more hardware modules that include and/or function in conjunction with at least one micro-processor as well as other related components or architectures of one or more computing systems and may be invoked to perform any of the methods, processes, or sub-processes disclosed herein. The hardware system may include, for example, a normalization module, one or more word embedding modules or term embedding modules, one or more multi-stage clustering modules, a profiler module, an analytics module, an anonymization module, one or more machine learning or artificial intelligence (A.I.) modules, and/or an anomaly check module in some embodiments.

Each of these modules may include or function in tandem with electrical circuitry and one or more micro-processors each having one or more processor cores to perform its intended functions. The hardware system may further include one or more forms of non-transitory machine-readable storage media or persistent storage devices to temporarily or persistently store various types of data or information, various design rules, various libraries, selected and selectable targets, or any other suitable information or data, etc. A module may be initialized in a computing system so that the software portion of the module is stored in memory (e.g., random access memory) to be executed by one or more processors or processor cores off the computing system to perform at least a part of the functionality of the module. Some illustrative modules or components of the hardware system may be found in the description below.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing cluster-based processing of digital forms with word embedding techniques are described below with reference to FIGS. 1A-11.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 6E illustrates an example of a data structure that is used to facilitate the manipulation of classes and/or rules in some embodiments.

FIG. 10A-10E illustrate some examples of capturing and classification of digital data and providing recommendations using real-time computing techniques or reactive computing techniques in one or more embodiments.

FIG. 10E-10I illustrate some examples of providing recommendations in response to inquiries with real-time or reactive computing techniques in one or more embodiments.

DETAILED DESCRIPTION

Some embodiments are directed to a method, system, and computer program product for classifying digital data and providing recommendations using reactive computing techniques or real-time computing techniques in one or more embodiments. Other objects, features, and advantages of the invention are described in the detailed description, figures, and claims. Some embodiments are directed to a method, system, and computer program product for classifying digital data using reactive computing techniques or real-time computing techniques. Other objects, features, and advantages of the invention are described in the detailed description, figures, and claims.

Some embodiments are directed to automatic code generation from one programming language into a configurable programming language. Other objects, features, and advantages of the invention are described in the detailed description, figures, and claims. Some other embodiments are directed to a method, system, and computer program product for capturing and classification of digital data and providing recommendations using real-time computing techniques or reactive computing techniques. Other objects, features, and advantages of the invention are described in the detailed description, figures, and claims.

Figure 1A:
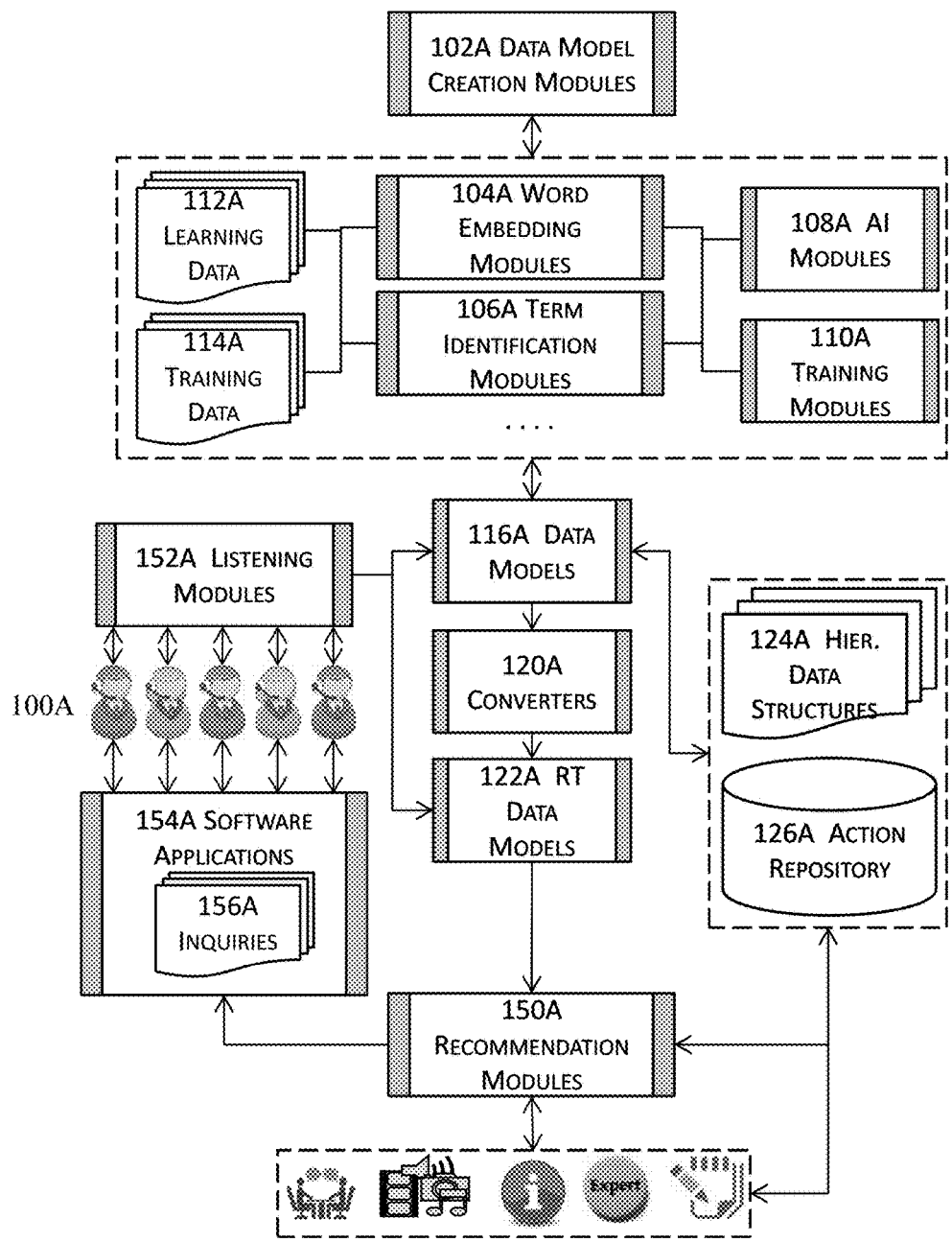
FIG. 1A illustrates a high level block diagram for classifying digital data and providing recommendations using reactive computing techniques or real-time computing techniques in one or more embodiments.

FIG. 1A illustrates a high level block diagram for classifying digital data and providing recommendations using reactive computing techniques or real-time computing techniques in one or more embodiments. In these embodiments, one or more data model creation modules 102A may be invoked to generate one or more data models 116A with various different techniques. The data model creation modules 102A may include, for example, one or more word embedding modules or term embedding modules 104A that apply word embedding techniques or term embedding techniques to data sets and/or one or more data or recognition modules 106A that identifies or recognizes terms in a data set (e.g., a corpus).

These word embedding or term embedding modules and/or the data modules are responsible for creating software application code modules (e.g., data models 116A) that classify and/or cluster data such as free text or terms (e.g., a string of characters, word, a plurality of words, phrases, sentences, etc.) expressed natural language in data sets. Some or all of these data model creation modules may be used in tandem with one or more additional modules or data sets to generate the data models 116A. These one or more additional modules or data sets may include, for example, a plurality of artificial intelligence (AI) modules 108A, one or more training modules 110A, active and/or passive learning data sets 112A, one or more training or re-training data sets 114A, etc.

In some embodiments, the data models 116A may include a plurality of rules and may be executed to classify one or more sets of data into predetermined classes. In some other embodiments, these data models 116A may not include any rules, yet a set of rules may nevertheless be inferred from these data models 116A. For example, some data models 116A may be built upon word embedding techniques or term embedding techniques or data techniques and thus does not contain any explicit rules. In this example, various techniques described herein may nevertheless derive or infer a set of rules from these data models. These predetermined classes, rules, etc. determined by the data models 116A or the classes or classification results may be arranged and stored hierarchically in one or more hierarchical data structures 124A.

These one or more hierarchical data structures 124A may be further arranged to include or correspond to an index data structure that may be further used to skip a portion of the rules or a portion of the classes during classification, determination of recommendations, etc. in order to facilitate and expedite the manipulation (e.g., access, retrieval, storage, etc.) of these classes and/or rules. A recommendation is generally referred to as an action and may also be efficiently stored in an action repository 126A that may further include or correspond to a link structure that delineates the association or links between an action stored in the action repository 126A and one or more classes associated with the action.

These one or more data models 116A may then be provided to a converter 120A as an input for the converter 120A to generate a corresponding real-time data model 122A in a selectable or configurable target programming language. In some embodiments, each pair of data model (116A) in a source programming language and real-time data model (122A) in a target programming language may correspond to a converter 120A. In some other embodiments, a converter 120A may be used to transform a plurality of pairs of data model 116A and real-time data model 122A, especially in the cases where the source programming languages and/or the target programming languages have certain degree of similarity or commonality.

The real-time data models 122A may be deployed to a server for execution on the server in some embodiments or to individual user computing systems for execution on these individual user computing systems in some other embodiments. For example, a data model 116A generated by a plurality of AI modules may be transformed by a converter 120A into a real-time data model in an interpretive language (e.g., JavaScript, etc.), and this real-time data model 122A may then be deployed to end user computing systems for local execution of the real-time data model 122A by the browsers to classify terms entered into the browser by the end users during the sessions of a software licensing or delivery model (e.g., an electronic tax return preparation software licensing or delivery model).

The real-time data models 122A may also be operatively connected to one or more recommendation modules 150A that furnish one or more recommendations to the inquiring users based in part or in whole upon the results of the real-time data models 122A. During the interactions between a plurality of users and one or more software licensing or delivery models 154A, these users may often encounter issues and thus submit inquiries 156A that may be digitally transmitted to a plurality of agents 100A via, for example, online chats, messages, emails, etc. or verbally communicated to the plurality of agents 100A via, for example, live telephone sessions.

In some embodiments, one or more listening modules 152A may be implemented either in communication with each agent's communication device (e.g., computing system, telephone, etc.) or as a network provided feature that listens to the communications between the plurality of agents 100A and the plurality of users. These one or more listening modules 152A may listen to and store information (e.g., raw data, processed raw data, etc.) about the communications.

This stored information about the communications may also be processed by the data models 116A or the real-time data models 122A. For example, a data model or a real-time data model may capture and classify user's inquiry or demand 156A into a class and identify one or more actions associated with the class. The data model or the real-time data model may then compare these automatically determined one or more actions with the recommendation provided by the agent to determine whether the data model or the real-time data model is to intervene in the communication between the agent and the user.

For example, the data model or the real-time data model may determine that the automatically determined one or more actions may better address the user's inquiry, the data model or the real-time data model may either initiate a private session that is transparent to the user with the agent to provide the one or more actions or may intervene in the communication between the agent and the user to provide these one or more actions as alternative or replacement recommendations.

A listening module may also capture terms that cannot be deterministically classified by the data model or the real-time data model into any predetermined classes in some embodiments. In these embodiments, the data model or the real-time data model may further invoke one or more actions for non-classification. These non-classification actions may include, for example, classifying these terms as to belong to the catch-all class; flagging these terms for domain expert review and determination; recalibrating the data models; storing the corresponding terms and/or their respective pertinent information (e.g., information about the inquiries, information about the requesting users, etc.); and/or recalibrating the data model 116A and/or the real-time data models 122A; etc.

A system thus illustrated in FIG. 1A may be used to generate data models for classifying or clustering data in a large corpus and transform the generated data models into classifying or clustering code modules in various configurable programming languages. These transformed data models may be constructed in such a way to provide fast and accurate prediction and description of the data in the corpus as well as data that are not contained in the corpus. One of the advantages of these transformed data models is that these transformed data models are constructed with reactive computing techniques or real-time computing techniques so that these transformed data models may classify and cluster live, real-time data (e.g., real-time customer inquiries 156A) and return recommended actions in real-time or substantially real-time, instead of in a batch mode processing as conventional approaches often employ.

Various embodiments described herein perform various tasks comprising classification, determination and presentation of recommendations, etc. in real-time (RT) or nearly real-time (NRT). It shall be noted that the term "real-time" does not necessarily refer to generating instantaneous responses and may refer to the scenarios that include a brief time delay introduced by, for example, data transmission, executions of instructions by various processors (e.g., central processing units, graphic processors, etc.), etc. Nonetheless, these real-time data models guarantee the responses within a pre-specified temporal constraint or timeframe (e.g., in the order of one millisecond, one microsecond, or less).

Nearly real-time refers to the amount of temporal delay introduced by these modules and/or models described herein between the occurrence of an event (e.g., the receipt of a user inquiry) and the completion of processing (e.g., presentation of a recommended action in a user interface) is insignificant or within a relatively small threshold limit. The amount of temporal delay in nearly real-time is slightly larger than that in real-time although either approach guarantees that the temporal delay is not greater than a corresponding temporal constraint or timeframe.

In other words, a real-time data model receives an input data, processes the input data to generate a result, and returns the result within the pre-specified, guaranteed temporal constraint or timeframe where missing a temporal constraint or timeframe may either downgrade the service of the real-time data model or even cause a system error or failure in some embodiments. In some other embodiments, infrequently missing the temporal constraint or timeframe may be tolerated, especially in the scenarios involving terms that cannot be successfully clustered or classified.

A transformed data model may be stored on a user's computing device or communication device (e.g., laptops, smart phones, tablets, etc.) and executed locally to perform real-time clustering or classification of data entered by the user in some embodiments. In some other embodiments, a transformed data model may be stored on a remote computing node (e.g., a server) on which a subscribed or hosted software application runs. In these latter embodiments, the remote computing node receives inquiries from user computing nodes that are connected to the remote computing node via computing networks, processes the inquiries by executing the transformed real-time data model, and returns the processing result to the requesting user computing nodes in real-time.

Figure 1B:
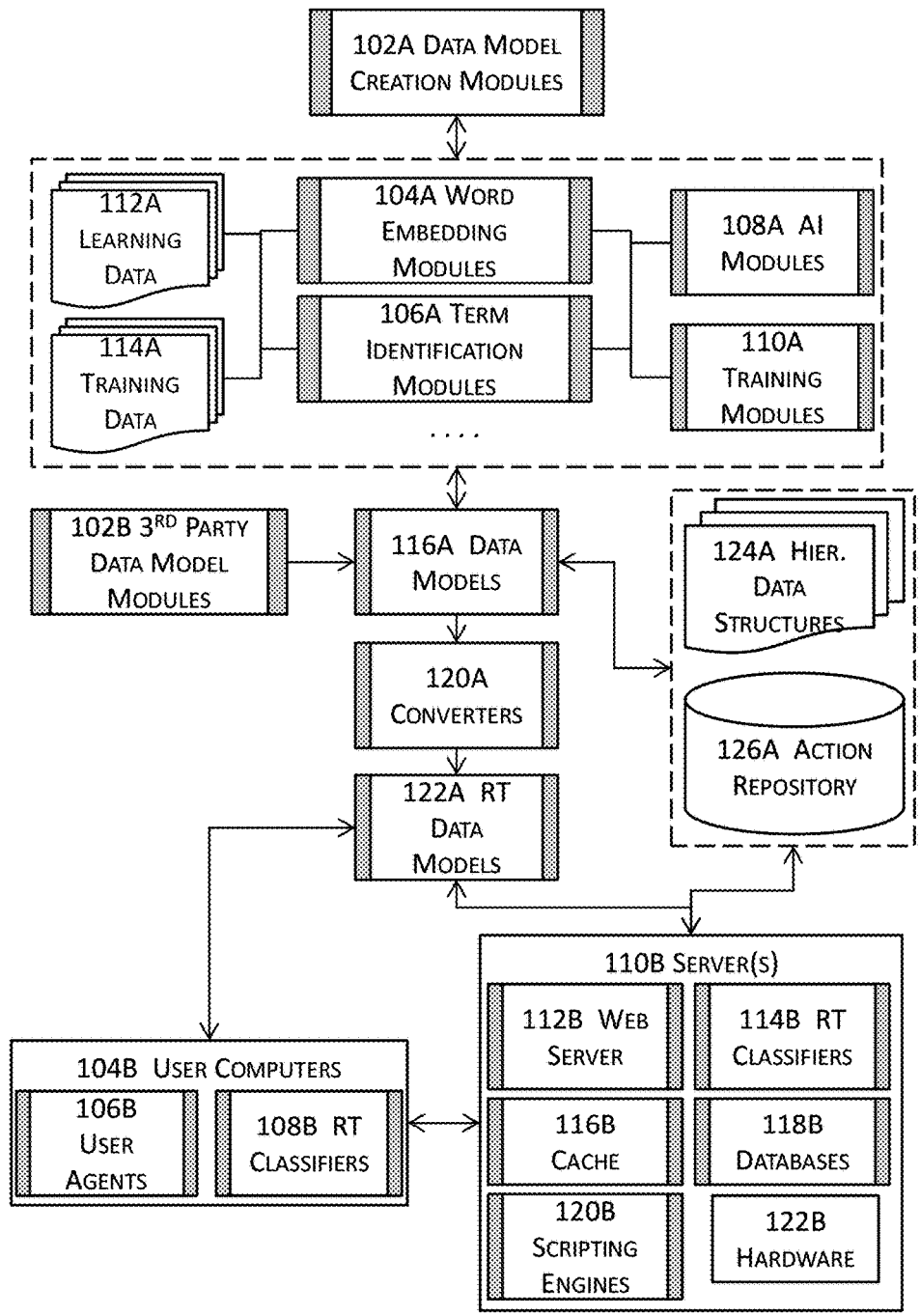
FIG. 1B illustrates a high level block diagram for classifying digital data using reactive computing techniques or real-time computing techniques in one or more embodiments.

FIG. 1B illustrates a high level block diagram for classifying digital data using reactive computing techniques or real-time computing techniques in one or more embodiments. In these embodiments, a system including the modules illustrated in FIG. 1B may include one or more data models 116A. These one or more data models 116A may be generated by the one or more data model creation modules 102A in some embodiments. In some other embodiments, these one or more data models 116A may include a third-party data model 102 that is generated by a third party and imported as one of these one or more data models 116A. A third party refers to an entity that is different from the entity owning or operating software licensing or delivery models that are either individually installed on user computing devices 104B, on the one or more servers 110B, or in a cloud-based environment. A third party also refers to the entity that is different from the users who use the software licensing or delivery models.

As described above with reference to FIG. 1A, these one or more data models 116A may be transformed by one or more converters or transformers 120A into one or more corresponding transformed, real-time data model 122A. These one or more transformed, real-time data model 122A may be stored and executed on user computing devices 104B that include one or more transformed, real-time data model 122A as well as one or more user agents (e.g., browsers, crawlers, etc.) that interface with the users. The users may request data to be clustered or classified in the form of entering inquiries at the one or more user agents 106B; and the locally stored transformed, real-time data models 122A may then execute locally on the user computing devices 104B (e.g., RT Classifiers 108B) to perform clustering and/or classification on the inquiries and to return clustering and/or classification results to the user agents 1066.

In some other embodiments, one or more transformed, real-time data models 122A may be stored and executed on one or more remote server computers 110B as one or more RT classifiers 114B. A server 110B may include, for example, a Web server 112B running on the server computer 110B, one or more transformed, real-time data models 114B, a cache 116B to temporarily store requested Web pages or information therefor, one or more databases 118B operating in tandem with the Web server, one or more scripting engines 120B (e.g., JavaScript engine, etc.), and other hardware 122B (e.g., networking hardware, storage hardware, processing units, etc.) to facilitate the communications between user computing devices and the one or more servers 110B.

In these embodiments, users may also request data to be clustered by, for example, entering data in a user agent 106B. This data may be transmitted from the user computing device 104B to a server 110B. Depending on the type, attributes, and/or capabilities, etc. of the user agent 106B, the server may invoke an appropriate transformed, real-time data model 114B stored locally on the server 110B to classify or cluster the data. The result of clustering or classification may then be transmitted back to the user computing device 104B to fulfill the user's request.

Figure 1C:
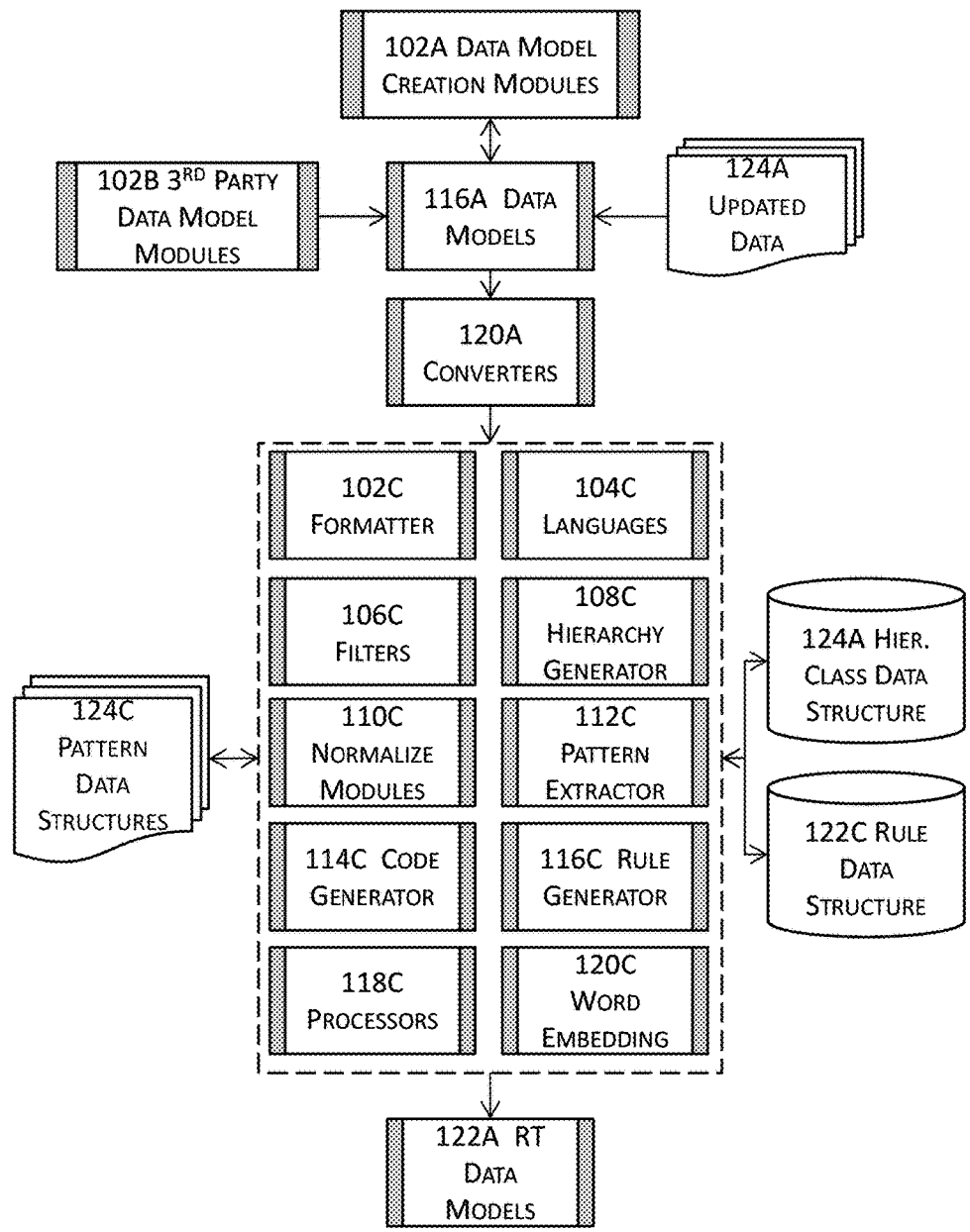
FIG. 1C illustrates a high level block diagram for automatic code generation from one programming language into a configurable programming language in one or more embodiments.

FIG. 1C illustrates a high level block diagram for automatic code generation from one programming language into a configurable programming language in one or more embodiments. In these embodiments, a system including the modules illustrated in FIG. 1C may include one or more data models 116A that may be generated by one or more data model creation modules 102A or may be generated by a third-party data model modules 102B as described above with reference to FIG. 1B. The data models 116A may be modified, updated, or adjusted with updated data 124A. For example, any data or other pertinent information that introduce issues or difficulties during clustering or classification may be added to the updated data 124A that may be formulated as one or more training data sets or training instances to retain the pertinent data models 116A.

These one or more data models 116A may be transformed into one or more corresponding real-time data models 122A via one or more conversion or transformation modules. These one or more conversion or transformation modules may include, for example, a formatter module 102C that normalizes an input data model 116A in a source programming language according to the requirements (e.g., syntactical requirements) of the target programming language. For example, a formatter module 102C may replace characters or operators such as spaces, commas, quotes, Boolean operators (e.g., AND, OR, NOT, etc.) with corresponding characters or operators of the target programming language. As another example, a formatter module 102C may escape characters such as periods, slashes, etc., define fix bounds for term boundaries, etc.

A formatter module 102C may also include one or more rule processors that process rules (e.g., splitting on spaces, looping through non-blank items, adding back commas, periods, etc.), and/or replacing one character with another character (e.g., replacing "#" as "space"). A formatter module 102C may also normalize an input data model into a standard form while conforming to the selected target programming language. For example, a formatter module 102C may transform multiple spaces into a single space, transform informal usage into standard usage as defined by the selected target programming language, etc.

These one or more conversion or transformation modules 120A may also include programming language information 104C such as syntactical requirements, functional requirements, etc. about a plurality of programming languages. When a specific programming language is selected, an appropriate set of information for the selected programming language may be identified to aid the other transformation or conversions modules in transforming an input data model into a real-time data model.

In addition or in the alternative, these one or more conversion or transformation modules may include a plurality of filters 106C and a hierarchy generator 108C. More details about some examples of filters are described below with reference to FIGS. 9B-9C. A hierarchy generator 108C may instantiate a new hierarchical data structure or modify an existing hierarchical data structure for the storage of, for example, classification results such as a hierarchical class data structure 124A, clustering or classification rules and storing in a rule data structure 122C, and/or one or more actions associated with a class or rule. The hierarchy generator 108C may also function in tandem with a database system to index hierarchical data structures with indices (e.g., unique keys) to facilitate and improves access, manipulation, retrieval, and storage of various pieces of data in the hierarchical data structures.

Indexing employs an indexing data structure that stores the indices and may be a separate data structure or a part (e.g., a column) of an existing data structure. The indices in the indexing data structure may be sorted in a particular order to facilitate rapid random lookups and queries as well as efficient access of ordered information in the hierarchical data structure. A hierarchical data structure described herein may also contain references to the physical disk block addresses or links thereto to further improves access to the data and/or functions (e.g., recommended actions for a predetermined class, applications of rules to data for clustering and/or classification purposes, etc.) stored in the hierarchical data structure.

In addition to the generation of hierarchical data structures, a hierarchy generator 108C may also parse any hierarchical data structures (e.g., a hierarchical class data structure, a hierarchical rule data structure, etc.) that are generated by the hierarchical generator 108C or by other processes. For example, a hierarchical generator may parse a data model that implicitly describes a hierarchical class structure as well as the corresponding rules associated with each class and function in tandem with, for example, a rule generator 106C to generate a hierarchical set of rules.

The one or more conversion or transformation modules 120A may also include a mapping or normalization module 110C that may translate code segments or sections (e.g., expressions, functions, syntaxes, etc.), attributes, variables, expressions, etc. from a source programming language to a target programming language. A mapping or normalization module 110C may also map logic in a source programming language to logic or constructs in a target programming language while conforming to the requirements of the target programming language.

In addition or in the alternative, a mapping or normalization module 110C may transform an expression (e.g., a regular expression) into a set of one or more expressions (e.g., standard or specific syntax, sequences of characters, and/or metacharacters, etc.) and then into an internal representation that can be executed and matched against a string of characters that represent the data being searched to represent and/or define search patterns for clustering or classification purposes. These patterns may be stored in one or more pattern data structures 124C that may also be indexed with, for example, unique pattern identifiers that may be stored in a separate index data structure in some embodiments or in a column in the same pattern data structure in some other embodiments to facilitate and improve the access, manipulation, storage, and/or retrieval of patterns in these one or more pattern data structures 124C. These one or more mapping or normalization modules 110C may also include one or more regular expression processors and a converter from non-deterministic finite automaton into deterministic finite automaton.

These one or more conversion or transformation modules 120A may also include a pattern extractor 112C that may parse, recognize, and extract patterns (e.g., textual patterns, code sections, rules, etc.) to search for patterns and/or rules in an input data model 116A. A pattern extractor 112C may also assign pattern identifiers that may also be used as indices to facilitate and improve access, manipulation, retrieval, and storage of various hierarchical data structures. In addition or in the alternative, a pattern extractor 112C may identify or determine sets of regular expressions that represent or define search patterns that matching terms need to conform to and may be invoked by one or more other modules described herein.

These one or more conversion or transformation modules 120A may include a code generator 114C that automatically generates source and executable code in a selected target programming language. These one or more conversion or transformation modules 120A may also include a rule generator 116C that examines the data model 116A or the extracted patterns or parses the data model 116A to automatically generate rules and to store these rules in a hierarchical data structure according to, for example, the class hierarchies of the classification results.

In some embodiments, the rule generator 116C transforms a non-rule-based data model 116A into a rule-based data model prior to the final generation of the real-time data model. For example, a rule generator 116C may transform a data model 116A into a plurality of constructs that predicate upon classes and further assign rule identifiers to the generated rules to facilitate and improve access, manipulation, storage, and retrieval of these rules. As a practical example, a rule generator 116C may parse a section of the data model 116A and generates a Boolean-valued construct that predicates upon an input class and store this Boolean-valued construct as a rule in a hierarchical data structure for the class.

These one or more conversion or transformation modules 120A may also include one or more processors 118C such as a syntax processor, one or more regular expression processors that process regular expressions, etc. These one or more conversion or transformation modules 120A may further include one or more word embedding or term embedding modules 120C that transform a term (e.g., one or more characters, one or more words, one or more phrases, or one or more sentences, etc.) into a corresponding vector in a multi-dimensional vector space where vectors that are closer to each other represent more similar vectors, and thus the corresponding terms may be clustered or classified into the same class or cluster. More details about word embedding or term embedding will be described below with reference to FIGS. 3E, 4C-4E, 5A-5D.

Figure 1D:
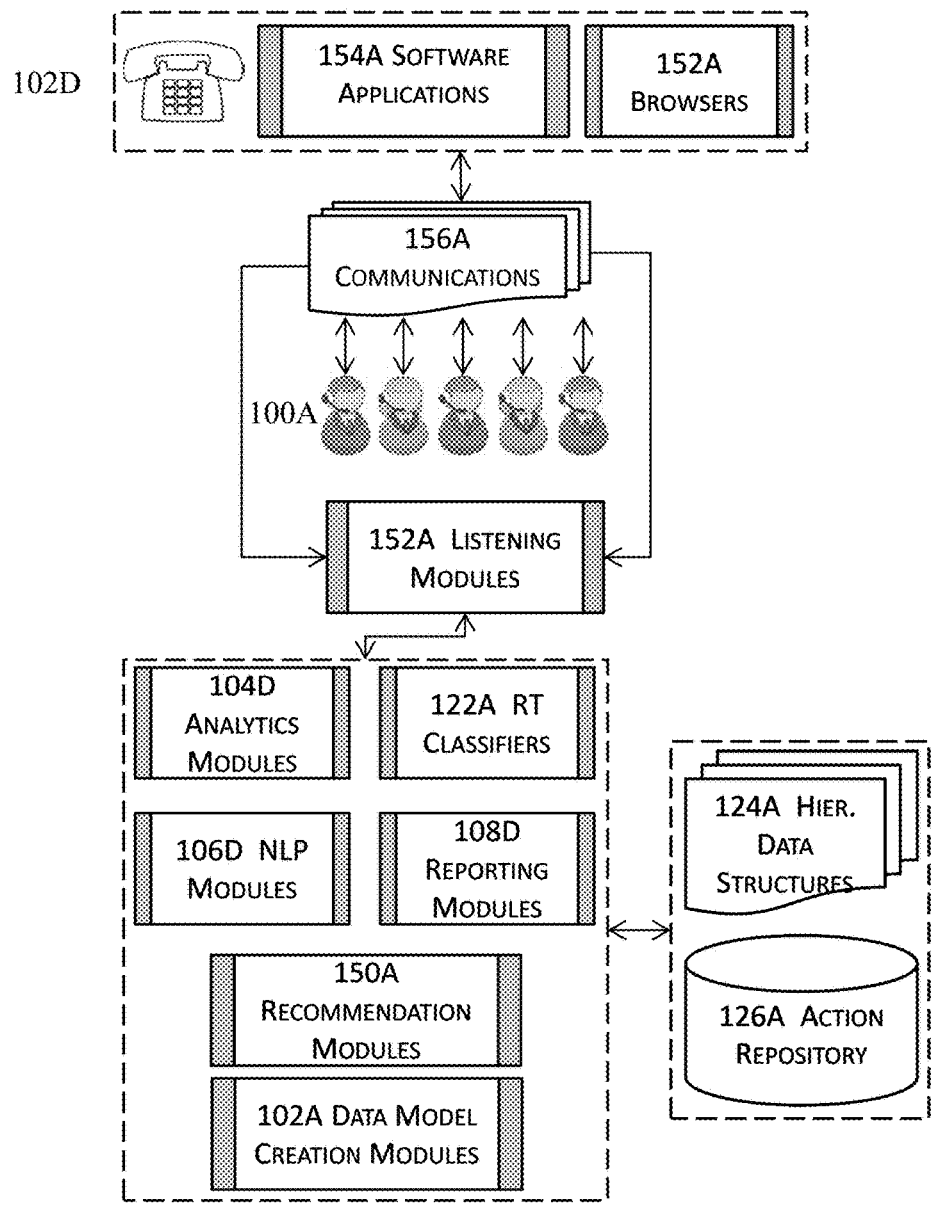
FIG. 1D illustrates a high level block diagram for capturing and classification of digital data and providing recommendations using real-time computing techniques or reactive computing techniques in one or more embodiments.

FIG. 1D illustrates a high level block diagram for capturing and classification of digital data and providing recommendations using real-time computing techniques or reactive computing techniques in one or more embodiments. In these one or more embodiments, one or more listening modules 152A may be installed to capture the communications or information thereof 156A between a plurality of users of software licensing or delivery models 154A and a plurality of agents 100A. These one or more listening modules 152A may be installed individually on each of the plurality of user communication devices (not shown) in some embodiments or centrally installed along the network communication paths between the plurality of user communication devices and one or more servers in communication with the plurality of user communication devices in some other embodiments.

For example, a plurality of user communication devices may include thereupon a plurality of user agents 152A (e.g., browsers) and may be in communication with a server that monitors and stores records or data about various communications between the plurality of agents 100A and the plurality of user communication devices. In this example, a listening module 152A may be installed on the server or on another computing node to retrieve the captured and stored records and data about the communications. These communications may include one or more forms 102D including, for example, a digital form such as messages, emails, online chat records, etc., an analog form (e.g., voice communication records via telephones) that is subsequently transformed into a digital form by a voice recognition module, a combination of a digital form and an analog form, or any other suitable forms.

These one or more listening modules 152A may function in tandem with one or more modules. These one or more modules may include one or more analytics modules 104D that perform various analytics on the captured records or data; one or more real-time classification or clustering modules 12A; one or more natural language processing modules 106D to perform various natural language processes; one or more reporting modules 108D that generate various reports; one or more recommendation modules 150A that identify or determine one or more actions for a classification result; and/or one or more data model creation modules 102A that generate new data models or modify existing data models. More details about the real-time classification or clustering modules 122A, the analytics modules 104D, the reporting modules 108D, the data model creation modules 102A, and the recommendation modules 150A will be described below.

These one or more natural language processing modules 106D may perform natural language processes on the captured data or records expressed in a natural language or free-text form; and these processes may include, for example, a grammatical analysis, a semantic analysis, a syntactical analysis, a lexical analysis, and/or a context analysis to aid the understanding, description, and prediction of the captured data or records.

A lexical analysis may include the performance of a lexing or scanning process to break up the content of the captured real-time data or records into small tokens or units of the language. The units of language may be, for example, keywords, identifiers, or symbols such that the content of the user generated content items may be recognized. A syntax analysis may further process the results of the lexical analysis to identify the syntactic structure of the user generated content items so as to build a parsing result such as, but not limited to, a parse tree which represents the syntactic structure according to some grammar(s).

A semantic analysis may add semantic information to the processing result(s) of one or more other modules described herein and may further perform static or dynamic semantic checks for type errors. A context analysis may analyze the context in which certain tokens or units are used so as to further ascertain or correct the results of various results of a lexical analysis, a syntax analysis, a semantics analysis, or any combination thereof.

For example, a context analysis may determine the meaning of a particular word or a particular symbol based on the preceding and/or the subsequent words, symbols, or expressions. For example, an exclamation mark "!" has different meaning depending on the context in which the exclamation mark is used. In a literal construction, the exclamation mark may indicate a sharp or sudden utterance expressive of strong feeling of the user. On the other hand, the exclamation mark in a relational operator means "not equal to" when the exclamation mark is followed by "=".

Figure 2A:
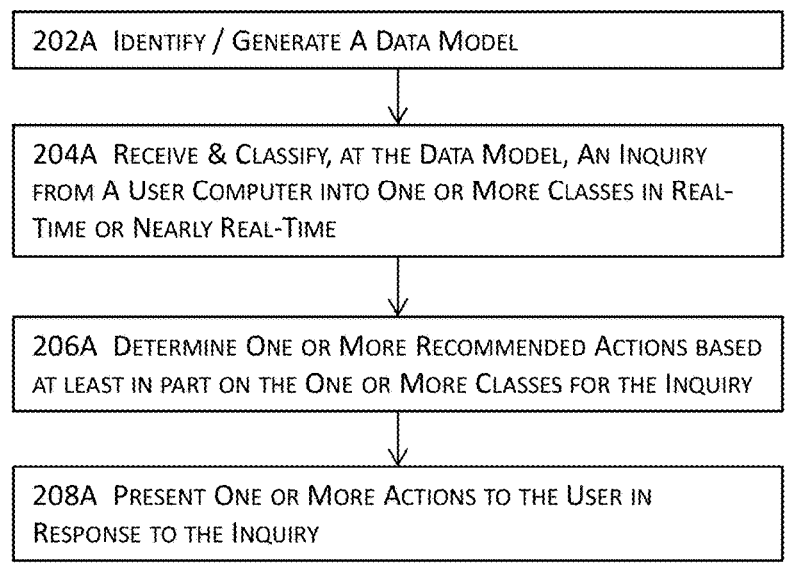
FIG. 2A illustrates a high level flow diagram for classifying digital data and providing recommendations using reactive computing techniques or real-time computing techniques in one or more embodiments.

FIG. 2A illustrates a high level flow diagram for classifying digital data and providing recommendations using reactive computing techniques or real-time computing techniques in one or more embodiments. In these one or more embodiments, a data model that clusters or classifies terms into a plurality of classes or clusters (collectively classes for plural or class for singular) may be identified at 202A. In these embodiments, a term may include, for example, one or more characters, one or more words, one or more phrases, or one or more sentences. A term may be received from, for example, a user inquiry entered by a user during the user's interaction with a software licensing or delivery model. At 202, an existing data model, if available, may be identified; or a new data model may be generated if no existing data models may be used.

The data model identified or generated at 202A may receive and classify an inquiry from a user computing or communication device into one or more classes at 204A. It shall be noted that the terms computing device and communication device may be used interchangeably in some embodiments to refer to the device such as a desktop, a laptop, a smart phone, a tablet, a phablet, a personal digital assistant, etc. that may be used by a user to interact and use a software licensing or delivery model. It shall also be noted that the terms classify and cluster and hence classification and clustering may also be used interchangeably to refer to the determination of a class to which a term is determined to belong. The data model may be located and executing locally on a user's computing device in some embodiments or may be centrally located on one or more servers or remote computing nodes servicing a plurality of user computing devices in some other embodiments.

One or more recommended actions may be determined or identified at 206A for the inquiry based at least in part upon the one or more classes determined at 204A by the data model. These one or more recommended actions may include, for example, presentation of one or more media files (e.g., video, pictures, screen shots, help documentation, frequently asked questions (FAQs), etc.) in one or more presentation formats, initiation of one or more guided software application flows with custom flow nodes that address or respond to the inquiry, invocation of live technical or support personnel through online chat sessions, telephone sessions, email communications, or any other suitable actions that may fulfill the inquiry from the user, etc. in some embodiments. It shall be noted that these one or more recommended actions may be determined based on the inquiry alone in some embodiments or based on the inquiry and one or more additional inputs from the user in response to one or more automatically generated questions in one or more automated chat sessions in some other embodiments.

At least one recommended action of the one or more recommended actions may be presented at 208A to the user in response to the inquiry. In some embodiments, these techniques may also automatically generate a survey or questionnaire to collect feedback from the user to determine whether the user is satisfied with the presented at least one recommended action. This user feedback may be collected and used in further tweaking or adjusting the data model.

Figure 2B:
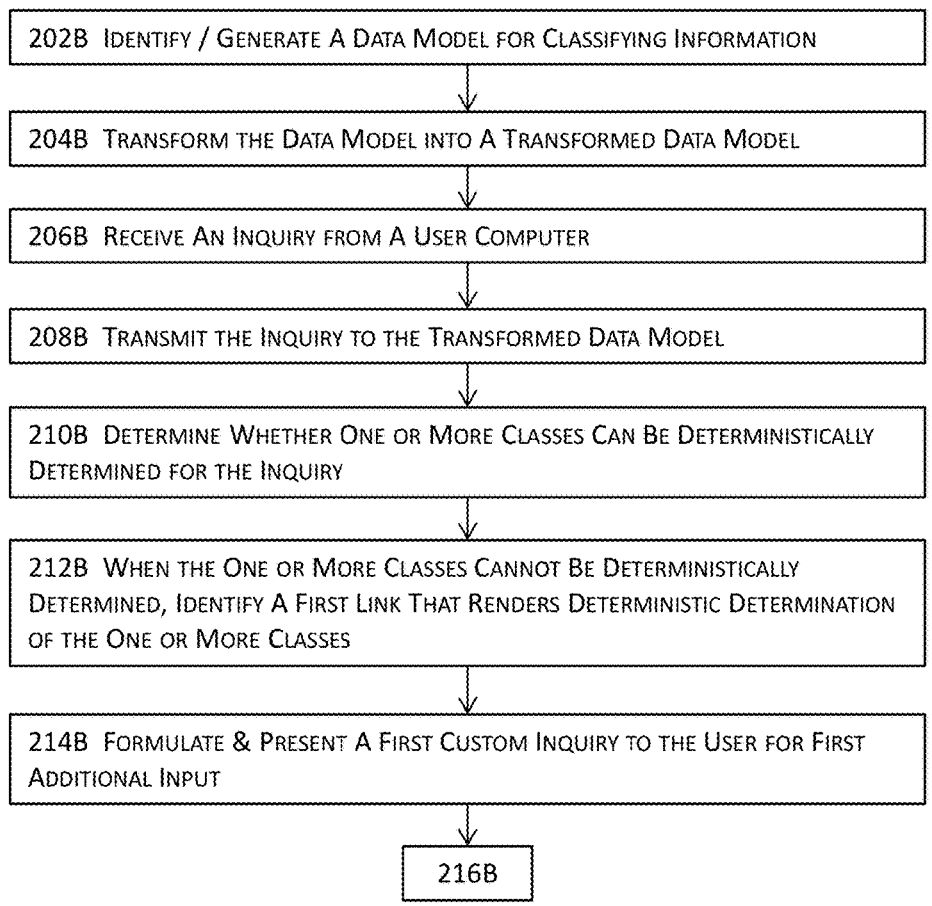
FIGS. 2B-2D jointly illustrate a more detailed level flow diagram for classifying digital data and providing recommendations using reactive computing techniques or real-time computing techniques in one or more embodiments.
Figure 2C:
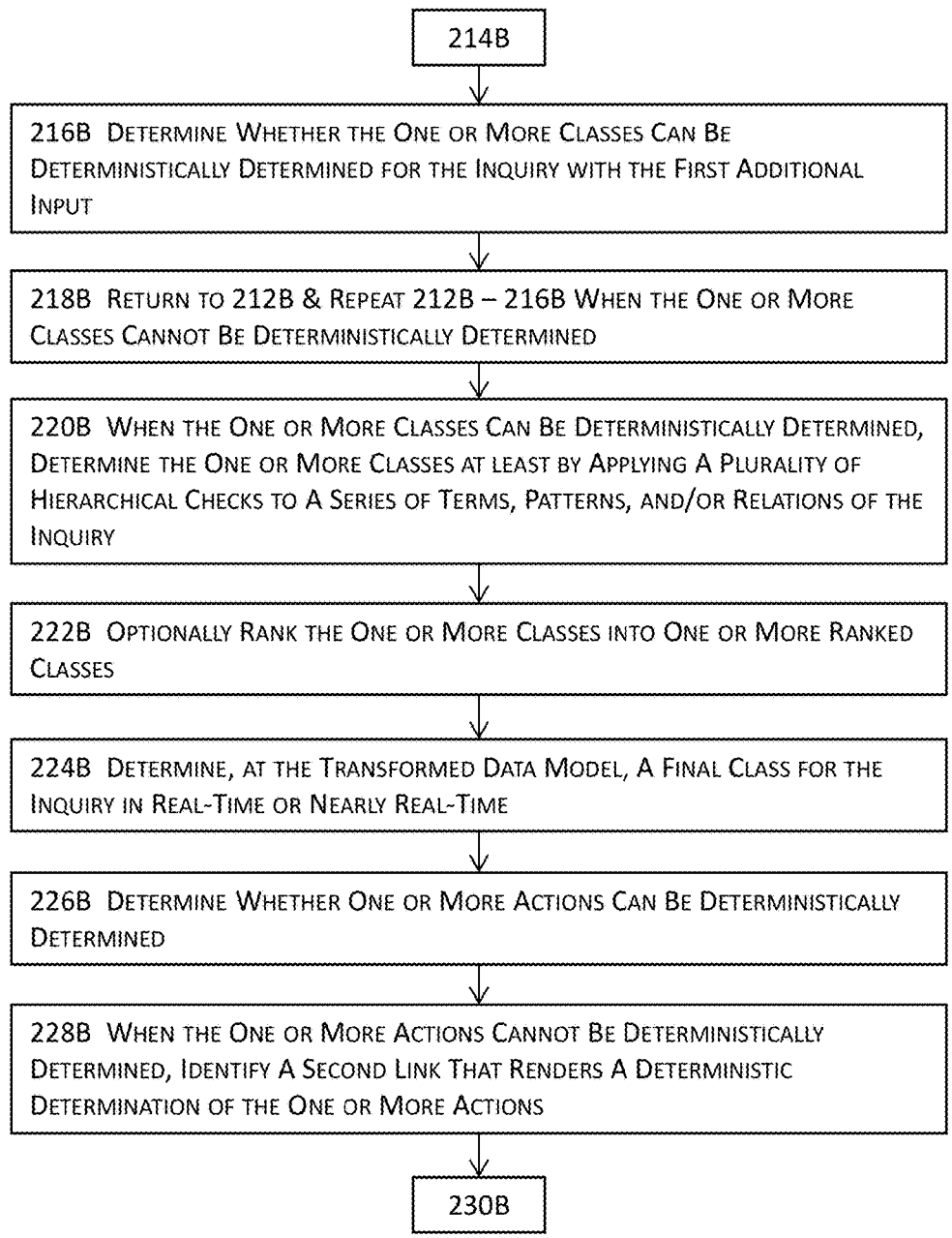
Figure 2D:
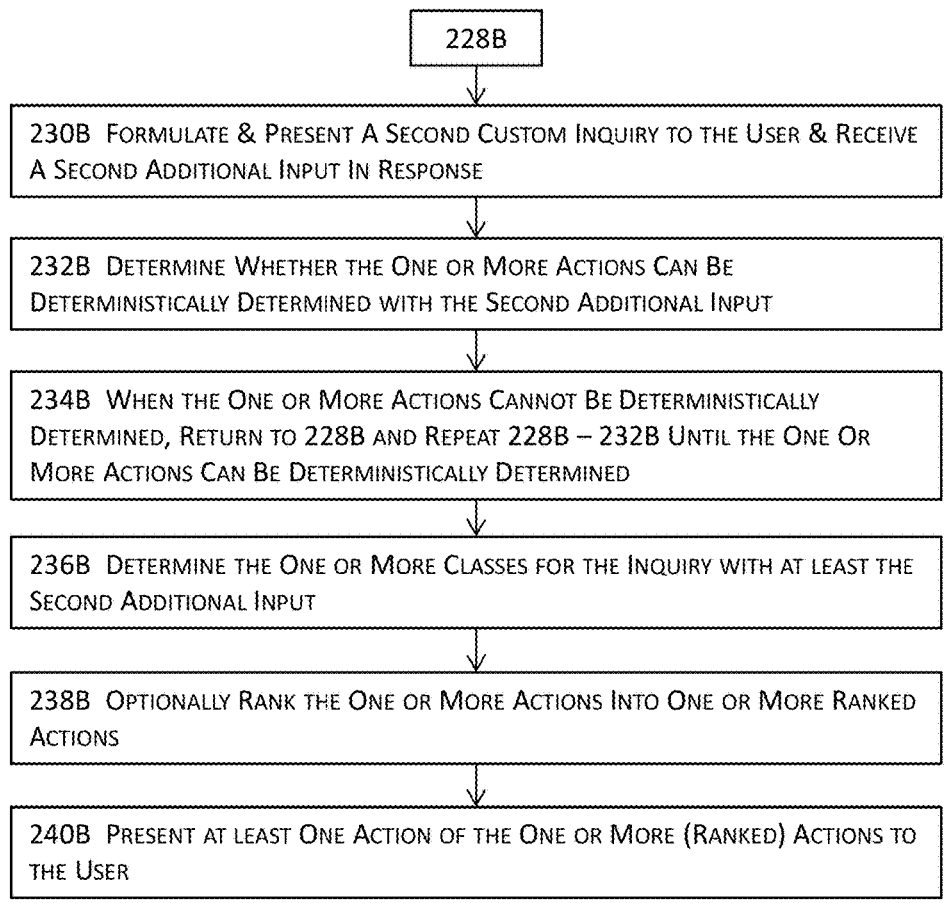

FIGS. 2B-2D jointly illustrate a more detailed level flow diagram for classifying digital data and providing recommendations using reactive computing techniques or real-time computing techniques in one or more embodiments. In these one or more embodiments, a data model for classifying information may be identified (if already existing) or generated (if not existing) at 202B. This data model identified or generated at 202B may be transformed at 204B with a transformation or conversion module into a transformed data model.

One of the characteristics of a transformed data model is the ability to perform classification in real-time in that a transformed data model guarantees its responses within a pre-specified temporal constraint or timeframe (e.g., in the order of one millisecond, one microsecond, or less). In these embodiments, a transformed data model receives an input data, processes the input data to generate a result, and returns the result within a pre-specified, guaranteed temporal constraint or timeframe where missing a temporal constraint or timeframe may either downgrade or postpone the service of the transformed data model or even cause a system error or failure in some embodiments. In some other embodiments, infrequently missing the temporal constraint or timeframe may be tolerated, especially in the scenarios involving terms that cannot be successfully clustered or classified.

An inquiry may be received from a user computing device at 206B. This inquiry may include, for example, a question indicating the need for assistance and entered by a user in the user interface of a software licensing or delivery model. This inquiry may be transmitted at 208B to the transformed data model. The transformed data model executing either locally on the user computing device or remotely on a server may determine whether the inquiry by itself may be deterministically classified into one or more classes at 210B. That is, the transformed data model attempts to classify or look up the inquiry to determine whether the inquiry matches any predetermined or pre-recognized classes. Determinism is a position that for every event there exist conditions that could cause no other event. A deterministic classification of the inquiry into one or more classes refers to the position that the inquiry leads to these one or more classes but no other classes.

When the determination at 210B is negative, these techniques described herein may then identify a first link which, when used with the first inquiry, may lead to a deterministic determination of one or more classes for the inquiry at 212B. For example, the logic in the transformed data model identified or generated at 202B may initially determine a plurality of classes each corresponding to a relatively low confidence level due to, for example, insufficient details or information provided in the inquiry.

The logic may nevertheless determine that when given certain pieces of additional information, the transformed data model can deterministically classify the inquiry into one or more classes with relatively high confidence level(s). These techniques may then identify such additional information as the first link at 212B. For example, a user may enter an inquiry "what is a schedule for 1040". The transformed data model may identify that the IRS Form 1040 has 14 schedules and ask the user to confirm which schedule the user is seeking help with while presenting some general information about these schedules to the user.

In addition or in the alternative, the system may monitor where the user is at in the flow of the software licensing or delivery model and determine the first link based on the current flow node of the flow. In the aforementioned example, the system may identify that the user is currently at the flow node to report rental income and expenses for real properties in an electronic tax return preparation and filing software licensing or delivery model. The system may determine that the user's inquiry is directed to Schedule E of IRS Form 1040. The system may either present the information about Schedule E to the user in response to the inquiry or first confirm whether the user is seeking help with Schedule E before presenting pertinent information to the user.

With the first link identified at 212B, a first custom chat question may be formulated and presented to the user to ask for additional input from the user at 214B. Upon the receipt of the additional input in response to the first custom chat question, the transformed data model may determine whether the inquiry of the user may be deterministically classified into one or more classes with the inquiry and the additional input at 216B. If a deterministic classification still cannot be achieved with sufficiently high confidence level, the process may, at 218B, return to 212B to identify one or more additional links and repeat the sub-processes 212B through 216B.

In some embodiments, the first link, the second like, or an additional link may be identified from one or more tokens or terms that are not satisfied by the user inquiry. For example, if the data model applies a first rule corresponding to a first class and including five tokens or terms to a user inquiry. If the user inquiry satisfies all five tokens or terms in the first rule the user inquiry may then be classified into the first class. Nonetheless, during the application of the first rule to the user inquiry, it is determined that the second token or term in the first rule is not satisfied. Also, the data model may also apply a second rule corresponding to a second class and including six tokens or terms to the user inquiry. If the user inquiry satisfies all six tokens or terms in the second rule the user inquiry may then be classified into the second class. Nonetheless, during the application of the second rule to the user inquiry, it is determined that the fourth token or term in the second rule is not satisfied. In this example, the data model may identify the second token or term in the first rule and the fourth token or term in the second rule to be the links.

On the other hand, if the transformed data model determines at 220B that the inquiry may now be deterministically classified into one or more classes with sufficiently high confidence level, the one or more classes may be determined by the transformed data model. In some embodiments, the transformed data model applies a plurality of hierarchical checks to a series of terms, patterns, and/or relations of the inquiry. These one or more classes may be optionally ranked at 222B into one or more ranked classes based in part or in whole upon, for example, their respective confidence levels, scores from compliance with or violation of the plurality of hierarchical checks, etc.

The transformed data model may optionally determine, at 224B, a final class for the inquiry in real-time or in nearly real-time. In some embodiments, all of the one or more classes, instead of the final class alone, may be referenced in subsequent processing. The transformed data model may then determine whether one or more actions may be deterministically determined for the one or more classes or for the final class at 226B. As presented earlier, these one or more actions may include, for example, presentation of one or more media files (e.g., video, pictures, screen shots, help documentation, frequently asked questions (FAQs), etc.) in one or more presentation formats, initiation of one or more guided software application flows with custom flow nodes that address or respond to the inquiry, invocation of live technical or support personnel through online chat sessions, telephone sessions, email communications, or any other suitable actions that may fulfill the inquiry from the user, etc. in some embodiments.

In some embodiments where the determination result at 226B is negative, the transformed data model may identify a second link that may lead to a deterministic determination of the one or more actions at 228B. For example, the classification result (e.g., the one or more classes) may not necessarily correspond to sufficiently high confidence levels. In this example, it may be more difficult to identify recommended actions that correspond to the relatively low confidence level classes. Similar to the approaches described above with reference to 212B, the system may now identify a second link which, when used with the one or more classes or the final class, may result in the deterministic determination of one or more actions.

A second custom chat question may then be formulated and presented at 230B to the user to ask the user for the user to provide a second additional input or to select from a list of possible second links. Upon the receipt of the second additional input, the transformed data model may then determine whether one or more actions may be deterministically identified with the classification result and the second additional input at 232B. In some embodiments where the determination result at 232B is negative, the process may return at 234B to 228B to identify one or more additional inputs that may lead to a deterministic determination of the one or more actions and repeat the sub-processes 228B through 232B. In some embodiments, these sub-processes 228B through 232B may be iteratively performed until the one or more actions may be deterministically determined. In some other embodiments, these sub-processes 228B through 232B may be iteratively performed subject to a threshold limit beyond which the inquiry, its classification results, and/or other pertinent information may be referred to domain expert review.

In some other embodiments where the determination result at 232B is affirmative, these one or more actions may be determined at 236B; and these one or more actions may also be optionally ranked at 238B into one or more ranked actions based in part or in whole upon, for example, popularity of these one or more actions among a plurality of users, other users' feedback on these one or more actions, relative confidence levels, complexity levels of these one or more actions, any other suitable ranking measures, or any combinations thereof. At least one action of the one or more actions or the one or more ranked actions may then be initiated (e.g., in a sub-flow) and presented at 240B to the user in response to the inquiry in real-time or in nearly real-time.

Figure 3A:
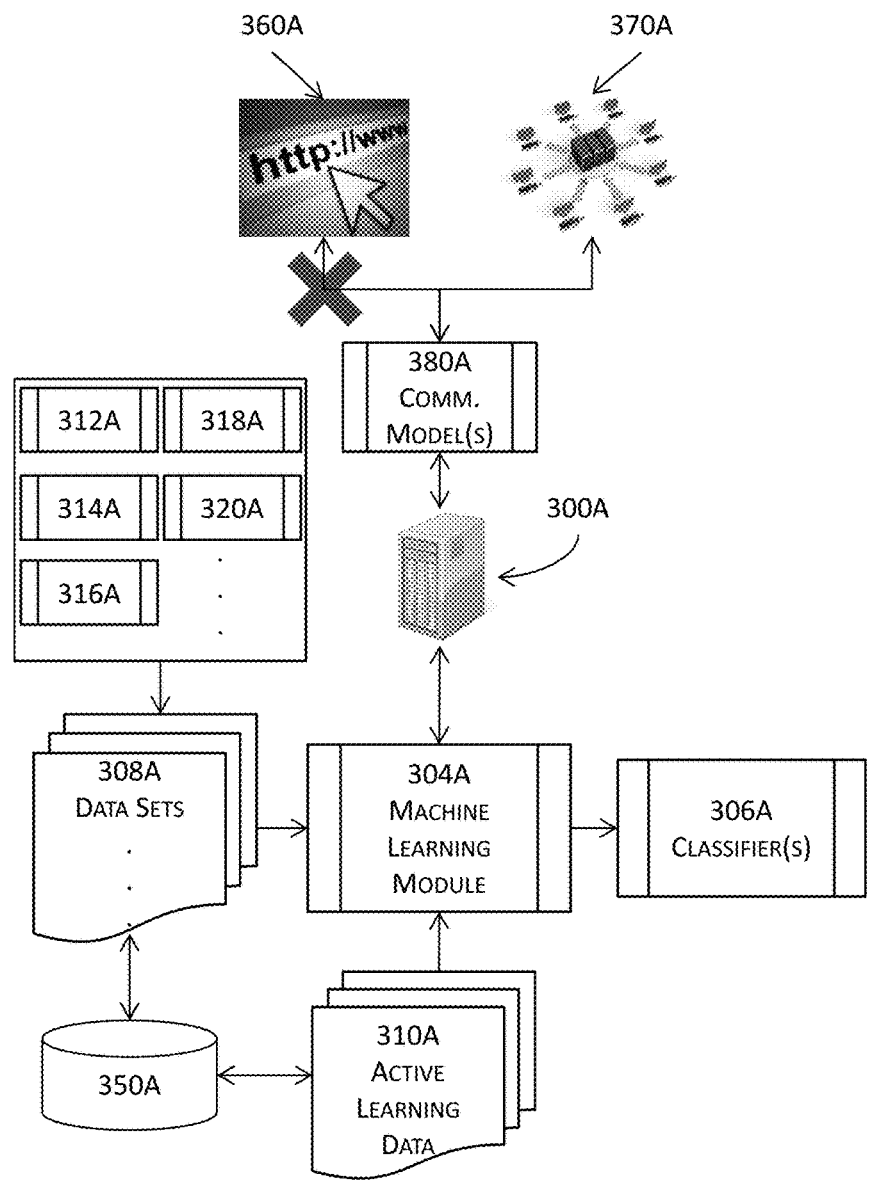
FIG. 3A illustrates a high level block diagram for classification of terms and helper items for software licensing or delivery models in one or more embodiments.

FIG. 3A illustrates a high level block diagram for classification of terms and helper items for software licensing or delivery models in one or more embodiments. In these embodiments illustrated in FIG. 3A, a computing system 300A may include or may be operatively coupled to a machine learning module 304A. In some embodiments, the computing system 300A is located in an isolated environment and is thus not connected to the Internet 360A although the computing system 100 may nevertheless be connected to the Internet 360A via a separate communication layer or communication module 380A in some other embodiments.

In these embodiments, the computing system on which term of interest and helper item identification are identified is not connected to the Internet without at least the separate communication layer or communication module 380A. The computing system 300A may nevertheless include a separate communication layer or module 380A to interface with one or more other computing systems on the intranet 370A. For example, the computing system 100 may interact with one or more other computing system on the intranet to obtain at least some of the plurality of data sets 308A for constructing data models. The plurality of data sets 108 forms the corpus for the software model of interest for the purposes of term of interest identification and helper item determination.

A data model may use various inputs such as one or more predetermined patterns, rules, constraints, requirements, or algorithms, information about terms from, for example, databases or data structures, etc. but is merely a set of patterns, rules, constraints, requirements, or algorithms or simply a database or data structure of information. Instead, a data model may include a software object that is stored at least partially in memory during execution and includes, for example, one or more formulae or logic, one or more sets of vectors, etc. that are executed or used to generate desired or required results. Moreover, a data model may be trained (e.g., with active learning data, historical data, etc.) to generate more accurate results by using artificial intelligence techniques such as machine learning techniques and is thus different from a set of hard coded or predetermined patterns, rules, constraints, requirements, or algorithms or a database or data structure of information.

The computing system 300A includes or functions in tandem with a machine learning module 304A. The machine learning module 304A receives a plurality of data sets 308A and processes the plurality of data sets 308A to generate one or more data models 306A for the identification of terms of interest and helper items. The plurality of data sets 308A may include, for example, generic term of interest identification data from generic term of interest identification modules 312A (e.g., term of interest or word of interest identification results from third-parties or from entities that are not the developers of or are not hosting the software model).

The plurality of data sets 308A may also include query results sets or query log records generated by one or more database engines 314A, customer specific data, customer retention data, and/or customer development data collected from one or more customer retention or development modules 316A. The plurality of data sets 308A may further include any online and/or offline documentation 318A (e.g., technical specification, help files, etc.) generated or maintained by a documentation module 320A for the software model for which identification of terms of interest and helper items is performed.

The plurality of data sets 308A may also include data generated by or collected from one or more crowdsourcing modules 320A that represent specific sourcing models where the entity (e.g., the entity that hosts or develops the software model for which identification of terms of interest and helper items is performed) uses an open call to obtain services from the parallel contributions of a large, specifically defined or named network of Internet participants (e.g., individual users including domain experts, groups of individuals, institutions, etc.), instead of any undefined segments of the public or employees or contractors of the entity. The plurality of data sets 308A may be persistently or non-persistently stored in a non-transitory storage medium 350A.

These data sets 308A may include digital contents of various formats including, for example, textual format, images, audio streams (e.g., speech data), etc. In some embodiments, the machine learning module 304A may process at least some of the plurality of data sets 308A to form the corpus for term of interest and helper item identification. For example, the machine learning module 308A may parse some textual data in the plurality of data sets 308A and tokenize the textual data into a plurality of tokens including, for example, one or more characters, one or more symbols, one or more words, one or more phrases, one or more sentences, one or more paragraphs, or any combinations thereof, etc.

The plurality of tokens may further include n-grams (e.g., unigrams, bigrams, trigrams, four-grams, five-grams, etc.) extracted from the data of interest in some embodiments. An n-gram is a contiguous sequence of n terms from a sequence of text or speech data. In these embodiments, the statistical properties of the plurality of tokens may be used in one or more probabilistic computational linguistics models for predicting certain item(s) in a sequence in the context of one or more preceding and/or following items or tokens. Some embodiments may further utilize various recognition and extraction techniques to recognize pertinent contents of digital images or audio streams in tokenizing these digital images or audio streams for the purpose of identification of terms of interest and helper items therefor.

The machine learning module 304A may use one or more different techniques including, for example, supervised learning techniques (e.g., support vector machines, decision trees, artificial neural network, inductive logic programming, statistical relational leaning, etc.) and/or unsupervised learning techniques (e.g., clustering, expectation-maximization techniques, multivariate analysis, etc.) for various pattern recognition and identification of terms of interest as well as helper items. In some embodiments, various techniques identify a term of interest and one or more helper items for the term of interest without even understanding the semantics or meanings of the term of interest or the one or more helper items. Rather, these techniques employ specific classification processes to identify terms of interest and pattern recognition techniques to identify the helper items, without understanding the meanings or semantics or performing any semantic analyses for the identification of terms of interest and helper items.

The machine learning module 304A may further be supplemented with active learning data 310A to adjust or fine tune one or more data models that are subsequently used in processing the plurality of data sets 308A for identification of terms of interest. The active learning data 310A may be acquired automatically by, for example, the machine learning module 304A in resolving or determining undetermined terms or terms associated with relatively lower accuracy measures (e.g., confidence scores, confidence intervals, or any other appropriate measures or metrics) in some embodiments. In some other embodiments, the active learning data 310A may be acquired by flagging and forwarding some terms that one or more data models cannot classify as terms of interest or cannot classify as terms of interest with sufficiently low accuracy measures to domain experts and further by funneling the opinions of the domain experts into a digital form of the active learning data 310A accessible by the machine learning module 304A. Like the plurality of data sets 308A, the active learning data 310A may also be persistently or non-persistently stored in a non-transitory storage medium 350A.

Figure 3B:
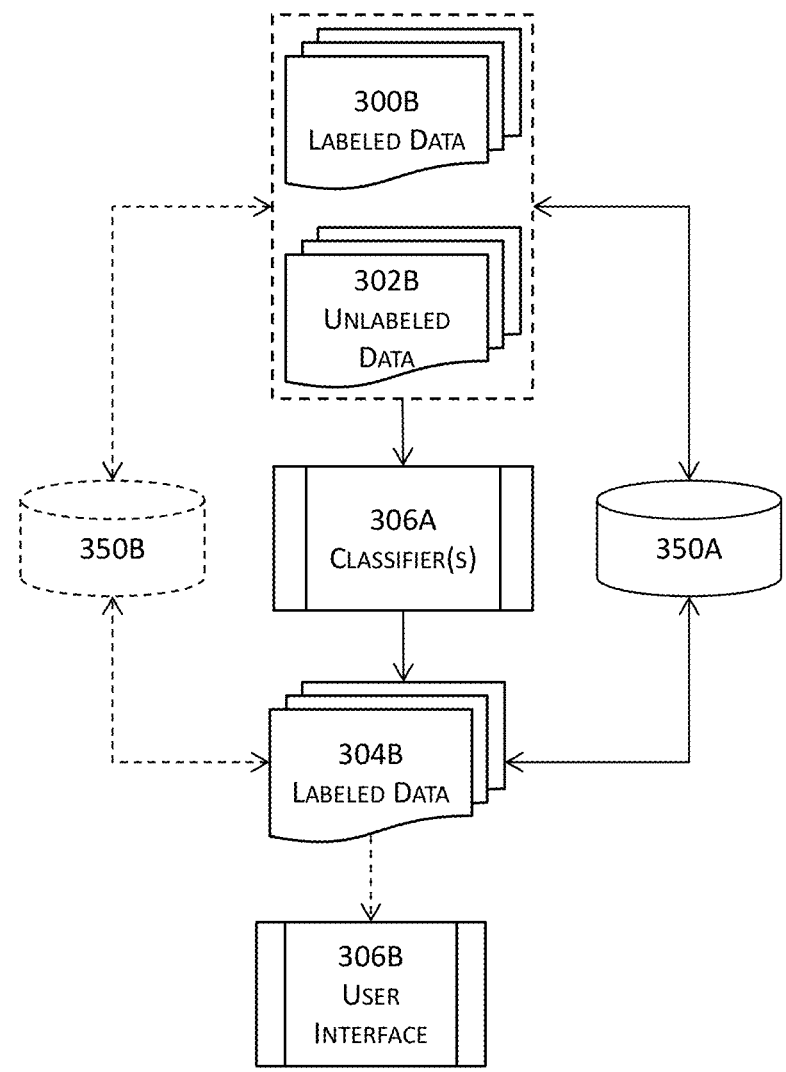
FIG. 3B illustrates another high level block diagram for classification of terms and helper items for software licensing or delivery models in one or more embodiments.

FIG. 3B illustrates another high level block diagram for classification of terms and helper items for software licensing or delivery models in one or more embodiments. More specifically, FIG. 3B illustrates the high level block diagram for one or more data models that identify terms of interest. In these embodiments, the one or more data models may identify unlabeled data 302B from, for example, the plurality of data sets 308A in FIG. 3A stored in the non-transitory computer accessible storage medium 350A or in another non-transitory computer accessible storage medium 350B. Unlabeled data includes the data in the plurality of data sets for which terms of interest have not been identified in some of these embodiments.

In some embodiments, labeled data 300B may also be provided to the one or more data models for the purpose of term of interest identification. Such labeled data 300B may be produced by, for example, outputs of one or more prior versions (e.g., before training) of one or more data models, domain experts, etc. The labeled data 300B may be generated by human reviewers or one or more generations of the one or more data models. For example, domain experts may manually identify and label some terms of interest from a set of digital contents of a software model to form labeled data (e.g., a partially labeled set of digital contents) in some embodiments. The labeled data 300B may include data that has been completely labeled with identified terms of interest and/or even the corresponding helper items in some embodiments and/or data that has only been partially labeled with some but not all of the identified terms of interest and/or even the corresponding helper items in some other embodiments.

This labeled data may be provided to one or more data models that further process the unlabeled portion of the labeled data based on the labeled portion provided by domain experts in these embodiments. In some of these embodiments, the one or more data models may process the labeled portion of the labeled data 300B to validate one or more previously identified terms of interest. For example, the labeled data 300B that was previously labeled by a first generation (e.g., a previous generation) of a data model may be processed by a second generation (e.g., a next generation) data model to validate whether the identified terms have been identified correctly as respective terms of interest by the first generation.

In some embodiments, a training data set (e.g., a set of data labeled with terms of interest), instead of domain expert inputs in the aforementioned example, may be provided to train the machine learning modules so that the machine learning modules may adjust its algorithms to generate one or more data models that further process the training data set to identify terms that match with those already labeled as terms of interest in the training data set. Once these one or more data models have been validated to generate accurate results for the training set, these one or more data models may receive unlabeled data 302B as inputs and process the unlabeled data 302B to identify terms of interest therefrom and to label the unlabeled data 302B into labeled data 304B.

In some other embodiments involving active training that is described below with greater details with reference to FIG. 3D, a first data model may also receive labeled data 300B that was processed by a prior version of the first data model or by another data model of the one or more data models. This first data model may be generated with some active training data (e.g., domain expert review results of prior identification results) to correct or fine tune the classification scheme of the prior version of the first data model. This first data model may then be used to process the labeled data 300B to identify one or more new terms of interest and/or to reclassify one or more terms of interest identified by the prior version of the first data model or the another data model as terms not of interest.

These one or more data models may then perform a term of interest identification process or analysis to identify terms of interest in the unlabeled data. More details about the term of interest identification process or analysis are described below. Upon or shortly after the identification of the terms of interest from the unlabeled data 302B, at least some of the unlabeled data 302B may be annotated, labeled, or associated (collectively labeled) with the identified terms to transform the unlabeled data 302B into labeled data 304B. For example, the terms identified as terms of interest may be assigned to or associated with a label indicative of their status as the terms of interest. A label may be a binary label indicative of whether a term is of interest in some embodiments and thus may need only one bit to store the label. In some other embodiments, a label may include or may be associated with some other information such as the accuracy measure, or any other pertinent information, etc. and thus may require multiple bits to store the label. The labeled data may be further processed (e.g., through the identification and linking of helper items) and presented to a user interface 306B.

Figure 3C:
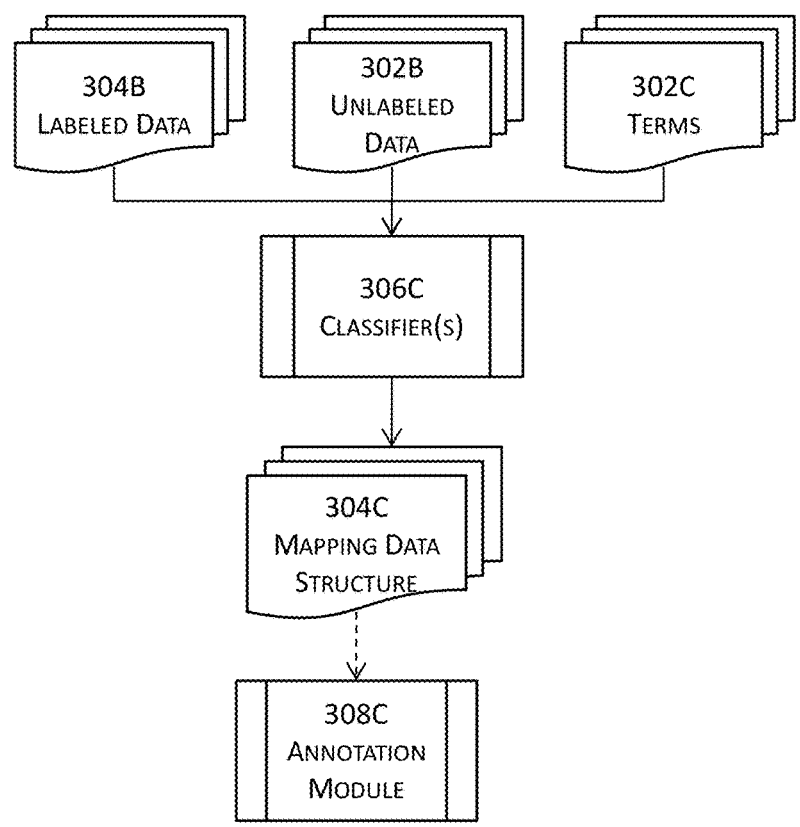
FIG. 3C illustrates another high level block diagram for classification of terms, identification of helper items, and annotation or labeling of data with identified or recognized terms for software licensing or delivery models in one or more embodiments.

FIG. 3C illustrates another high level block diagram for classification of terms, identification of helper items, and annotation or labeling of data with identified or recognized terms for software licensing or delivery models in one or more embodiments. More specifically, FIG. 3C illustrates a high level block diagram of a portion of a computing system to identify helper items for terms of interest and to link the terms of interest with their corresponding helper items. In these embodiments, one or more data models or classifiers (e.g., data models) may receive and process the identified terms of interest 302C, the unlabeled data 302B, and/or the labeled data 304B as inputs to identify one or more helper items for an identified term of interest.

It shall be noted that one or more sets of the aforementioned data (e.g., the labeled data 304B) may be entirely optional in this block diagram illustrated in FIG. 3C, and that the labeled data 304B may include data that is completely or partially labeled with, for example, identified terms of interest, identified helper items, or one or more accuracy measures or metrics, etc. The one or more data models or classifiers may then link or associate the one or more helper items with the term of interest and store the information about the link in a mapping data structure 304C. The information about the link or the mapping data structure 304C may be further processed by an annotation module 308C to label at least some of the unlabeled data 302B and/or the labeled data 304B.

It shall be noted that the one or more data models 306C may be identical to or different from the one or more data models or classifiers in FIG. 3B. In FIG. 3B, a data model (e.g., classifier, a data model, a transformed data model, etc.) receives and processes input data (e.g., the unlabeled data 302B) and identifies terms of interest from the inputs and optionally label the unlabeled data to form the partially or completely labeled data 304B. In FIG. 3C, a data model receives and processes inputs (e.g., the identified terms of interest 302C, the unlabeled data 302B, and/or the labeled data 304B) and generates outputs including helper items for the terms of interest. The data model in FIG. 3C may also generate or update the mapping data structure 304C including the information about the links between terms of interest and their corresponding one or more helper items. In some embodiments, a data model may be configured in such a way to perform both functions at different stages of the process flow. In some other embodiments, two different data models may be used for the identification of terms of interest (e.g., in the flow illustrated in FIG. 3B) and the identification of helper items (e.g., in the flow illustrated in FIG. 3C).

Strictly as a simplified example, a data model 306C may identify the term "imputed interest" as a term of interest in a Web page presented to users of an electronic tax return preparation and filing software model. A data model 306C may then process the inputs (e.g., the identified terms of interest 302C, the unlabeled data 302B, and/or the labeled data 304B) to identify a helper item for the identified term of interest "imputed interest" for an electronic tax return preparation and filing software model. For example, the data model 306C may process the inputs and find that one of the inputs includes a sentence "imputed interest refers to a portion of a future payment that is treated as interest if parties to the transaction do not provide a stated amount of interest at a rate acceptable to the IRS" by using, for example, pattern matching techniques. The data model may then identify the definition for the term of interest "imputed interest" to be "a portion of a future payment that is treated as interest if parties to the transaction do not provide a stated amount of interest at a rate acceptable to the IRS". This identified definition may be stored as a helper item object and may be further linked to the term of interest "imputed interest".

As another example, a data model 306C may identify the term "VAT" as a term of interest in a Web page presented to users of an accounting software model. A data model 106C may then process the inputs (e.g., the identified terms of interest 302C, the unlabeled data 302B, and/or the labeled data 304B) to identify a helper item for the identified term of interest "VAT". For example, the data model 306C may process the inputs and find that one of the inputs includes a sentence stating "VAT simply stands for Value Added Tax, a tax that is charged on most business transactions and is added by businesses in the price they charge for goods and services to the consumer" by using, for example, pattern matching techniques. The data model may then identify the definition for the term of interest "VAT" to be "Value Added Tax that is charged on most business transactions and is added by businesses in the price they charge for goods and services to the consumer". This identified definition may be again stored as a helper item object and may be further linked to the term of interest "VAT".

In the aforementioned examples, the helper items are generated from a portion of the contents in digital objects (e.g., files) by extracting the pertinent information from the digital objects and creating helper items therefor. In some other embodiments, the digital objects including the pertinent information may be identified as the helper items, and the terms of interest may be linked to these digital objects. In some other embodiments, the digital objects may be further textually or graphically annotated or emphasized so that when the terms of interest are clicked upon, the pertinent portion of the digital objects are automatically presented to the user with graphical or textual emphasis.

Strictly as an example of the process flows illustrated in FIGS. 3B-3C, a set of digital contents (e.g., files, Web pages, images, audio streams, etc.) may be identified for an electronic tax return preparation and filing software model. In some embodiments, only a smaller portion of the set such as the Web pages, help files, etc. presented to users will be processed with, for example, the flow illustrated in FIG. 3B to identify terms of interest therein. With the terms of interest identified from this smaller portion of the set of digital contents, the process flow illustrated in FIG. 3C may be executed to identify one or more helper items for an identified term of interest. In this flow for identification of helper items, the entire set of digital contents may potentially be processed.

For example, the specification, white papers, etc. that may not be exposed to users of the software model may be processed to identify helper items for the identified terms of interest. This process flow may exclude any digital contents from external sources (e.g., sources other than the entity developing or hosting the software model) in some embodiments. One of the purposes of processing the entire set of digital contents of a software model but not digital contents from external sources is to ensure the completeness of the set of digital contents for the software model.

In these embodiments, both the labeled data 304B (e.g., the smaller portion of the set of digital contents processed and hence labeled by the term of interest identification process) and the unlabeled data 302B (e.g., the remaining portion of the set of digital contents) may be provided to the one or more data models 306C in FIG. 3C. The identified terms of interest 302C that have been determined either by the process flow illustrated in FIG. 3B or by domain experts may also be provided to the one or more data models 306C so that the one or more data models 306C may reference these identified terms of interest in identifying their corresponding helper items and in linking a term of interest with its one or more helper items in the mapping data structure 304C.

Figure 3D:
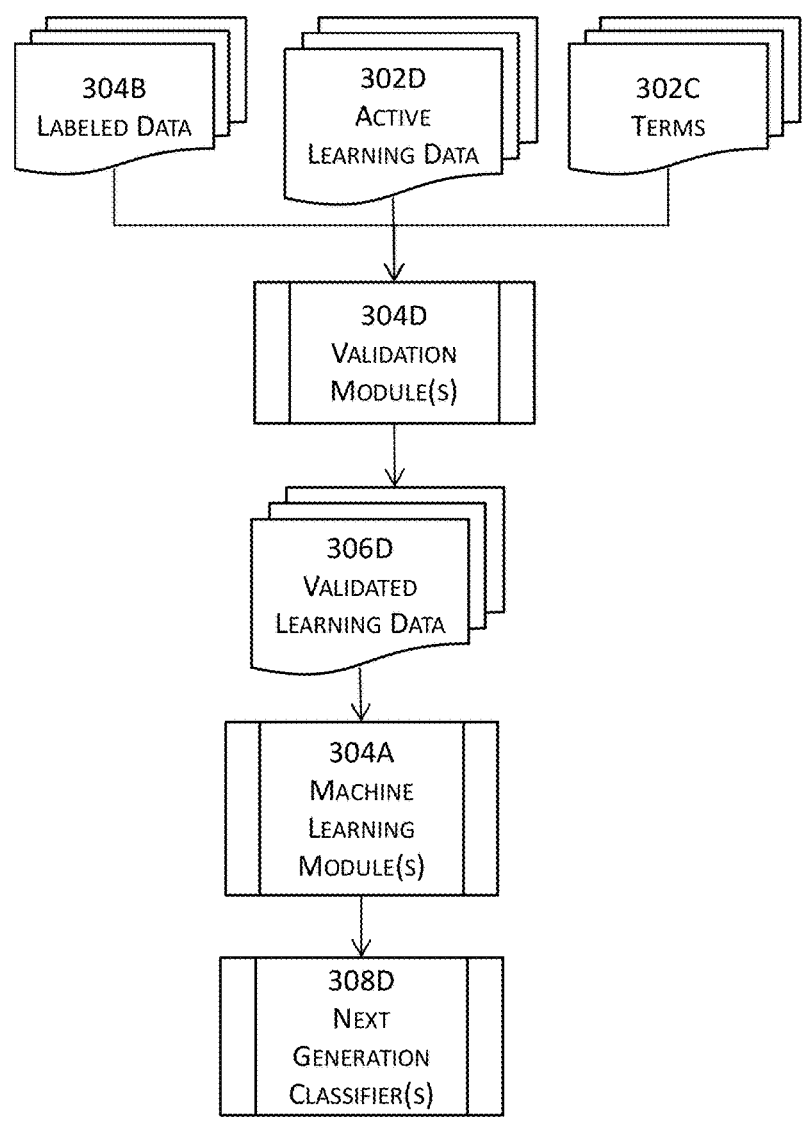
FIG. 3D illustrates another high level block diagram for training term classification modules for software licensing or delivery models in one or more embodiments.

FIG. 3D illustrates another high level block diagram for training term classification modules for software licensing or delivery models in one or more embodiments. In these embodiments, one or more sets of active learning data 302D, labeled data 304B, and a set of identified terms of interest 3102C identified from the labeled data 304B may be identified. These one or more sets of data may be used by one or more machine learning modules (e.g., 304A in FIG. 3A) for retraining one or more data models (e.g., the data models 306A for identifying terms of interest and/or the data models 306C for identifying helper items) to improve their accuracy and/or completeness of coverage.

In some embodiments, these one or more sets of data may be validated before they are used for training or retraining data models. One of the purposes of validating these one or more sets of data is to reduce less relevant or less useful data that, when used for training or retraining data models, may waste unnecessary computational resources or may skew or worsen the accuracy or coverage completeness of the data models. The validation process thus discards certain information or data pertaining to the identification of a term of interest and maintains the pertinent information or data as the validated learning data 306D.

Strictly as an example, the validation process may filter the one or more sets of data by ignoring data or information pertaining to terms of interest associated with sufficiently high confidence scores (e.g., larger than or equal to 0.75 on a 0 to 1 scale) as well as terms of interest with sufficiently low confidence scores (e.g., below 0.4 on the 0 to 1 scale). Terms of interest associated with sufficiently low confidence scores are more likely not of interest, whereas terms associated with sufficiently high confidence scores are more likely terms of interest. As a result, the information or data pertaining to these two categories of terms of interest has marginal values when used as learning data. The one or more validation modules 304D may retain the data or information pertaining to terms of interest associated with confidence scores between 0.4 and 0.75 to form the validated learning data 306D.

The validated learning data 306D may then be provided to one or more machine learning modules (e.g., 304A in FIG. 3A) that train or retrain one or more data models for the identification of terms of interest and/or for the identification of helper items therefor. For example, the machine learning modules (e.g., 304 in FIG. 3A) may use domain expert review results, user feedback, identification results generated by previous generations of data models, etc. to tweak the algorithms, formulae, rules, constraints, patterns, or any other suitable information referenced in the generation of the one or more data models into improved schemes that correctly identify certain terms as terms of interest or not of interest as reflected in the validated learning data 306D. These one or more machine learning modules (e.g., 304A in FIG. 3A) may then generate one or more next generation data models 308D with such improved schemes from machine learning with at least the active learning data 302D.

Figure 3E:
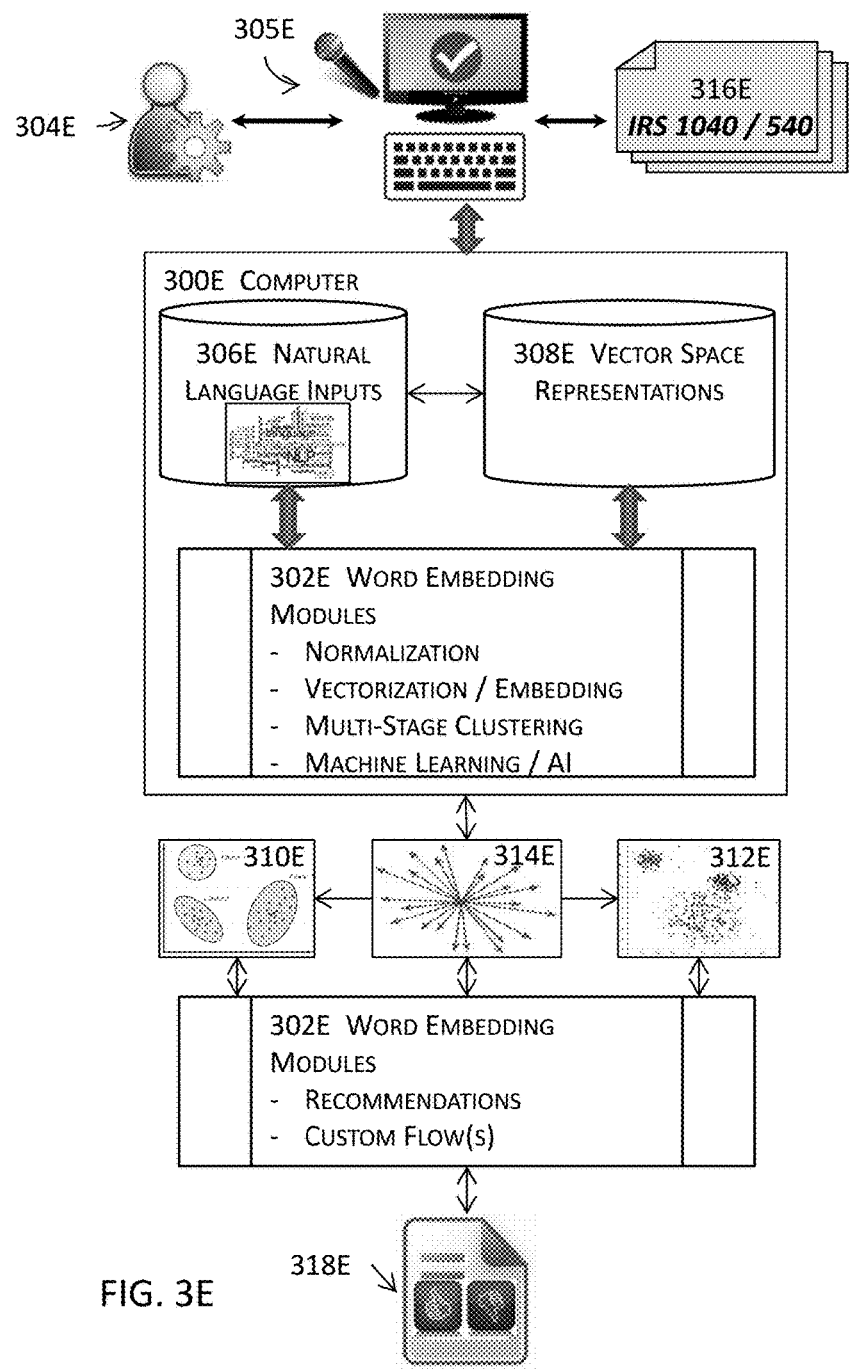
FIG. 3E illustrates another high level block diagram for classification of data for software licensing or delivery models in one or more embodiments.

FIG. 3E illustrates another high level block diagram for classification of data for software licensing or delivery models in one or more embodiments. In these embodiments, a user 304E accessing an electronic tax return preparation and filing software application delivery model may provide various pieces of information 316E in the form of natural language via an input device (e.g., a keyboard, a microphone, etc.) of a computing device 305E.

The electronic tax return preparation and filing software application delivery model may be a standalone installation that locally executes on the computer 300E in some embodiments. In some other embodiments, the electronic tax return preparation and filing software application delivery model may be hosted on a remote computer, on an Internet-based computing environment providing shared computer processing resources and data to computers and other devices on demand (e.g., in a cloud computing environment), or provided as a software licensing and delivery model in which software is licensed on a subscription basis and is centrally hosted (e.g., software as a service or SaaS). In these latter embodiments, the user 304E may access the electronic tax return preparation and filing software application delivery model via, for example, a browser on a user computing device operatively connected to the remote host via a computer network component.

The user 304E may be operating on or connected to a computing system 300E that includes or operatively connects to one or more word embedding or term embedding modules 302E. This computing system may be the computing device 305E when the electronic tax return preparation and filing software application delivery model is a standalone installation. The word embedding or term embedding modules 302E included or associated with the computer 300E may perform various word embedding or term embedding processes on natural language or free text inputs 306E (e.g., user inquiries) of a software application delivery model. These natural language or free text inputs 306E may be provided by a plurality of users accessing the software application delivery model. For example, the natural language or free text inputs 306E may include the descriptions of businesses or professions in Schedule C of Form 1040 when using an electronic tax return preparation and filing software application.

These word embedding or term embedding processes may include, for example, normalization of the natural language inputs into normalized tokens such as characters, words, phrase, sentences, or even documents. These normalized tokens may be further embedded into a vector space. More specifically, one or more word embedding or term embedding processes may transform these normalized tokens into corresponding vector representations 308E where closer vector representations correspond to more similar normalized tokens and hence more similar natural language inputs (306E).

These word embedding or term embedding modules 302E may further classify the natural language or free text inputs 306E into a plurality of clusters. These classification processes may be performed independently of each other or in a hierarchical manner. In the aforementioned examples, the business clusters and expense categories may be performed independently of one another to determine the clusters for a plurality of users in some embodiments. In some other embodiments, such clustering may be performed in a hierarchical, multi-stage manner where a plurality of descriptions of businesses or professions may be first clustered into a plurality of business clusters.

The normalization, vectorization, and clustering processes may be performed offline in some embodiments due to the vast amount of natural language inputs (306E) to process and thus may not be suitable for storage or processing on a user computing device. The results of the normalization, vectorization, and clustering processes may nevertheless be stored locally on a user's computing device for a locally executing electronic tax return preparation and filing software application delivery model in some embodiments. In some other embodiments, the results of the normalization, vectorization, and clustering may be stored remotely for user computing devices to access via one or more computer networks.

With these vector representations determined, these processing results of the one or more word embedding or term embedding modules 302E may be further utilized by a software application licensing or delivery model. In the aforementioned example involving tax returns, a specific user 304E may access an electronic tax return preparation and filing software application delivery model and submit a particular inquiry 316E via an input device (e.g., a computer mouse, a touch interface, a virtual or physical keyboard, a microphone, etc.) of the computing device 305E.

This specific inquiry 316E may be similarly processed by one or more word embedding or term embedding modules 302E that execute locally in a standalone installation or remotely in a hosted or cloud environment. For example, this specific inquiry 316E may be normalized into normalized description which may be further transformed into a specific vector representation in the same vector space 314E that now includes the specific vector representation with other vector representations for the descriptions from a plurality of users of the electronic tax return preparation and filing software application licensing or delivery model.

This specific inquiry 316E of the specific user 304E may then be classified into one or more classes 310E. One or more actions 312E (in one or more classes) corresponding to these one or more classes 310E may also be identified. These one or more actions 312E may include, for example, the action classes that are associated with the one or more classes 310E.

At least one of these one or more actions 312E may be presented to the specific user 304E in a variety of different manners such as a customized sub-flow 318E in the overall flow of the specific user's interaction with the software application licensing or delivery model. A customized or personalized software application flow may also be constructed with one or more of these expense clusters for the specific user 304E. Because these one or more actions 312E are identified from one or more classes 310E to which the specific user is determined to belong based on the specific inquiry 316E provided by the specific user 304E, these one or more actions may thus represent recommended actions or candidate actions in response to the specific inquiry 316E submitted by the specific user 304E.

If the specific user 304E also provides additional natural language inputs (e.g., additional inputs in response to automatically generated customized chat question(s)), these additional natural language inputs may also be similarly normalized, vectorized, and clustered. A data model may then classify the specific inquiry 316E while referencing these additional inputs as described above.

Figure 4A:
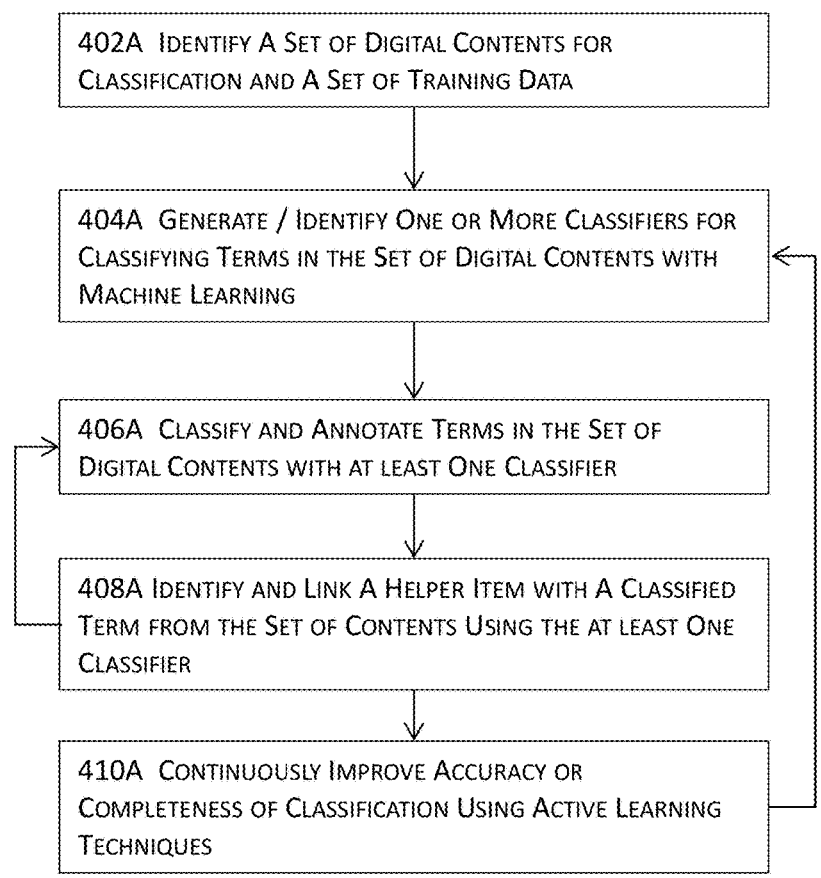
FIG. 4A illustrates a high level block diagram for identification and classification of terms in some embodiments.

FIG. 4A illustrates a high level block diagram for identification and classification of terms in some embodiments. In some embodiments, a set of digital contents may be identified at 402A for a software application licensing or delivery model. In some of these embodiments, a set of training data may also be identified at 402A. This set of training data may be used to train one or more machine learning modules prior to employing these one or more machine learning modules to process the set of digital contents. The software model may include a software application or suite hosted on a remote server or in a cloud-based or Internet-based platform, a software application or suite separately and independently installed on a computing system (e.g., a client computing system), or a software model that is centrally hosted and licensed on a subscription basis such as a software as a service (SaaS). The set of digital contents may include unlabeled digital data, labeled digital data, partially labeled data, or any combinations thereof.

The software model may include the functionalities of preparing and filing electronic tax returns in some embodiments or the functionalities of fulfilling accounting needs or purposes in some other embodiments. The set of digital contents may include any presentations or views of the software model presented in a user interface interacting with users, online and/or offline documentation, help files, various data from database queries and/or inquiries, various data provided by customer feedback modules, customer retention modules, and/or customer development modules, data from crowdsourcing, data from past or real-time usage of the software model by users, etc. The set of digital contents may be in various different formats that are not intended to limit the scope of this disclosure and may include, for example, one or more characters, one or more symbols, one or more words, one or more phrases, one or more sentences, one or more paragraphs, audio streams, images, or any combinations thereof, etc. More details about identifying digital contents are described below.

One or more data models may be identified or generated at 404A for identification of terms of interest and/or helper items with machine learning techniques and the set of digital contents identified at 402A. For example, if these one or more data models have been previously generated, these one or more previously generated data models may be identified at 404A. Otherwise, these one or more data models may be generated anew at 404A. These one or more data models may be subsequently employed to identify terms of interest in some embodiments. In some of these embodiments, these one or more data models may be further employed to identify helper items for the identified terms of interest, whereas one or more additional data models may be generated for identifying helper items for the identified terms of interest. More details about generating one or more data models are described below.

One or more terms of interest may be classified at 406A from at least a portion of the set of digital contents with at least one data model of the one or more data models generated at 404A. In some embodiments, these one or more terms identified as one or more terms of interest may be further annotated or labeled in the set of digital contents at 406A. For example, one or more data models may be employed to process and identify terms of interest from digital contents that may be presented in a user interface to users of the software application licensing or delivery model. Because these digital contents may be presented to users of the software model, the identification of terms of interest that may hinder the user experience with the software model and the subsequent identification of helper items and linking between these terms of interest and their corresponding helper items may improve the user experience as well as the functioning (e.g., the correctness of the functioning and results of the software model). In some embodiments, a term of interest in a digital content may also be annotated with one or more measures or metrics that are described below.

One of the advantages of these techniques described herein is the use of data models to identify terms of interest as well as helper items through machine learning techniques such that no subjective determinations by humans are needed in the identification of terms of interest or the identification of helper items from the received set of digital contents. This advantage is especially beneficial because a term may be considered as a term of interest to one user but not to another user due to different backgrounds of the two users (e.g., different education, different professions, etc.) Also, one person may classify a term as a term of interest when, for example, the person is not familiar with the term, whereas another person may not classify the same term as such. These techniques described herein not only eliminate the subjective determinations by humans but also identify terms of interest as well as their corresponding helper items dynamically while accounting for variations in the characteristics of users. As described elsewhere in the application, these data models may be subsequently transformed into real-time data models that are employed to classify digital contents (e.g., users' inquiries) in real-time or nearly real-time.

One or more helper items for an identified term of interest may be identified at 408A from the set of digital contents using at least one of the data models generated at 404A. As described above, the identification of terms of interest and the identification of helper items utilize different techniques to process different sets of inputs in order to generate different outputs and may be performed with the same one or more data models in some embodiments or with different data models in some other embodiments. The one or more identified helper items may be linked with the corresponding term of interest at 408A, and a data structure may be used to store information about the links and to facilitate the construction of views or presentations of the software model to the users.

In some embodiments, helper items are identified only from the set of digital contents that are with the control of the entity developing or hosting the software model but not from any external sources such as any third-parties. In some of these embodiments where no helper items may be identified from such set of digital contents for a term of interest, the system described herein may flag and forward this term of interest to, for example, a domain expert. The feedback from the domain expert may then be transformed into a part of the set of digital contents, also without referencing external contents from sources outside the entity. In some other embodiments, these techniques may separately generate or invoke one or more different models to access external sources, instead of using the one or more data models to access these external sources although these one or more data models are nevertheless capable of accessing such external sources to retrieve the needed information for helper items.

The flow illustrated in FIG. 4A may return to 406A if there are more terms of interest for which helper items have not been identified. Otherwise, the accuracy or completeness of the one or more data models may be continuously improved at 410A by using active learning techniques. In some embodiments, a data model may be processed by a conversion or transformation module into a real-time data model every time the data model is updated. A data model may have previously identified a term as a term of interest and provided one or more helper items therefor. During subsequent usage of the software model, the usage patterns from users nevertheless show that this term of interest has a relatively lower click-on rate. That is, relatively fewer users have accessed the one or more helper items for this term of interest to gain further information. In this example, the usage pattern information, the information about the users who actually accessed the one or more helper items, or any other pertinent information may be group as active learning data that may be further forwarded to the machining learning modules to adjust the data model generation processes.

Figure 4B:
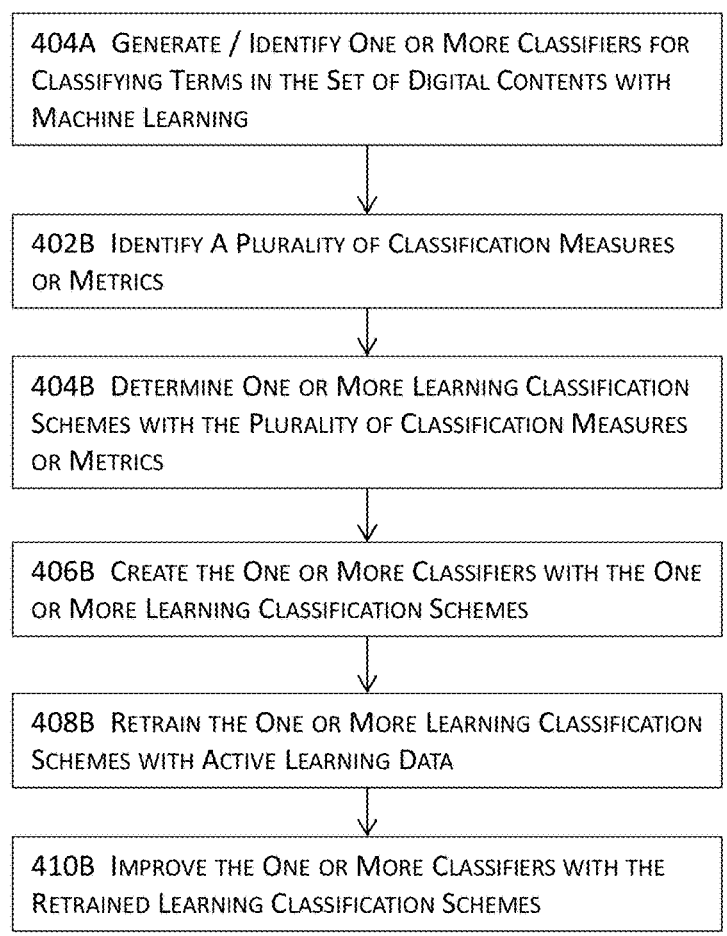
FIG. 4B illustrates a more detailed block diagram for identification and classification of terms illustrated in FIG. 4A in some embodiments.

FIG. 4B illustrates a more detailed block diagram for identification and classification of terms illustrated in FIG. 4A in some embodiments. More specifically, FIG. 4B illustrates more details about generating one or more data models (404A) of FIG. 4A. In these embodiments illustrated in FIG. 4B, a plurality of classification measures or metrics may be identified at 402B. These classification measures or metrics may include, for example, the frequency of a word appearing within N words of another word, the frequency of appearance or familiarity of a term in the corpus generated from the set of digital contents or from another corpus (e.g., SUBTLEX corpus, the Brown corpus by Francis and Kucera, the American Heritage Word Frequency Book, etc.), or any other suitable measures or metrics.

These classification measures or metrics may optionally include the number of definitions of a term from one or more dictionaries. For example, a term having more different definitions may be associated with a higher score for its complexity status because such a term may require users to become aware of more definitions and to discern one possible definition from the other definitions and is thus more likely to cause confusion or understanding issues.

These complexity measures or metrics may optionally include the context in which a term appears. The same term appearing in a more familiar context is less likely to raise confusion or understanding issues and hence classification issues than the same term appearing in a less familiar context. This contextual measure or metric may thus be tied to the general familiarity of a term in a specific context. For example, a term with M preceding words or characters and/or N following words or characters that corresponds to a higher probability or frequency (e.g., a frequency value generate by an n-gram model) may indicate that this specific context in which the term is in may reduce the probability of the term being incorrectly classified. Consequently, the context may be associated with a higher confidential level or score for the classification status of the term.

These classification measures or metrics may optionally include the morphology or the number of morphemes of a term. For example, a term having fewer morphemes may be may be associated with a relatively lower confidential level or score for its classification status than a term having more morphemes because the general meanings of morphemes are often understood, and more morphemes in a term may thus provide more information for users to piece the general meanings of these morphemes together to derive the meaning of the term.

These classification measures or metrics may optionally include one or more of the number of synonyms, the number of antonyms, the number of hypernyms, the number of hyponyms, or any combinations thereof. For example, a term corresponding to a larger number of synonyms having different meanings may be associated with a lower confidential level or score for its classification status because such a term may be more likely to cause classification issues than other terms having a smaller number of synonyms due to more synonyms for users to correlate with the term.

The aforementioned classification measures or metrics are provided as non-limiting examples, and each measure or metric may be assigned with a range of scores to accommodate the possible variations in a single classification measure or metric. In addition or in the alternative, classification measures or metrics may or may not be independent of each other. For example, one classification measure or metric of a term may also influence another classification measure or metric the same term. In some embodiments, the machine learning modules may construct a data model while assuming that the considered classification measures or metrics are independent of each other. In some other embodiments, the machine learning modules construct a data model while considering the non-linearity or dependency of the considered classification measures or metrics.

With the plurality of classification measures or metrics identified at 402B, one or more learning classification schemes may be determined with one or more of the plurality of classification measures or metrics at 404B. The machine learning modules may account for one or several of the aforementioned classification measures or metrics in the determination of the one or more learning classification schemes in a variety of ways. For example, the machine learning modules may account for multiple classification measures or metrics on an individual basis where each classification measure or metric individually indicates whether the term is to be classified in a certain way. The final determination may be based on, for example, the majority of the individual determinations of the plurality of classification measures or metrics.

As another example, the machine learning modules may construct a first data model by arranging a first number of classification measures or metrics in a linear combination where each classification measure or metric corresponds to its own coefficient or weight. As another example, the machine learning modules may construct a first data model by arranging a first number of classification measures or metrics in a non-linear combination where one classification measure or metric may exhibit a non-linear behavior or may affect one or more other classification measures or metrics. The coefficients, weights, and/or the non-linear behaviors of the classification measures or metrics are the targets of the machine learning techniques that iteratively use the set of digital contents and/or active learning data to refine or fine tune the coefficients, weights, and/or the non-linear behaviors of the classification measures or metrics for one or more data models to improve the accuracy and/or completeness of the one or more data models.

With the one or more learning classification schemes determined at 404B, one or more data models may be generated at 406B with the one or more learning classification schemes. These one or more data models may then be executed to identify and classify terms from the set of digital contents. The identification and classification of a term involves the computation of classification confidence levels or scores of the accommodated classification measures or metrics.

To reduce the consumption of computational resources, the machine learning modules may optionally reduce the set of digital contents or the corpus into a reduced set of digital contents or reduced corpus by using at least one of the plurality of classification measures or metrics. For example, the machine learning modules may adopt various filtering processes and/or tweak the hierarchical application of rules while skipping a plurality of rules, etc. These reduction techniques will be described in greater details below, to reduce the amount of data to be processed. As another example, the machine learning modules may identify any terms that correspond to a sufficiently high frequency of appearance (e.g., the definite article "the", the indefinite article "a" or "an", certain pronouns such as "he", "she", "I", etc.) and prohibit these terms from being classified. In these embodiments, the size of the corpus or the set of digital contents and hence the number of terms are effectively reduced to conserve processor cycles for identifying complex terms and memory footprint to accommodate the terms to be processed.

In some other embodiment, the machine learning modules may reduce the corpus or the set of digital contents by identifying terms to be classified, rather than eliminating terms that will not be further processed. For example, the machine learning modules may identify terms that have low frequency of occurrence or appearance below a predetermined threshold value. As another example, the machine learning modules may identify terms that have their respective numbers of definitions below a threshold number. In these aforementioned embodiments, a data model simply look up the classes for these terms, rather than performing classification tasks on these terms. In some other embodiments, the machine learning modules may reduce the corpus or the set of digital contents by both eliminating terms not to be further processed and by identifying terms that will be further processed.

The one or more learning classification schemes may be retrained at 408B with active learning data. In these embodiments, the active learning data may be acquired by flagging and forwarding some terms that one or more data models cannot classify or cannot classify with sufficiently high confidence level or score to domain experts and further by funneling the opinions of the domain experts into a digital form of the active learning data. The machine learning modules may then adjust one or more of the classification schemes to better fit the active learning data. The one or more data models may be continuously improved at 410B with the retrained learning classification schemes.

Figure 4C:
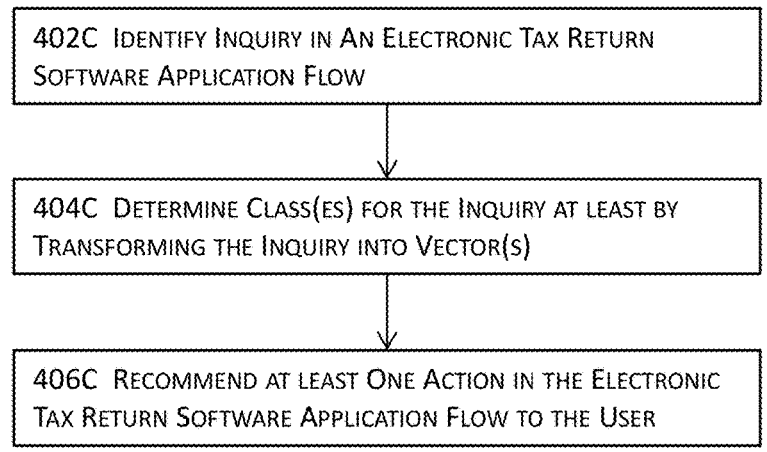
FIG. 4C illustrates a high level block diagram for classification of data in some embodiments.

FIG. 4C illustrates a high level block diagram for classification of data using an electronic tax return software application licensing or delivery model as an example in some embodiments. In these embodiments, user inquiry may be identified at 402C in a software flow of an electronic tax return software application. The user inquiry may include any questions expressed in free text or natural language and may be provided by the user in the software flow of the electronic tax return software application.

One or more classes into which the specific user inquiry may be classified may be determined at 404C for the specific user. A class is determined by processing the inquiry with word embedding or term embedding techniques and thus corresponds to a class of similar inquiries based at least in part upon the similarity among these inquiries. More details about classifying inquiries or information in general are described below with reference to FIGS. 4D-4E.

At least one action associated with the one or more classes determined at 404C may be recommended or provided at 406C to the specific user in the electronic tax return software application. This at least one action may be considered as a personalized action for the specific user because this at least one action is associated with a class of similar inquiries that includes the specific user inquiry.

A class for the inquiry may correspond to a plurality of actions that may be optionally ranked according to one or more criteria. For example, recommended actions may be ranked based on the percentage or number of similar users' inquiries (e.g., inquiries belonging to the same class) that have been reflected as helpful or well accepted. Other criteria such as domain expert reviews, etc. may also be used to rank the recommended actions to reflect the corresponding significance of these recommendations in response to users' inquiries. For example, recommended actions may be ranked based on a weighted combination of a plurality of criteria (e.g., a percentage or a number of identical or similar inquiries in the class, etc.)

The recommended actions or the class thereof described so far may be selected from a plurality of actions associated with a class in some embodiments. In other embodiments, a recommended action or the class thereof may be generated based on another recommended action that is provided by a user or recommended by these techniques described herein. For example, these techniques may recognize that a user adopted, either sua sponte or via a recommendation by these techniques described herein, certain actions in the user's interaction with the software application licensing or delivery model after submitting the inquiry. These certain actions adopted by the users may be considered as recommended actions in some embodiments.

These techniques may further inquire (e.g., by a custom, personalized flow or in a pop-up window, etc.) into whether one or more other recommended actions may or should be presented. These one or more recommended actions may be identified from the classification results in some embodiments. For example, these techniques may identify these one or more other recommended actions from one or more classes a percentage of which corresponding to similar or identical inquiries or presented with the recommended action. In other embodiments, these one or more other recommended actions may be identified by determining the similarity scores of these other one or more other recommended actions with respect to the recommended action.

Yet in some other embodiments, such one or more other recommended actions may be identified from one or more predetermined data structures listing a plurality of recommended actions that are often induced by the presence of another recommended action. In some other embodiments, these techniques described herein may accommodate additional information to determine the recommended actions.

For example, the inquiry identified at 402C may include specific information about the specific user, and this specific information may provide especially distinguishing information about this specific user. This especially distinguishing information may be used in determining the recommended actions or classes thereof even though the recommended actions are not among the highest ranked recommended actions for the class into which the specific inquiry is classified.

As another example, the specific inquiry may be classified into a class by using a smaller portion of the inquiry while the inquiry identified at 402C may include the other portion that has not been used in classifying the inquiry. In this example, this other portion of information in the inquiry may be further used to adjust the classification results and/or the recommended actions determined at 404C or to derive one or more other recommended actions in addition to or in the alternative of the recommended actions determined by using the smaller portion of the inquiry.

One of the objectives of the word embedding or term embedding techniques is to conserve computational resources in determining various clusters and the recommended expense clusters or personalized software application flow for the same software delivery model. For example, in classifying inquiries and determining recommended actions, these techniques extensively trim down the size of corpora for various inquiries and optimize the word embedding or term embedding modules in at least their iterative training and updating various entries in one or more data structures to save computational resource requirement of memory footprint as well as processor cycles.

In some embodiments, a personalized software application flow including one or more personalized flow node may be constructed based on one or more classes determined at 404C for the inquiry or one or more recommended actions determined at 406C. More specifically, depending on how the specific inquiry is classified and/or how the one or more recommended actions are determined for the inquiry, one or more content propagation flow nodes, one or more decision nodes, etc. may be constructed.

A decision node may be constructed to apply one or more tests that determine whether additional information or actions for this specific user. For example, an interview screen or a chat screen may be constructed and conducted by various software modules described herein to as the user to provide additional inputs.

If the specific user provides additional input in the decision node, a content propagation node may be further generated to initiate actions, to propagate helpful contents, and to present the actions and the contents to the specific user. For example, a content propagation flow node may be further presented to the user as a follow-up interview or chat screen to inquire into specific information about what a data model has determined to be missing in reaching a deterministic classification result.

In some embodiments, a personalized action node may be generated to either ask a user to take one or more actions or to perform one or more actions on behalf of the user automatically. In addition or in the alternative, a personalized flow may be personalized for a specific user in some embodiments or personalized for a specific business entity or even a specific industry to which a specific user is determined to belong.

In some embodiments, various techniques described herein are configured to reduce or minimize the amount of information a user needs to provide to produce an accurate electronic tax return while accurately classifying users' inquiries and recommending appropriate actions to fulfil the users' requests. To this end, some embodiments may utilize various pre-fabricated templates each including all the required information for correctly and completely filing a tax return but the specific information that only the user is aware of but cannot be derived from any other information provided by the user or from other publicly available sources. These embodiments may then populate such specific information into one or more fields in the pre-fabricated templates and complete the electronic tax return or at least the corresponding portion accordingly.

Figure 4D:
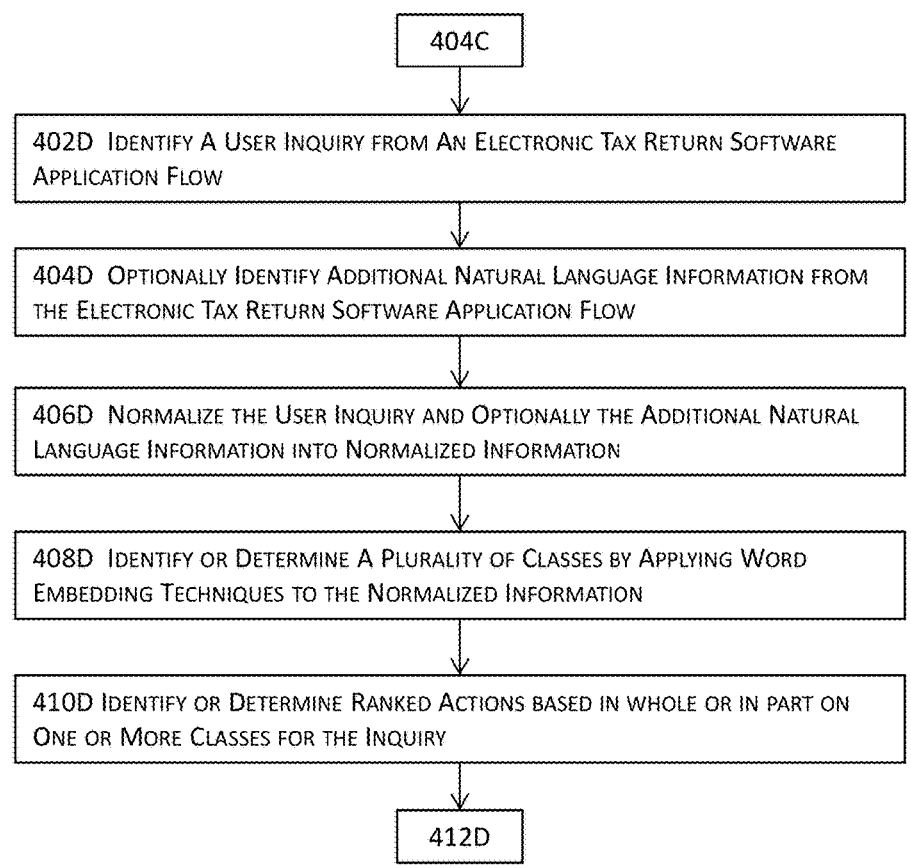
FIGS. 4D-4E jointly illustrate more details about a portion of the block diagram for classification of data illustrated in FIG. 4C in some embodiments.
Figure 4E:
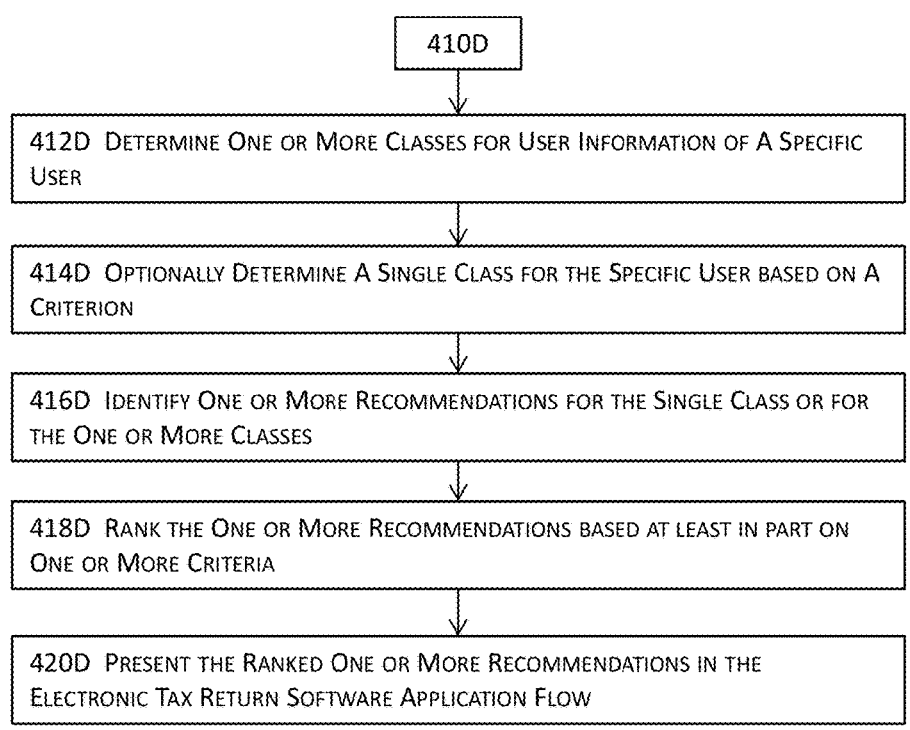

FIGS. 4D-4E jointly illustrate more details about a portion of the block diagram for classification of data illustrated in FIG. 4C in some embodiments. More specifically, FIGS. 4D-4E jointly illustrate more details about the determination of classes for a user's inquiry. In these embodiments illustrated in FIGS. 4D-4E, a user inquiry may be identified at 402D from an electronic tax return software application licensing or delivery model.

The user inquiry may include, for example, a question about how to fill a certain part of a tax form (e.g., Field A "Principal business or profession, including product or service" of Schedule C, Form 1040, 1040NR, or 1041, the "organization's mission" in Part III-(1) of Form 990, the sections entitled "Business or activity to which this form relates" and "Description of property" in Item 6, Part I of Form 4562, the section entitled "Description of donated property" in Part I of Form 8283, etc.) Such a user inquiry may be aggregated and stored in a central repository such as a single data structure in some embodiments or in multiple linked data structures.

For example, the user inquiry identified at 402D may be stored in a single database including a user column that stores unique identifiers or employer identification number (EIN) of a plurality of users where each unique identifier corresponds to, for example, description business or profession in a first column, description of expenses in a second column, identifications of or links to one or more user clusters to which the user may be classified in a third column, identifications of or links to one or more expense categories for the particular user or for the one or more user clusters in a fourth column, any other information provided by the user, any information derived from other information or data, or any other suitable information in some embodiments. The unique user identifiers (or EIN) may be used as the primary key of the database for database manipulations and operations.

In some other embodiments, the aforementioned information or data may be stored in a plurality of data structures that are linked by, for example, the unique user identifications (e.g., the tax identification numbers) that may also serve the function of keys or indices for additional operations) in some other embodiments. Such additional information may include any information provided by users in natural language and is not used in determining user clusters.

Optionally, additional information that is also expressed in natural language may also be identified at 404D. This addition information optionally identified at 404D may be further used to verify, fine tune, or modify the classes and/or the recommended actions or classes thereof. For example, such additional information may be similarly processed with word embedding or term embedding techniques as the inquiry for classification purposes to determine the accuracy of the classification results and/or the recommended actions for the inquiry or to generate one or more additional classes and/or recommended actions for the inquiry in place of or in addition to existing classes and/or recommended actions. In some embodiments, such additional information may include any natural language or free text entries provided in any tax forms, any statements that are required by various tax forms and are provided by users, etc.

The user inquiry and optionally the additional natural language or free text information may be normalized into normalized information at 406D. Normalization of the inquiry transforms the tokens (e.g., characters, words, phrases, sentences, paragraphs, or even documents) in the inquiry into a normal, canonical, or standard (collectively standard) form that uniquely represents the token as well as one or more other equivalent tokens. For example, all characters in the data set may be mapped to the Unicode expression; letters may be transformed into the lower case; different tenses of the same verb (e.g., fly, flies, flew, flown) may be converted into the same tense (e.g., fly); and/or singular and plurality tokens may be transformed into the same form (e.g., singular); etc. Normalization thus not only transforms tokens into standard forms but also reduces the size of the data set due to, for example, the transformation of various tenses of verbs into the same tense and transformation of plural nouns into singular forms.

In addition or in the alternative, one or more reduction techniques may be applied to the data set or the normalized data set to further reduce the size. For example, punctuations may be removed. In some embodiments, one or more stop or function words or phrases (e.g., auxiliary verbs, some pronouns such as which, what, I, you, she, he, we, etc.) and/or one or more lexical words or lexical phrases that have little or ambiguous meaning may be filtered out from subsequent processes such as vectorization and clustering. Names of named entities (e.g., New York Times as the newspaper) may also be optionally extracted although the subsequent word embedding or term embedding processing may nevertheless learn these names. These filtered out words or phrases may be determined not to add value or usefulness. Stop or function words and phrases contribute primarily to the grammatical structures of tokens, rather than the meanings or contents thereof.

A plurality of classes for a plurality of inquiries may be identified (if already existing) or determined (if not yet existing) at 408D by applying word embedding or term embedding techniques to the normalized information and normalized inquiries. In some embodiments, the application of word embedding or term embedding techniques to the normalized information transforms the tokens in the normalized information into vector representations in a vector space.

The word embedding or term embedding techniques transform more similar tokens in the normalized information into vectors representations that are in closer proximity in terms of the respective directions and magnitudes of these vector representations but not necessarily in terms of their respective origins in the vector space.

A plurality of recommended actions may be identified (if already existing) or determined anew (if not yet existing) at 410D for the plurality of classes. These recommended actions may be ranked. In some embodiments, each class is separately processed to determine one or more recommended actions therefor. In these embodiments, the natural language or free text inquiries submitted by users may be identified and similarly normalized, vectorized, and clustered into one or more classes. In some other embodiments, a plurality of recommended actions may be determined for the plurality of classes as a whole. In these latter embodiments, the natural language or free text inquiries or additional information provided by users in all of the plurality of classes may be identified altogether and similarly normalized, vectorized, and classified for the plurality of inquiries as a whole.

Acts 402D through 410D determine the plurality of classes and the plurality of recommended actions for a plurality of users of an electronic tax return preparation and filing software application licensing or delivery model. These classes may be determined by processing historical data of one or more prior versions of the electronic tax return preparation and filing software application delivery model. Some embodiments may further update such classes with the current information of the current version of the electronic tax return preparation and filing software application delivery model. Each class corresponds to one or more recommended actions that may be further ranked. The plurality of classes and the plurality of recommended actions identified or determined above may be used to respond to various inquiries submitted by specific users in their interaction with the electronic tax return preparation and filing software application delivery model.

At 412D, one or more classes may be determined for the user inquiry of a specific user identified at 402D. A single class for the specific inquiry may be optionally determined at 414D based in part or in whole upon a criterion. For example, the single class may be determined via validation by the specific user or by using other information (e.g., additional natural language or free text inputs provided by the specific user in the electronic tax return preparation and filing software application delivery model) that may be similarly processed by word embedding or term embedding techniques to determine the single class that better or best fits the user's specific inquiry. For example, similarity scores (e.g., a metric as measured by cosine similarity) may be determined between such other information and the plurality of classes (e.g., between such other information and the respective exemplars of these one or more business clusters). Alternatively, distance values between the vector representation of such other information and those of respective exemplars of the plurality of classes may be determined to select the single class for the specific user's inquiry.

One or more recommended actions may be identified at 416D for the one or more classes or the optionally determined single class for the specific user's inquiry. Because a plurality of recommended actions has been determined for a plurality of users at 410D, these one or more recommended actions may be selected at 416D from the results of 410D for each class of the one or more classes (e.g., selecting top N recommended actions for each class) determined at 410D or the single expense category optionally determined at 414D.

These one or more recommended actions identified at 416D may be optionally ranked at 418D based on one or more criteria in an identical or substantially similar manner as that described above. Criteria such as one or more weighted combinations of a plurality of criteria may be used to rank the recommendation actions to reflect the corresponding significance of these recommendation actions for users' inquiries. At least one of the one or more recommended actions may then be presented at 420D as a recommended action in response to the specific user inquiry in the electronic tax return software application flow.

Figure 5A:
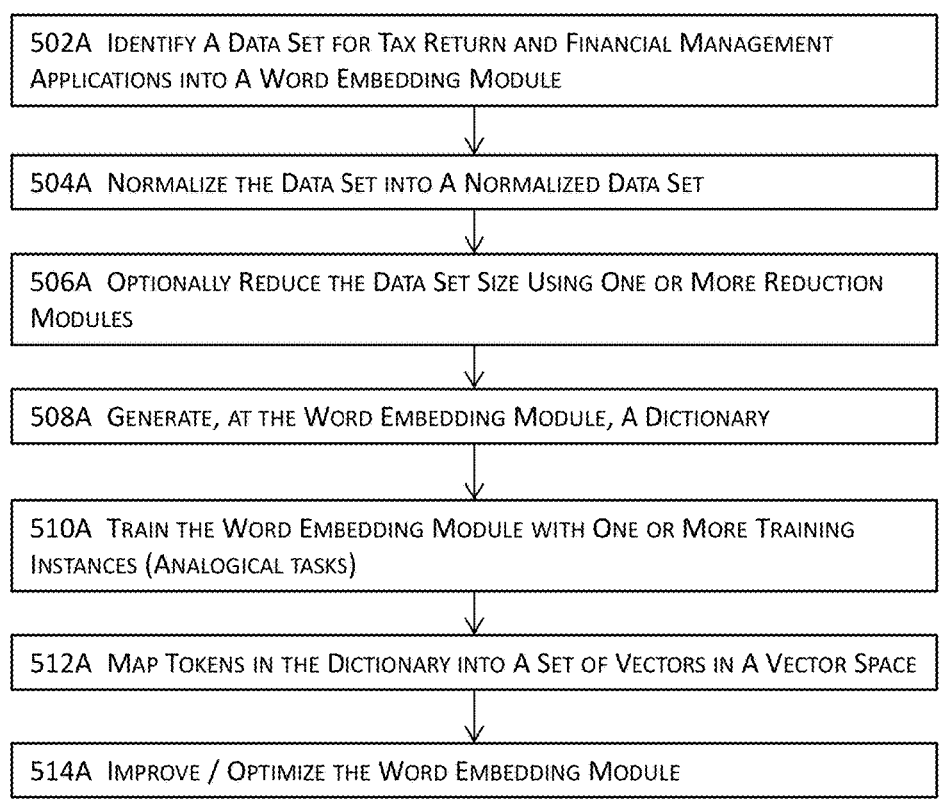
FIG. 5A illustrates a more detailed block diagram for implementing cluster-based processing of digital forms with word embedding techniques or term embedding techniques in one or more embodiments.

FIG. 5A illustrates a more detailed block diagram for implementing cluster-based processing of digital forms with word embedding or term embedding techniques in one or more embodiments. More specifically, FIG. 5A illustrates more details about the normalization and vectorization aspects of a word embedding or term embedding module. In these embodiments, a data set including natural language tokens (e.g., characters, words, phrases, sentences, paragraphs, and/or documents) for a plurality of users may be identified as an input to a word embedding or term embedding module at 502A. As described above, users may include natural persons, entities such as corporate entities, or a combination of one or more natural persons and one or more entities.

The example flow illustrated in FIG. 5A transforms the data set or a reduced version thereof into vector representations in a vector space where more similar language tokens are transformed into vector representations in closer proximity of each other in the vector space having a plurality of dimensions. The data set may include a large number of tokens (e.g., billions of words, millions of phrases, etc.) some of which may not necessarily be useful even when transformed into vector representations. On the other hand, vectorizing the data set requires computational resources that are proportional to the product of the number of tokens to be vectorized and the degrees of freedom. The data set may thus be normalized at 504A into a normalized data set and optionally reduced in size at 506A by using one or more reduction modules.

Normalization of the data set transforms the tokens in the data set into a normal, canonical, or standard (collectively standard) form that uniquely represents the token as well as one or more other equivalent tokens. For example, all characters in the data set may be mapped to the Unicode expression; letters may be transformed into the lower case; different tenses of the same verb (e.g., fly, flies, flew, flown) may be converted into the same tense (e.g., fly); and/or singular and plurality tokens may be transformed into the same form (e.g., singular); etc. Normalization not only transforms tokens into standard forms but also reduces the size of the data set due to, for example, the transformation of various tenses of verbs into the same tense and transformation of plural nouns into singular forms.

One or more reduction techniques may be applied to the data set or the normalized data set to further reduce the size at 506A. For example, punctuations may be removed. In some embodiments, one or more stop or function words or phrases (e.g., auxiliary verbs, some pronouns such as which, what, I, you, she, he, we, etc.) and/or one or more lexical words or lexical phrases that have little or ambiguous meaning may be filtered out from subsequent processes such as vectorization and clustering. Names of named entities (e.g., New York Times as the newspaper) may also be optionally extracted although the subsequent word embedding or term embedding processing may nevertheless learn these names. These filtered out words or phrases may be determined not to add value or usefulness. Stop or function words and phrases contribute primarily to the grammatical structures of tokens, rather than the meanings or contents thereof.

For example, a word embedding or term embedding module may customize a set of stop and/or function words and phrases to include auxiliary verbs (e.g., be verbs, can, must, need, etc.), articles (e.g., the, a, an, etc.), and/or some pronouns (e.g., which, what, etc.) These words primarily contribute to the grammatical meaning of a phrase or sentence but have limited or no usefulness in determining the semantic meaning of the phrase or sentence. In some other embodiments, a word embedding or term embedding module may iteratively customize the set of stop and/or function words to fit the intended functions of the underlying software application delivery model so as not to mistakenly filtering out words that may actually contribute to determining the similarity of tokens.

A dictionary or a data structure including unique tokens may be optionally generated at 508A. The unique tokens in this dictionary or data structure will be sent to a word embedding or term embedding module that transform these unique tokens into corresponding vector representations. Prior to actually transforming these unique tokens, the word embedding or term embedding module or the artificial intelligence modules therein may be trained with one or more training instances at 510A.

A training instance may include one or more analogical reasoning tasks that include words, phrases, etc. as well as vector arithmetic and/or additive compositionality to iteratively calibrate the word embedding or term embedding module in a supervised, unsupervised, or reinforcement learning environment. An example of an analogical task is "A is to B as C is to D" such as "man is to woman as king is to queen", "man is to woman as uncle is to aunt", etc.

Another example of an analogical reasoning task involving vector arithmetic is "king−man+woman=?"; and the word embedding or term embedding module is trained to determine the answer to be "queen".

In some embodiments, predictive models such as the continuous skip-gram model, continuous-bag-of-words (CBOW), non-linear sigmoidal recurrent neural networks, distributed memory (DM), distributed bag of words (DBOW), etc. may be used with non-uniform, adjustable weight matrices, instead of uniform weight matrices assigning an equal weight to all tokens, may be used in a word embedding or term embedding module at 510A, and the training at 510A adjusts the weights of tokens so that the word embedding or term embedding module correctly determines the answers to the analogical reasoning tasks in the training instances. The word embedding or term embedding modules may be derived from Word2vec algorithm, the Doc2vec algorithm, the locally linear embedding (LLE), etc. with adjustable weight matrices that assign lower weights to tokens that are known to cause incorrect or imprecise clustering results and/or assign higher weights to tokens that are known to cause more correct or precise clustering results, whereas the aforementioned algorithms have been proven to cause incorrect or imprecise clustering results for financial management software application delivery models. More details about training word embedding or term embedding modules will be described below with reference to FIGS. 5B-5D.

Once the word embedding or term embedding modules are trained to achieve desired accuracy with the one or more training instances at 510A, the tokens in the dictionary, the normalized data set, or the reduced, normalized data set may be transformed at 512A into corresponding vector representations where more similar tokens are transformed into vector representations that are in closer proximity to each other in the vector space. The vector representations may be stored with the or associated with the corresponding tokens in the same or in a different data structure; and an individual vector representation may be access by, for example, "model ['computer'] # raw NumPy vector of a word with the returned result of "array([−0.00449447, −0.00310097, 0.02421786, . . . ], dtype=float32)".

The word embedding or term embedding modules may further be optionally improved or optimized at 514A using techniques such as the hierarchical softmax technique, the negative sampling technique, the softmax technique, the noise contrastive estimation (NSE) technique, the subsampling of frequent words technique, etc. As described above, the data set or corpus may include an enormously large number of tokens and hence vector representations, the improvement or optimization is to reduce the number of updates per training instance or per training task. For example, the data set may include billions of words, tens of millions of phrases, and millions of sentences, each of which may be transformed into a vector representation having hundreds of dimensions.

These improvement or optimization techniques thus further reduce the utilization of computational resources. For example, a word embedding or term embedding module may invoke the hierarchical softmax technique that uses a Huffman tree to reduce computation intensity, especially targeting infrequent tokens. As another example, a word embedding or term embedding module may invoke the negative sampling technique that minimizes the log-likelihood of sampled negative instances, especially for frequent tokens. In addition or in the alternative, sub-sampling of frequent words during training may also be utilized to result in speedup and improve accuracy of the vector representations of less frequent tokens.

The dimensionality of the vector space may also be improved or optimized. Generally, the quality of word embedding or term embedding increases as the dimensionality of the vector space increases. Nonetheless, the increase in quality of word embedding or term embedding slows down as the dimensionality of the vector space reaches a threshold number beyond which the accuracy results in a limited return that is disproportional to the increase in dimensionality and hence in computational intensity. Therefore, the word embedding or term embedding module may impose a threshold limit on the dimensionality of the vector space to further conserve computational resources. The word embedding or term embedding modules may also impose a limit on the context for the aforementioned predictive models. The context imposes a limit on a number of tokens before and a number of tokens after a given token for predictions. For example, a word embedding or term embedding module may limit the context to 10 when continuous skip-gram is utilized and to 5 when CBOW is utilized.

Figure 5B:
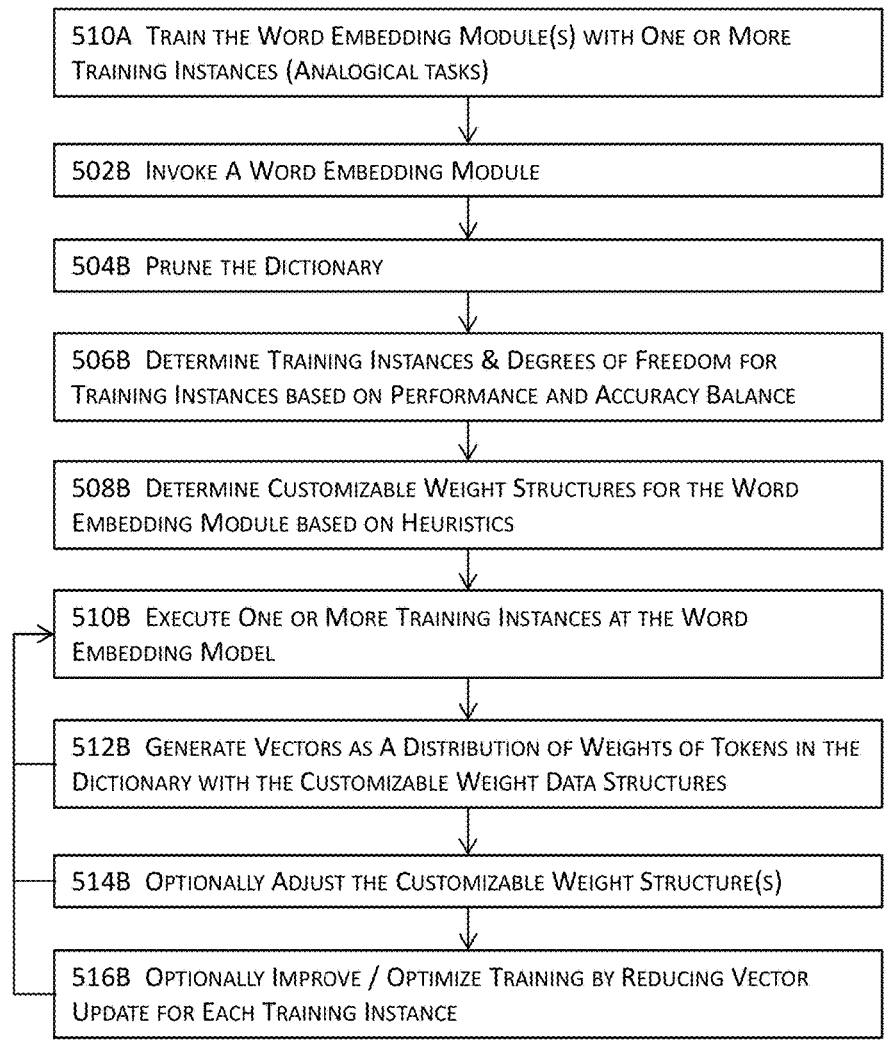
FIG. 5B illustrates more details of a part of the block diagram illustrated in FIG. 5A in some embodiments.

FIG. 5B illustrates more details of a part of the block diagram illustrated in FIG. 5A in some embodiments. More specifically, FIG. 5B illustrates more details about training one or more word embedding or term embedding modules at 510A of FIG. 5A. In these embodiments, a word embedding or term embedding model (a software model) may be invoked at 502B. As described above, the word embedding or term embedding model may include one or more processes including, for example, continuous skip-gram model, continuous-bag-of-words (CBOW), non-linear sigmoidal recurrent neural networks, etc. The dictionary or data structure, if generated at 508A, may be pruned at 504B. For example, tokens having a predetermined number of times of occurrences in the dictionary, tokens that are equivalent to each other, etc. may be pruned from the dictionary or data structure. As described above, the computational resource requirement (e.g., memory footprint, processor cycles, etc.) is roughly proportional to the product of the number of tokens to be vectorized and the degrees of freedom. Pruning the dictionary at 504B may thus further conserve computational resources.

One or more training instances and the degrees of freedom for these one or more training instances may be determined at 506B based in part or in whole upon a balance between performance of training and/or the word embedding or term embedding modules in training and the desired accuracy of the word embedding or term embedding modules in generating vector representations in closer proximity for tokens that are more similar to each other. The degrees of freedom are associated with the number of layers utilized in the word embedding or term embedding that generate the vector representations and will be described below in greater details.

Customizable, adjustable weight data structures may be determined at 508B for the word embedding or term embedding module under training. One of the advantages of these techniques described herein is that unlike conventional approaches that assign an equal weight to all the tokens and thus often lead to incorrect or imprecise vectorization and clustering results, these techniques assign unequal weights to certain tokens to achieve more accurate and precise results and to enhance the computers' ability to truly understand the natural language input from users. For example, a word embedding or term embedding module may assign lower weights to tokens that are known to cause incorrect or imprecise clustering results and/or assign higher weights to tokens that are known to cause more correct or precise clustering results during training. Another advantage of the word embedding or term embedding modules is that, unlike conventional approaches that focus on individual words (unigrams), these modules also provide the learning and hence embedding functionalities for multi-grams (e.g., phrases, sentences, and even documents) that include more than just the unigrams.

These one or more training instances may be executed at the one or more word embedding or term embedding module under training at 510B. More specifically, a training instance may include one or more analogical reasoning tasks that include words, phrases, etc. as well as vector arithmetic and/or additive compositionality. These analogical reasoning tasks iteratively calibrate the word embedding or term embedding modules under training in a supervised, unsupervised, or reinforcement learning environment until the desired accuracy is achieved. For example, the weights in the weight data structures may be iteratively adjusted until the word embedding or term embedding modules produce correct answers to the one or more training instances.

More specifically, a vector representation for a token may be generated at 512B as a distribution of weights of the tokens in the dictionary. The resulting vector representation of the token may be checked to determine whether the resulting vector representation correctly answers the analogical reasoning tasks in a supervised, unsupervised, or reinforcement learning environment. A word embedding or term embedding module is determined to have correctly answered an analogical reasoning task if the vector operations results in the vector of the result.

If an answer is not entirely correct, one or more weights for one or more corresponding tokens in the dictionary may be optionally adjusted at 514B; and the process returns to 510B to repeat the acts of 510B through 514B until the word embedding or term embedding module is determined to answer the analogical reasoning tasks with satisfactory accuracy. The training of the word embedding or term embedding modules may be optionally improved or optimized at 516B in an identical or substantially similar manner as that described above with reference to 514A in FIG. 5A.

Figure 5C:
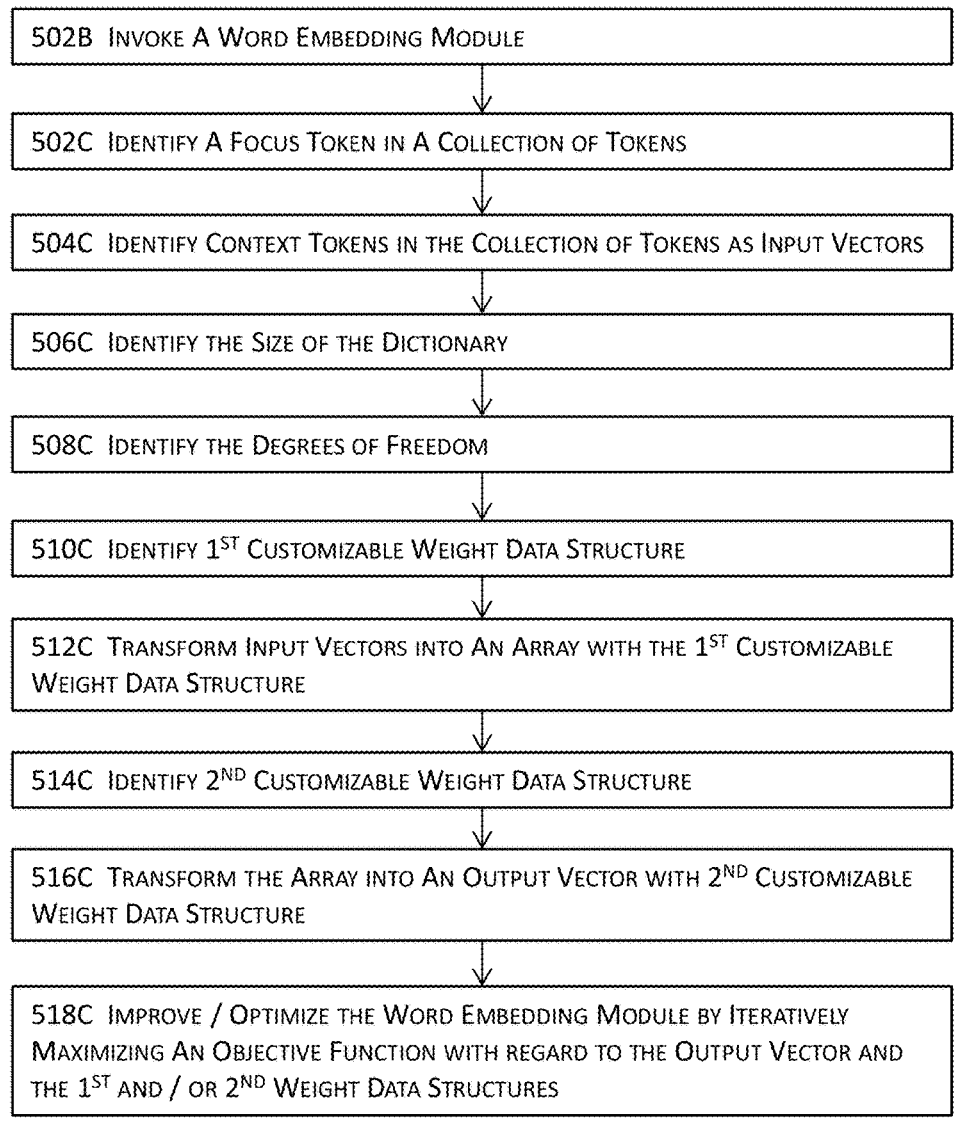
FIG. 5C illustrates more details of a part of the block diagram illustrated in FIG. 5B in some embodiments.

FIG. 5C illustrates more details of a part of the block diagram illustrated in FIG. 5B in some embodiments. More specifically, FIG. 5A illustrates an example of using a predictive model to predict a focus token from a window of surrounding tokens. In these embodiments, a focus token may be identified at 502C from a collection of tokens (e.g., a phrase, a sentence, a set of tokens, etc.) An objective of the flow illustrated in FIG. 5C is to predict the focus word from the surrounding tokens in a window encompassing the focus token. The window may encompass only one side (e.g., to the right of the focus token or to the left of the focus token) or both sides of the focus token. In some embodiments, the size of the window may be determined to be around five (5) to achieve a balance between the amount of time for the training and the accuracy of the output of the word embedding or term embedding module.

One or more context tokens may be identified at 504C; and the one or more corresponding context vector representations of these one or more context tokens may be provided as input vector representations at 504C. The size of the dictionary may be identified at 506C. For example, the total number of unique tokens or the vocabulary size (V) in the dictionary may be identified at 506C; and the degrees of freedom (N) may be determined at 508C. As described above, the computational resources required are proportional to the product of the number of tokens to be vectorized and the degrees of freedom, the input vector is thus a [1× V] vector, where V denotes the number of unique tokens (or the vocabulary size). Each token is expressed as a distribution of all the unique tokens in the dictionary and may thus be represented as a [1× V] array with a "1" in the field representing the token and "0" in the remaining fields of the [1× V] array to simplifying operations although values other than "0" and "1" may also be used.

The distribution coefficients or the weights of these tokens may be captured in a weight data structure. These embodiments illustrated in FIG. 5C include two weight data structures that successively transform the input [1× V] vectors representing the unique tokens in the dictionary into the vector representations where vector representations in closer proximity represent more similar tokens.

The first customizable weight data structure may be determined at 510C. The first weight data structure determined at 510C is to transform an [1× V] input vector into an intermediate representation while encompassing the degrees of freedom (N) and is thus a [V× N] array structure based on fundamentals of linear algebra. This intermediate representation may be called a hidden layer and is thus a [1× N] vector representation as a result of the product of the [1× V] input vector of a token and the [V× N] array. This [1× N] intermediate representation is further transformed via the second weight data structure into the final output vector representation for the input token. The output vector representation is also a [1× V] vector. As a result, the second weight data structure is a [N× V] array.

With these introductory remarks, the input vectors each representing a unique token in the dictionary may be transformed at 512C into an intermediate array with the first weight data structure. The second weight data structure may be identified at 514C; and the intermediate array generated at 514C may be further transformed into an output vector at 516C with the second weight data structure. As described above, the objective of these one or more training instances is to predict the focus token using the context tokens. The process may thus iteratively adjust the first and/or the second weight data structure via the application of a plurality of analogical reasoning tasks until the word embedding or term embedding module under training produces output vectors with desired accuracy. That is, until the word embedding or term embedding module can correctly predict the focus token by using its surrounding tokens with sufficient accuracy.

The word embedding or term embedding modules may be improved or optimized at 518C by iteratively maximizing an objective function with regard to the output vector representations and the first and/or the second weight data structures. More specifically, the process may iterate through every token in the dictionary and compute each input probability prediction as well as the prediction error and use the prediction error to update the corresponding output vector representation. Using the prediction error to update the corresponding output vector representation may be further improved or optimized by using one or more optimization techniques such as the aforementioned hierarchical softmax technique, the negative sampling technique, the softmax technique, the noise contrastive estimation (NSE) technique, the subsampling of frequent words technique, etc. The objective function may be constructed so that tokens occurring in similar contexts have similar embeddings (as measured by cosine similarity); and capturing the multiple degrees of similarity between tokens may be further enhanced by using the aforementioned analogical reasoning tasks.

For example, the hierarchical softmax technique may be used to estimate the overall probability distribution using an output layer that is proportional to log(unigram.perplexity (V)) instead of V (the vocabulary size described above) to reduce utilization of computational resources. Moreover, the weight data structures may be tuned during the iteration or independently of the iteration by adjusting one or more weights in either or both weight data structures. Another improvement or optimization technique involves the use of different techniques to process different tokens. More particularly, a word embedding or term embedding module may establish a threshold frequency of appearances for the tokens and use one technique for frequent tokens and another technique for infrequent tokens. For example, a word embedding or term embedding module may use the hierarchical softmax that utilizes a Huffman tree to reduce computation for infrequent tokens and negative sampling that minimizes the log-probability of sampled negative instances for frequent tokens.

This process flow illustrated in FIG. 5C may be applied to tokens more than just unigrams. For example, a similar approach may adopt multi-grams or n-grams (e.g., phrases, sentences, etc.) rather than unigrams (e.g., single words) to train the word embedding or term embedding modules. In doing so, tokens that frequently appear together may be identified as a focus token (an n-gram). The focus token may be similarly predicted in one or more similar training instances using surrounding tokens where the analogical reasoning tasks may be revised to encompass n-grams, rather than just unigrams. In some embodiments, a word embedding or term embedding module may be trained with all the n-grams (unigrams, bi-grams, etc.) This approach requires more computational resources than an alternative approach that train a word embedding or term embedding module using just some of the n-grams (e.g., using just the unigrams, bi-grams, etc. but not all the n-grams).

Figure 5D:
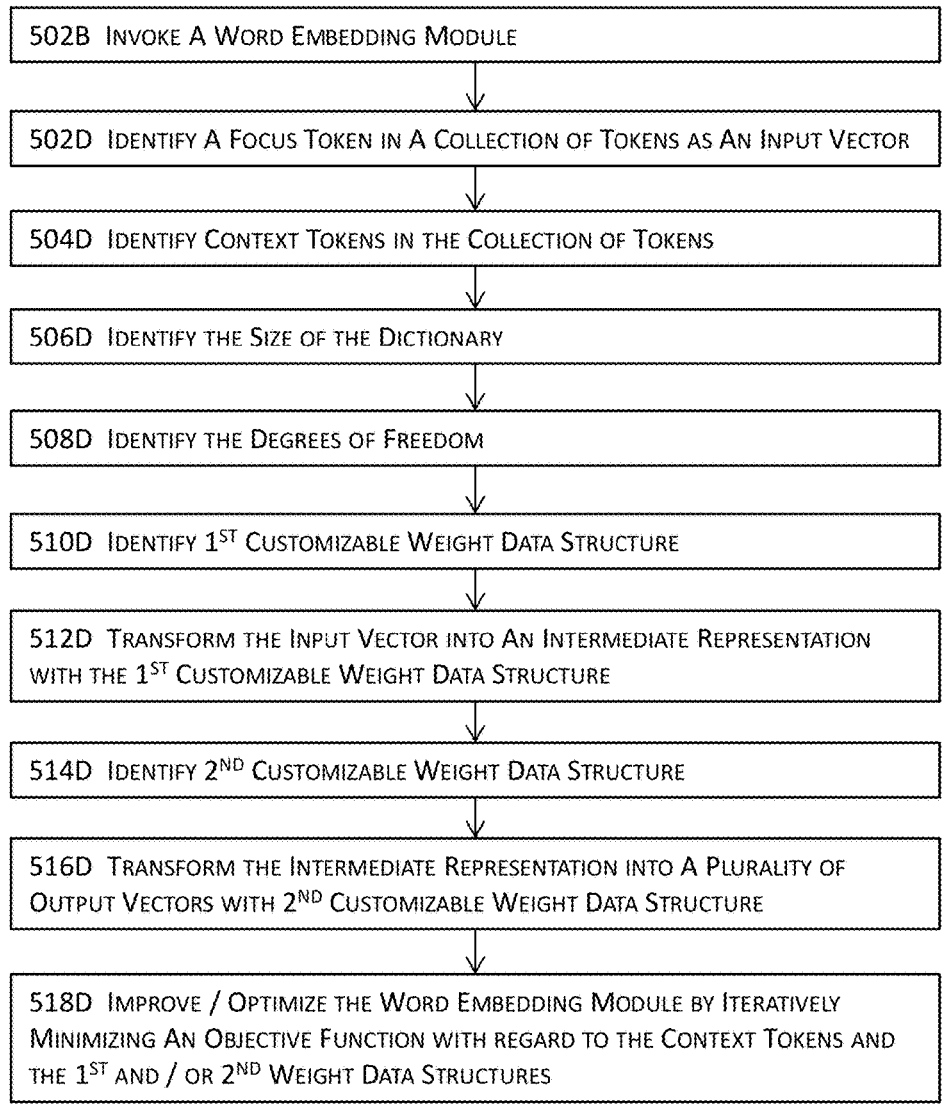
FIG. 5D illustrates more details of a part of the block diagram illustrated in FIG. 5B in some embodiments.

FIG. 5D illustrates more details of a part of the block diagram illustrated in FIG. 5B in some embodiments. More specifically, FIG. 5D illustrates an example of using another predictive model to predict surrounding tokens from a target token. Compared with the approach illustrated in FIG. 5C that predicts the focus token by using surrounding tokens in a defined window encompassing the focus token, the approach illustrated in FIG. 5D predicts the surrounding tokens by using the focus token. In other words, the approach in FIG. 5C predicts the focus token from its context, and the approach in FIG. 5D predicts the context from the focus token.

In these embodiments, a focus token may be identified at 502D from a collection of tokens as an input vector to a word embedding or term embedding module. For training purposes, the context tokens may also be identified at 504D from the collection of tokens. These identified context tokens may be used to evaluate the prediction errors of the word embedding or term embedding module during training. The size of the dictionary (V) and the degrees of freedom (N) may be respectively identified at 506D and 508D. The dictionary may be normalized and optionally reduced to include unique tokens as described above.

The degrees of freedom determine the size of the intermediate representation after the transformation with the first weight data structure. Generally, higher degrees of freedom result in better accuracy but require more computational resources because the memory footprint is proportional to the product of the size of the dictionary and the degrees of freedom. Therefore, a threshold limit may be established (e.g., several hundreds) for the degrees of freedom to achieve a balance between training performance and accuracy of the trained word embedding or term embedding modules.

The first customizable, variable weight data structure may be identified at 510D. The input vector may then be transformed into an intermediate representation at 512D using the first customizable, variable weight data structure. The input vector for the focus token may be similarly constructed as that in FIG. 5C and may include a [1× V] array. Theoretically, there may be V input vectors for a dictionary having V unique tokens. The first customizable, variable weight data structure thus includes a [V× N] array to transform a [1× V] input vector into a [1× N] array for the intermediate representation.

Because the output vector is also in the same vector space as the input vector, the output vector thus includes a [1× V] vector representation. As a result, a second customizable, variable weight data structure, a [N× V] array, may be identified at 514D. The first and/or the second customizable, variable weight data structure are to be adjusted with variable weights to optimize an objective probability function (e.g., a log probability based on the training context and the size of the dictionary, a stochastic gradient descent object function, etc.) The intermediate representation may then be transformed into the corresponding output vector representation at 516D.

More specifically, with the objective function identified, the loss or error may be computed for a pair of observed and noisy examples. At least one weight in the first or the second weight data structure may be updated to improve the objective function by, for example, determining the gradient of the loss or error with respect to the weights and by updating the weights by taking a small step in the direction of the gradient that moves the output vectors around for each token until the word embedding or term embedding module correctly discriminating real tokens from noise tokens. The learned output vectors may be projected to a two-dimensional space using a dimensionality reduction technique.

Similar to the word embedding or term embedding module in FIG. 5C, the word embedding or term embedding modules trained in FIG. 5D may also be improved or optimized at 518D by iteratively optimizing an objective function with regard to the context tokens and the first and/or the second weight data structure. The context tokens identified at 504D may be compared with the results of the word embedding or term embedding module during training to compute the prediction errors that may be further used to calibrate the first and/or the second weight data structures until the word embedding or term embedding module under training produce correct predictions of the context tokens with desired accuracy.

With the vector representations determined for a corpus including natural language inputs, the corpus may be clustered based on the close proximity of the vector representations. As a practical example including an electronic tax return preparation software delivery model, a first corpus may be identified for the first natural language inputs by users in Section A "Principal business or profession, including product or service" of Schedule C, Form 1040. The first corpus may be normalized and vectorized into first vector representations using the approaches illustrated in FIGS. 5A-5D so that the first vector representations in closer proximity indicate tokens that are more similar to each other. These "principal business or profession" in the first natural language inputs may be clustered into a plurality of user clusters based on the proximity of the first vector representations. A plurality of users may thus be clustered into the same user cluster if the respective first natural language inputs are transformed into first vector representations that are within a threshold proximity to each other.

In preparing electronic tax returns, the plurality of users in a user cluster may further enter second natural language inputs as additional inputs. For example, these users may further enter additional natural language inputs in Part V "Other Expenses" to indicate the expenses that these users deduct from their respective taxable incomes. These second natural language inputs may be collected as the second corpus for the plurality of users in the user cluster. These second natural language inputs may be normalized and vectorized into second vector representations and may be further clustered into a plurality of characteristic clusters (e.g., a plurality of expense categories) based on the proximity of these second vector representations. A plurality of expenses may thus be clustered into the same expense cluster if the respective second natural language inputs are transformed into the corresponding second vector representations that are within a threshold proximity to each other. Similar normalization, vectorization, and clustering may be performed for one or more other user clusters to determine their respective characteristic clusters.

The example software application delivery model (electronic tax return preparation and filing application delivery model) then utilizes these user clusters and characteristic clusters. For example, when a specific user provides the specific business description or profession in Schedule C in the electronic tax return preparation and filing software application delivery model, the specific business description or profession may be normalized and vectorized into a specific vector representation in the same vector space. This specific vector representation may then be clustered into one or more user clusters. These techniques may determine a final user cluster either based on some other inputs from the specific user or based on user validation.

One or more characteristic clusters (e.g., the top N expense categories) that have been previously determined to correspond to the final user cluster or to each of the one or more user clusters may be identified and presented to the user. In some embodiments, these techniques may identify one or more personalized expense cluster based on the natural language inputs provided by the specific user in addition to or in the alternative of the one or more previously established expense clusters to demonstrate that the software delivery model actually understands the business of the specific user.

Figure 6A:
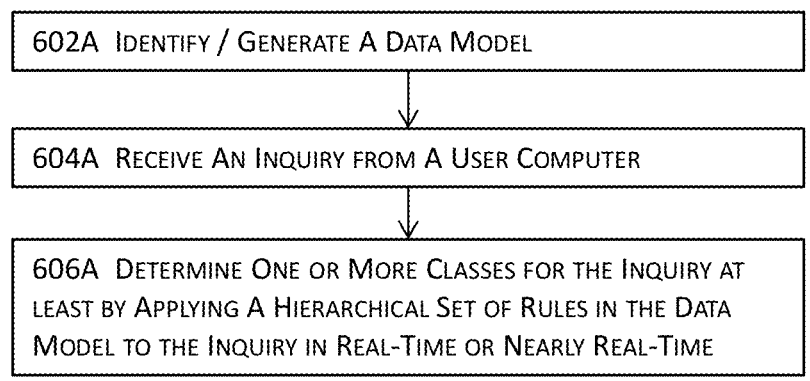
FIG. 6A illustrates a high level block diagram for classification of data with real-time computing techniques or reactive computing techniques in some embodiments.

FIG. 6A illustrates a high level block diagram for classification of data with real-time computing techniques or reactive computing techniques in some embodiments. In these embodiments, a data model may be identified (if pre-existing) or generated (if not existing) at 602A. An identified data model may be a previously generated data model or a data model generated by a third party. An inquiry may be received at the data model from a user computing device at 604A.

The inquiry may include a user's question about a software application licensing or delivery model that the user needs help with and may be presented in a variety of different forms that comprise, for example, entering the inquiry in the search box in the user interface, pressing the HELP key (e.g., the "F1" key on the keyboard) and entering the inquiry therein, entering the inquiry in a chat session, verbally speaking the inquiry in a telephone conversation with a support personnel, etc.

This user inquiry may then be classified in real-time or in nearly real-time into one or more classes at 606A by the data model identified or generated at 602A. In some embodiments, the data model may apply a hierarchical set of rules in the data model to the inquiry and to generate a result including the one or more classes for the inquiry. More details about the generation of a data model and classification of an inquiry into one or more classes are described below with reference to FIGS. 6B-6D.

Figure 6B:
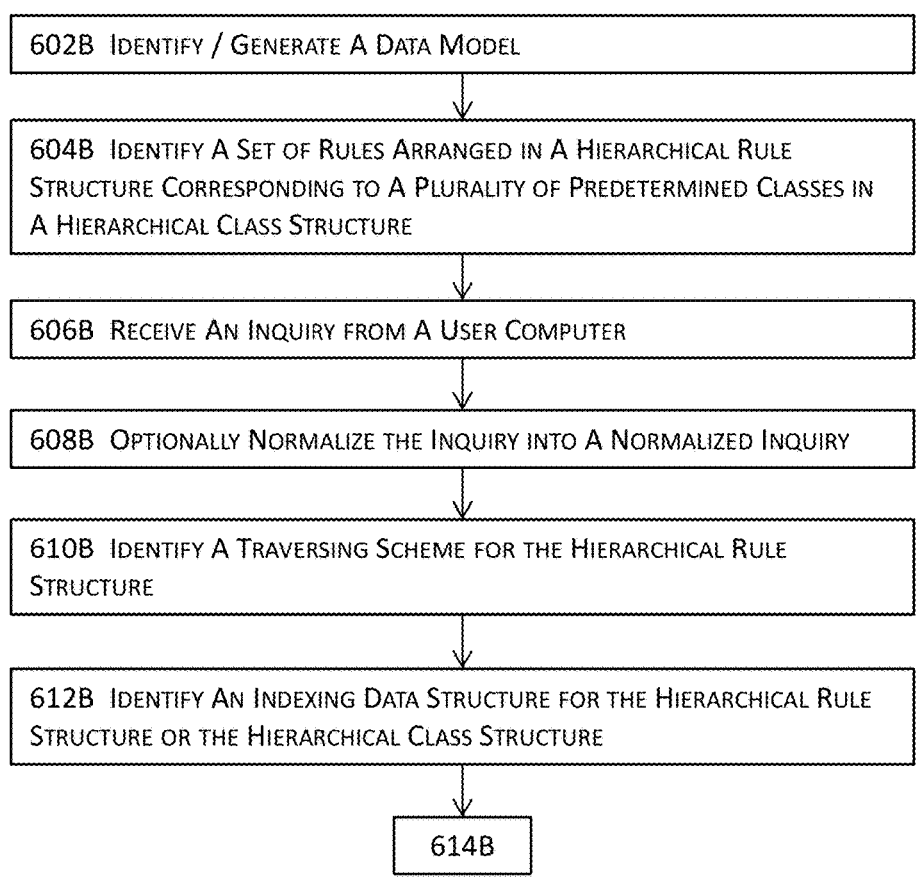
FIGS. 6B-6C jointly illustrate a more detailed block diagram for classification of data with real-time computing techniques or reactive computing techniques in some embodiments.
Figure 6C:
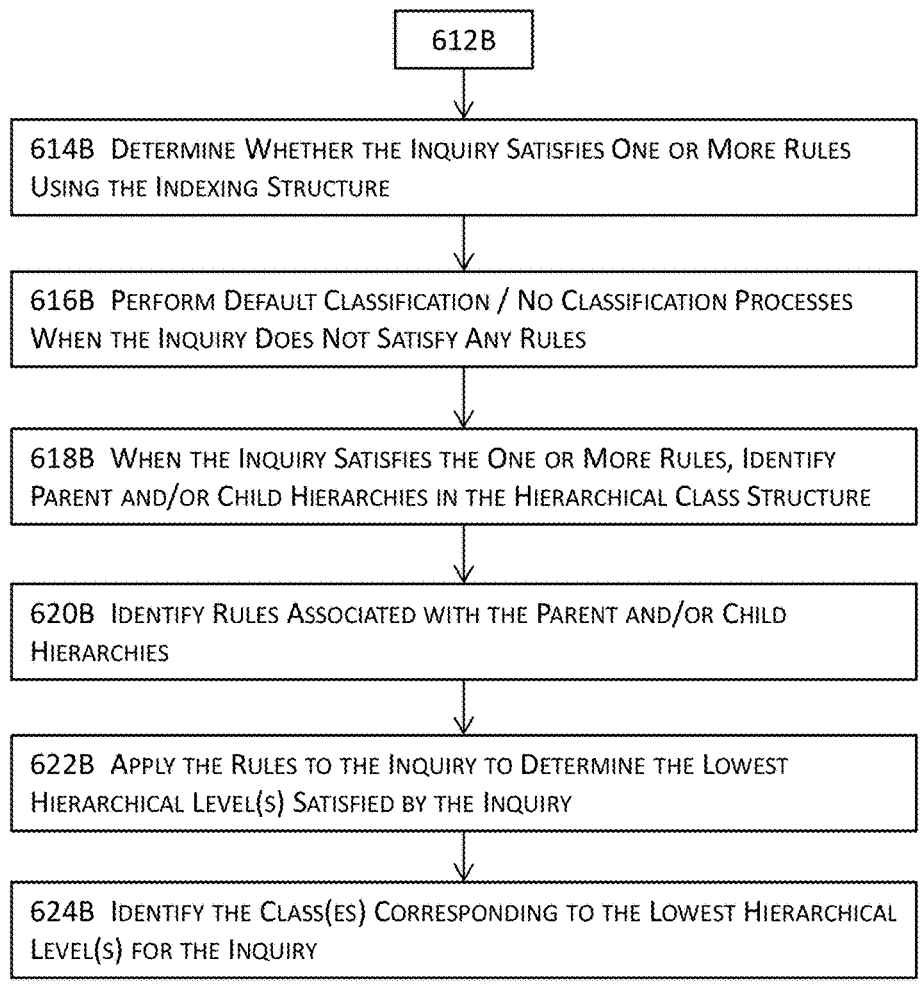

FIGS. 6B-6C jointly illustrate a more detailed block diagram for classification of data with real-time computing techniques or reactive computing techniques in some embodiments. In these embodiments, a data model may be identified (if already existing) or generated (if not yet existing) at 602B. In some embodiments where no data models exist, a data model may be generated at 602B by using the term identification techniques or word embedding or term embedding techniques described above with references to FIGS. 3A-3E, 4A-4E, and 5A-5D.

A set of rules that is arranged in a hierarchical rule structure corresponding to a plurality of predetermined classes in a hierarchical class structure may be identified or generated from the data model at 604B. An inquiry may be received from a user computing device at 606B. This inquiry may be optionally normalized into a normalized inquiry so that this normalized inquiry may be accepted and processed (e.g., classified) by a data model.

For example, a user may enter an inquiry in free text or natural language. This inquiry may be normalized by, for example, filtering out certain terms from the inquiry, replacing the arrangement of remaining terms in the inquiry according to the requirements of a data model, etc. As another example, the normalization process may remove terms that are irrelevant or inappropriate (e.g., articles such as "a", "an", and "the", certain pronouns such as "I", "you", "he", "she", etc., offensive terms, etc.), that are generally or universally accepted truths, that are known, common typographical errors or clerical errors, etc. For example, the normalization process may replace double spaces with a single space in an inquiry.

The normalization process may also formulate, transform, or generalize the inquiry into a special arrangement for the upcoming processing by a data model. For example, the normalization process may replace any number of spaces with a pipe symbol "|" to concatenate various terms in an inquiry with the pipe symbols for a particular data model. The normalization process may add variants of a term or even partial characters of a term and combine the term, its variants, and the partial characters with Boolean OR operators to broaden and more accurately portray the coverage of a specific class. For example, a user may enter "demo license" as an inquiry, the normalization process may identify "demo", "demonstr", "demonstrate", "demonstration", "eval", "evaluate", "evalua", "evaluation", "license", "licens", etc. and concatenate these terms with Boolean operators (OR, AND, etc.) to represent the inquiry.

A traversing scheme for the hierarchical rule structure may be identified at 610B. In some embodiments, a top-down traversing scheme may be identified for traversing the hierarchical rule structure. In some other embodiments, a bottom-up traversing scheme may be identified for traversing the hierarchical rule structure. An indexing data structure may be identified at 612B for the hierarchical rule structure delineating the parent-child relations of a plurality of rules or the hierarchical class structure delineating the parent-child relations of a plurality of classes. This indexing data structure may be included as a part (e.g., a column) of the hierarchical rule structure or the hierarchical class structure in some embodiments. In some other embodiments, the indexing structure may be stored as a separate data structure storing indices that uniquely correspond to a plurality of rows in the hierarchical rule or class structure.

A data model may be executed to determine whether the inquiry identified at 602B satisfies one or more rules using the indexing data structure and the traversing scheme at 614B. In some embodiments, the data model may explicitly include respective rules for each of the classes. For example, a data model may include a hierarchical set of classes that are arranged in a parent-child relation. In this example, a class may be identified by applying the corresponding set of rules associated with the class to the input term (e.g., a user query including one or more characters, words, phrases, sentences, etc.) If it is determined that a particular input satisfies this set of rules associated with a particular class this particular input may be classified as a member of the particular class.

A parent class may include one or more child classes where each child class is further associated with an additional set of rules, and this parent-child relation may span across more than two hierarchies. In the aforementioned example where the particular input is classified as a member of a particular class at a parent hierarchy, the data model may further apply the additional set of rules of a first child class at a first child hierarchy of this particular class to the particular input. If this particular input also satisfies this additional set of rules this particular input is further classified as a member of the first child class under the particular class.

The data model may continue to apply these additional sets of rules associated with the first child hierarchy and with any further lower child hierarchies to classify the particular input until all the child hierarchies have been exhausted or until the particular input is determined to fail to satisfy a specific set of rules that corresponds to a specific child hierarchy. When the particular input is determined to fail to satisfy a specific set of rules that corresponds to a specific child hierarchy, the data model stops applying any additional sets of rules associated with lower hierarchies under this specific child hierarchy. The aforementioned example describes a top-down approach for classifying an input (e.g., a user inquiry).

In some other embodiments, the data model including sets of rules respectively corresponding to classes may also apply these sets of rules in a bottom-up approach where the data model first tentatively identifies the lowest hierarchy (where a parent is located at a higher hierarchy) into which an input may be classified and iteratively applies the corresponding sets of rules associated with the parent classes the parent hierarchies of this lowest hierarchy. The input is classified into the lowest hierarchy when the input satisfies all the sets of rules corresponding to the parent classes of the lowest hierarchy.

The aforementioned examples describe data models that explicitly include sets of rules for recognized classes arranged in a hierarchical order. In some embodiments, a data model may not explicitly include any rules the satisfaction of which leads to the determination of classes. Rather, a data model may employ, for example, term embedding techniques (e.g., word embedding or term embedding techniques) or term identification techniques to determine the classification results for inputs (e.g., user inquiries) in some other embodiments. This type of data models is often predetermined by processing a large corpus often including billions of records.

In these latter embodiments, the results of vectorization of the terms in the corpus and the results of identified terms from the corpus as well as the respective classification results may have been stored in various data structures. The data models that generate these classification results and/or these various data structures may be further processed to convert the data model into a set of hierarchical rules or tables including at least terms that are classified into their respective classes.

One of the advantages of deriving rules from such data models is that these data models based on the term embedding techniques term identification techniques are much more accurate in classifying terms, whereas the application of rules has the additional advantage in speed. By deriving rules from these data models and automatically generate the code for a derived data model based on the derived rules, this approach does not comprise classification accuracy or speed, and the derived data model may be further converted into a script language to execute in real-time to provide classification results and corresponding recommended actions for inquiries submitted by users in real-time.

When it is determined that the inquiry identified at 602B cannot be classified into any specific classes due to the failure to satisfy any sets of rules associated with their corresponding classes, a default classification process or no-classification process may be performed for the inquiry at 616B. In some of these embodiments, the inquiry may be classified into a catch-all class that may be further flagged for domain expert reviews. In some other embodiments, the inquiry and/or information related to the inquiry (e.g., information about the user, the normalized inquiry, the terms that are filtered out from the identified inquiry, etc.) may be transmitted into a training data set or a training instance that may be applied to the data model.

On the other hand, when the inquiry identified at 602B is determined to satisfy at least one set of rules corresponding to a class, one or more parent or child hierarchies or classes may be identified at 618B from the hierarchical class structure for the inquiry. The corresponding sets of rules may be identified at 620B for the one or more parent or child hierarchies or classes from the hierarchical rule structure. These corresponding sets of rules may be applied at 622B to the inquiry using the traversing scheme to determine the lowest hierarchical level(s) that is satisfied by the inquiry in some embodiments. The determination of the lowest hierarchical level is to ensure that the most detailed classification result down to the lowest class in a hierarchical structure can be determined for the inquiry in these embodiments.

As described above, an inquiry may be classified into a child class if and only if the inquiry also satisfies the corresponding set(s) of rules of the parent class(es) of the child class in some embodiments. In some other embodiments, one or more rules in a set of rules corresponding to a class may be relaxed so that the failure of an inquiry to satisfy these one or more rules may not eliminate the possibility of classifying the inquiry into this class. Nonetheless, this identified class may be penalized with a deduction in the confidence level or score to reflect the lower probabilities that this inquiry may be classified into this particular class.

The class that corresponding to the lowest hierarchical level may then be identified at 624B for the inquiry, and the inquiry is thus classified into this class. It shall be noted that an inquiry may be classed into a plurality of classes some of which may even be located at the same hierarchical levels. The data model thus identifies each of the lowest classes for the inquiry and generates the classification results to reflect the same. In some embodiments, the traversal of the hierarchies may be limited by a threshold limit of the number of hierarchies traversed, the amount of time spent on identifying the classes for the inquiry, etc. to ensure the real-time responsiveness of the data model.

In some embodiments where an inquiry is classified into a plurality of classes, the plurality of classes may be ranked according to one or more criteria such as the confidence levels or scores, classification metrics, classification measures, the distances or proximity between vectors, any combinations thereof, or any other suitable criteria. Because of the expediency of the data models, a data model may classify additional information gathered from the user's interaction with the software application licensing or delivery model and use this additional classification to determine the confidence level or score or classification metrics.

For example, a data model may further classify information about the user (e.g., the user's profession as entered in an electronic tax form or elsewhere), information about the navigation (e.g., visited pages, links, etc., time spent on pages or links, the number, types, and contents of searches, etc.) of the user in the software application licensing or delivery model, or any other information available to generate an additional classification results. The data model may then examine the classification results (e.g., classes) for the inquiry and determine their respective closeness with the additional classification results for the additional information and determine a relative or absolute score for each class.

Figure 6D:
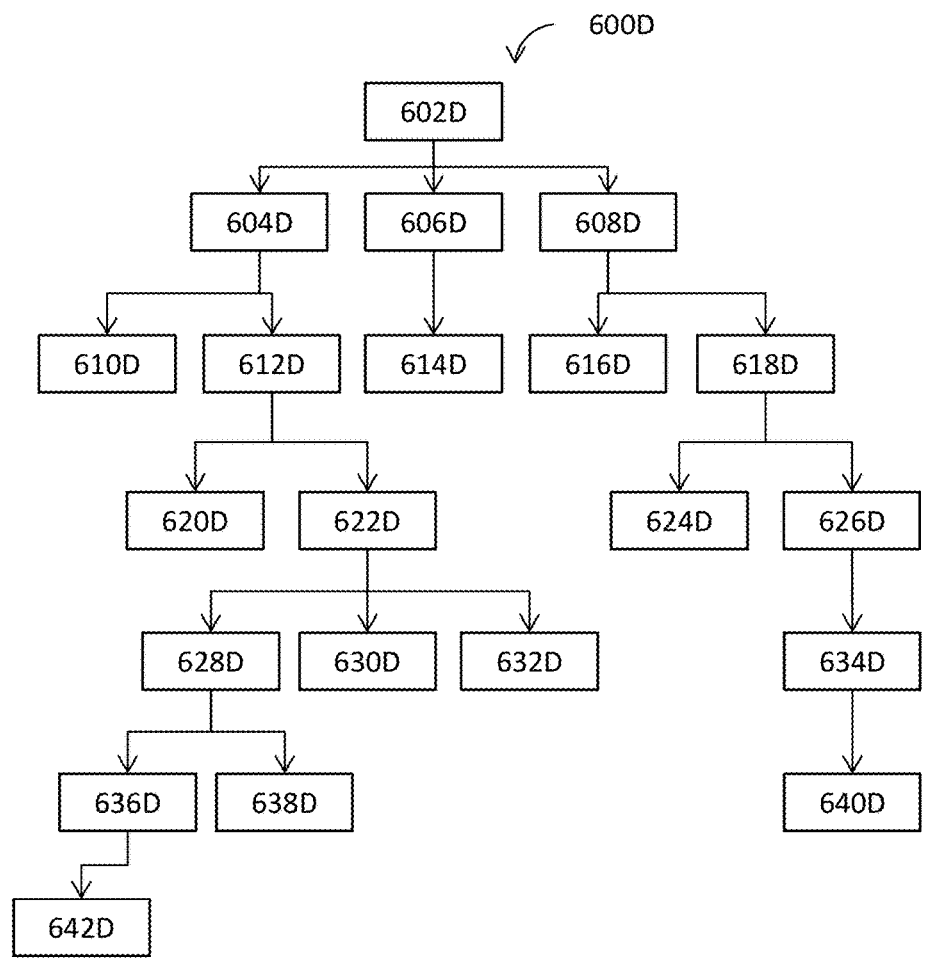
FIG. 6D illustrates an example of a tree structure that is used to facilitate the manipulation of classes and/or rules in some embodiments.

FIG. 6D illustrates an example of a tree structure that is used to facilitate the manipulation of classes and/or rules in some embodiments. This example graphically illustrates a tree structure for a hierarchical class structure although hierarchical class structures may be represented and stored in many different forms and not necessarily in a tree structure. In this graphical example, the hierarchical class structure includes seven hierarchies where class 602D sits at the first hierarchy—the highest hierarchy. Class 602D includes three child classes —604D, 606D, and 608D that sit at the second hierarchy right below the first hierarchy. Child class 604D includes two child classes 610D and 612D; child class 606D includes only one child class 614D; and child class 608D includes two child classes 616D and 618D. These child classes 610D, 612D, 614D, 616D, and 618D sit at the third hierarchy.

Child classes 610D, 614D, and 616D at the third hierarchy do not have any child classes. Child class 612D includes two child classes 620D and 622D at the fourth hierarchical level; and child class 618D also includes two child classes 624D and 626D also at the fourth hierarchical level. Child class 620D and 624D do not have any child classes; child class 626D has a single child class 634D sitting at the fifth hierarchical level; and child class 622D includes three child classes 628D, 630D, and 632D also at the fifth hierarchical level.

Child class 628D includes two child classes 636D and 638D sitting at the sixth hierarchical level; and child class 634D includes a single child class 640D also at the sixth hierarchical level. Child class 636D also has a single child class 642D sitting at the lowest hierarchical level-the seventh hierarchical level. This hierarchical tree structure 600D may also include or may be associated with the corresponding sets of rules for each class. The satisfaction of a set of rules for a class will lead to the classification of an input into this class.

In some embodiments, these rules are hard rules and cannot be relaxed. In these embodiments, an input can be classified into a class if and only if the input satisfies the set of rules for the class and the sets of rules for the parent classes of the class. In some other embodiments, at least one of these rules is a soft rule that may be relaxed. That is, the violation of a soft rule will not entirely eliminate the possibility of an input into the corresponding class although the classification into this class may be associated with a lower score or may be flagged to reflect the violation of a soft rule.

In addition to rules, the hierarchical tree structure or other forms of hierarchical structures for the classes may also include or may be associated with other information pertinent to the classes or rules. For example, the respective inquiries, normalized inquiries, additional information considered during classification, etc. may be included or associated with the corresponding classes in the hierarchical class data structure such as the hierarchical tree structure illustrated in FIG. 6D.

FIG. 6E illustrates an example of a data structure that is used to facilitate the manipulation of classes and/or rules in some embodiments. This example data structure 600E includes the class identifier, the hierarchical levels for corresponding classes, information associated with the corresponding classes, and links to rules for the corresponding classes. The class identifiers may be configured (e.g., expressed as unique identifiers or hashed into unique hashes, etc.) to include unique identifiers that may be further used to serve as indexes to facilitate and improve access, manipulation, storage, and retrieval of data in the data structure 600E.

For example, these indices may be sorted in a certain order such as a descending order; and access to a particular row in the data structure 600E may be accomplished by examining the sorted indices such that rows corresponding to indices beyond the target index need not be examined or accessed. This indexed data structure 600E may thus conserve the utilization of computational resources in the access, manipulation, storage, and retrieval of data.

The column entitled "link(s) to Rule(s)" includes one or more rules corresponding to each class, and the symbol "&" in some of these rows in this column symbolically indicates that the corresponding set of rule(s) of a specific class include the rule identified in this column as well as the rule(s) in the parent class or parent classes of this specific class in some embodiments. The identification of these rules may include, for example, applicable rule objects in some embodiments or links to the applicable rules in some other embodiments. In some of these embodiments, the data structure 600E may also include the physical locations (e.g., physical address on a storage device) of these rules to further facilitate retrieval of applicable rules.

Figure 7A:
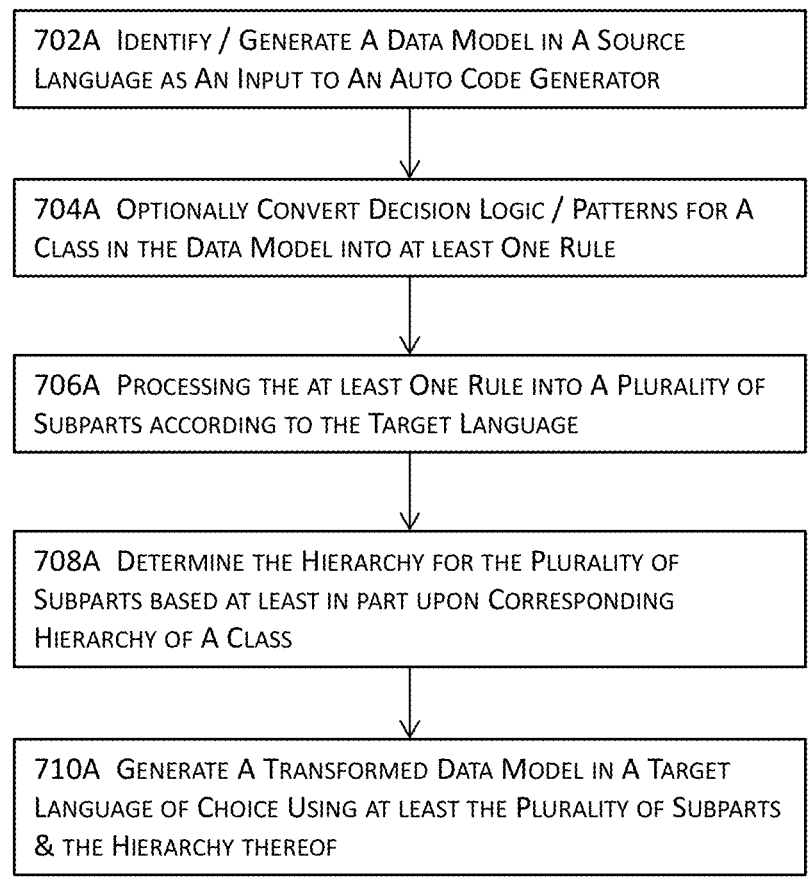
FIG. 7A illustrates a high level block diagram for automatic generation of software application code in a configurable programming language in one or more embodiments.

FIG. 7A illustrates a high level block diagram for automatic generation of software application code in a configurable programming language in one or more embodiments. An example system for performing the automatic generation of software application code is illustrated in FIG. 1C described above. In these embodiments, a data model in a source programming language may be identified or generated at 702A by providing the data model as the data model as an input to an automatic code generation module. In some embodiments, a data model identified at 702A may be generated by a third-party other than the developer or host of the software application licensing or delivery model or the users.

The at least one rule may be further processed or tokenized into a plurality of sub-parts according to the target language at 706A. Processing a rule into a plurality of sub-parts may include segmenting a term into one or more sub-parts each containing a fewer number characters, identifying one or more equivalents and/or variants, identifying one or more terms in close proximity (e.g., corresponding vectors in closer proximity from each other), identifying one or more terms having greater similarity, etc. In the example illustrated in FIG. 6E, information including "buy", "bought", "bough", "purchas", "purchase", "purchasing", "acquir", "acquire", "acquisiti", etc. that are determined by the aforementioned processing and are stored as the associated information for the class identifier "shop/buy".

The hierarchical level corresponding to the plurality of sub-parts may be determined at 708A based in part or in whole upon the corresponding hierarchy of the class whose decision logic or patterns are converted at 704A. This hierarchical level may correspond to a hierarchy in a hierarchical rule data structure that may be a separate data structure in some embodiments or may be included in the hierarchical class data structure in some other embodiments.

With the hierarchy determined for the plurality of sub-parts for the class, a data model in a target programming language may be generated at 710A at least by using the plurality of sub-parts.

As described above, a data model may explicitly include a plurality of rules in some embodiments; and another data model (e.g., data models generated by the term embedding techniques or term identification techniques) may not explicitly or even implicitly include any rules in some other embodiments. In these latter embodiments, the decision logic or patterns that are extracted for a class from the identified or generated data model may be converted or derived into at least one rule at 704A.

Moreover, the derivation or conversion of at least one rule from the decision logic or patterns may be achieved by referencing one or more data structures storing the classification results or one or more intermediate data structures storing intermediate data that are used to determine the classification results. The at least one rule may be constructed by linking or formulating the plurality of sub-parts with their functional relations in some embodiments.

In the example illustrated in FIG. 6E, a data model constructed based on, for example, the term embedding techniques may have determined that an input including the term "buy" or "purchase" (or other terms) may be classified into the "shop/buy" class at the first hierarchy. In this example, the data model does not explicitly or implicitly include any rules that classify "buy" or "purchase" into the "shop/buy" class. Rather, the data model converts the terms "buy" and "purchase" into corresponding vectors and determines that these two corresponding vectors are within close proximity as specified by a pre-established threshold. The data model thus classifies both term into the same class and elect the "shop/buy" as the representative or class identifier of this class.

The automatic code generation module may first identify the decision logic or patterns from, for example, the classification results that list "buy" and "purchase" as belonging to the same "shop/buy" class. The automatic code generator may then extract this pattern or decision logic and formulate the following pseudocode as a rule for the real-time data model to be generated:

{phrase.match
 (\bbuy|\bbought|\bbough|\bpurchas|\bpurchase|\
 bpurchasing|\bacquir|\bacquire|\bacquisiti)

classification.push("'+classification+child.get
 ('name')+cSubClass+child.get('name')+'-
 Misc.'");}

This pseudocode section may then be automatically generated in a transformed data model that executes in real-time to determine whether an input satisfies the conditions in this code section so that the input may be classified into this particular class.

Figure 7B:
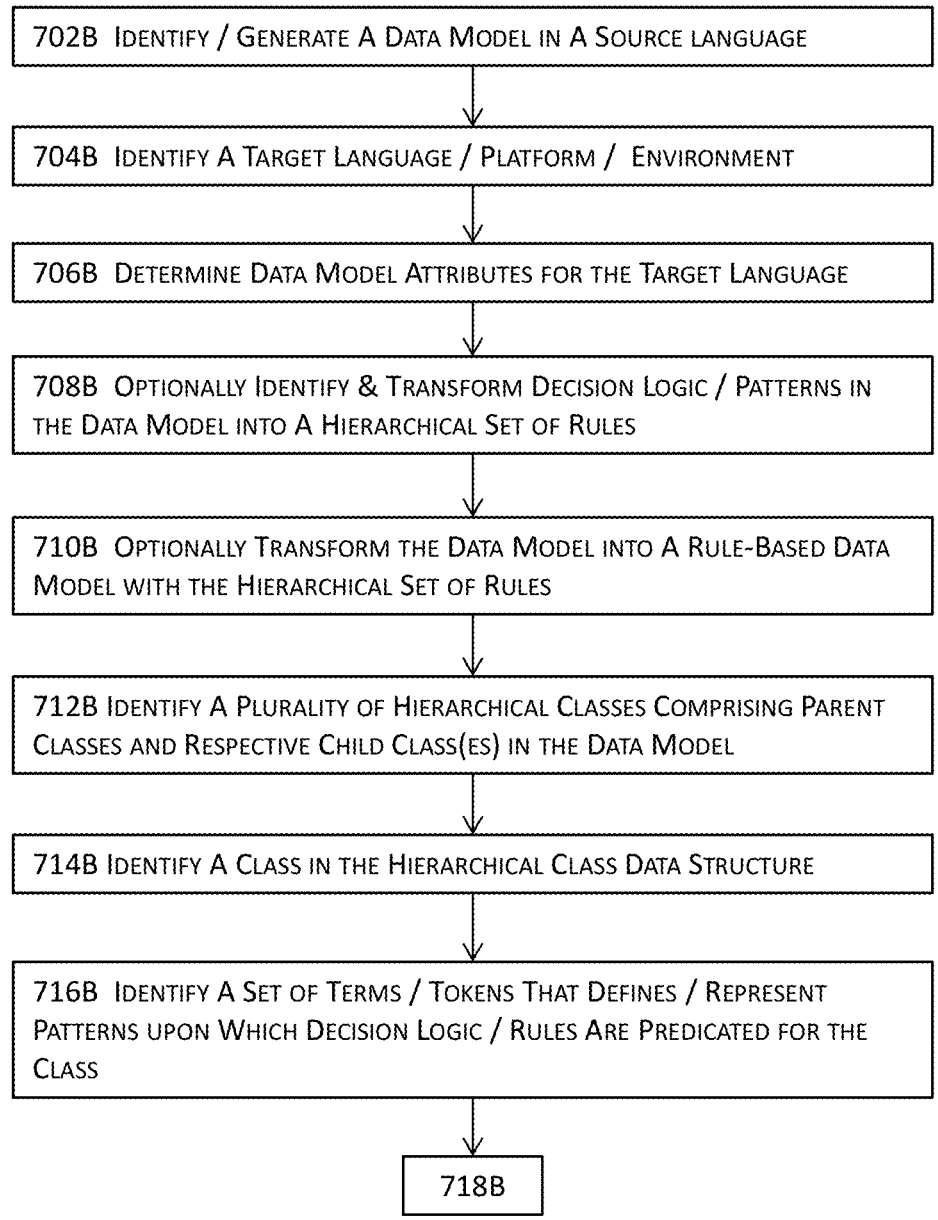
FIGS. 7B-7C jointly illustrate a more detailed block diagram for automatic generation of software application code in a configurable programming language in one or more embodiments.
Figure 7C:
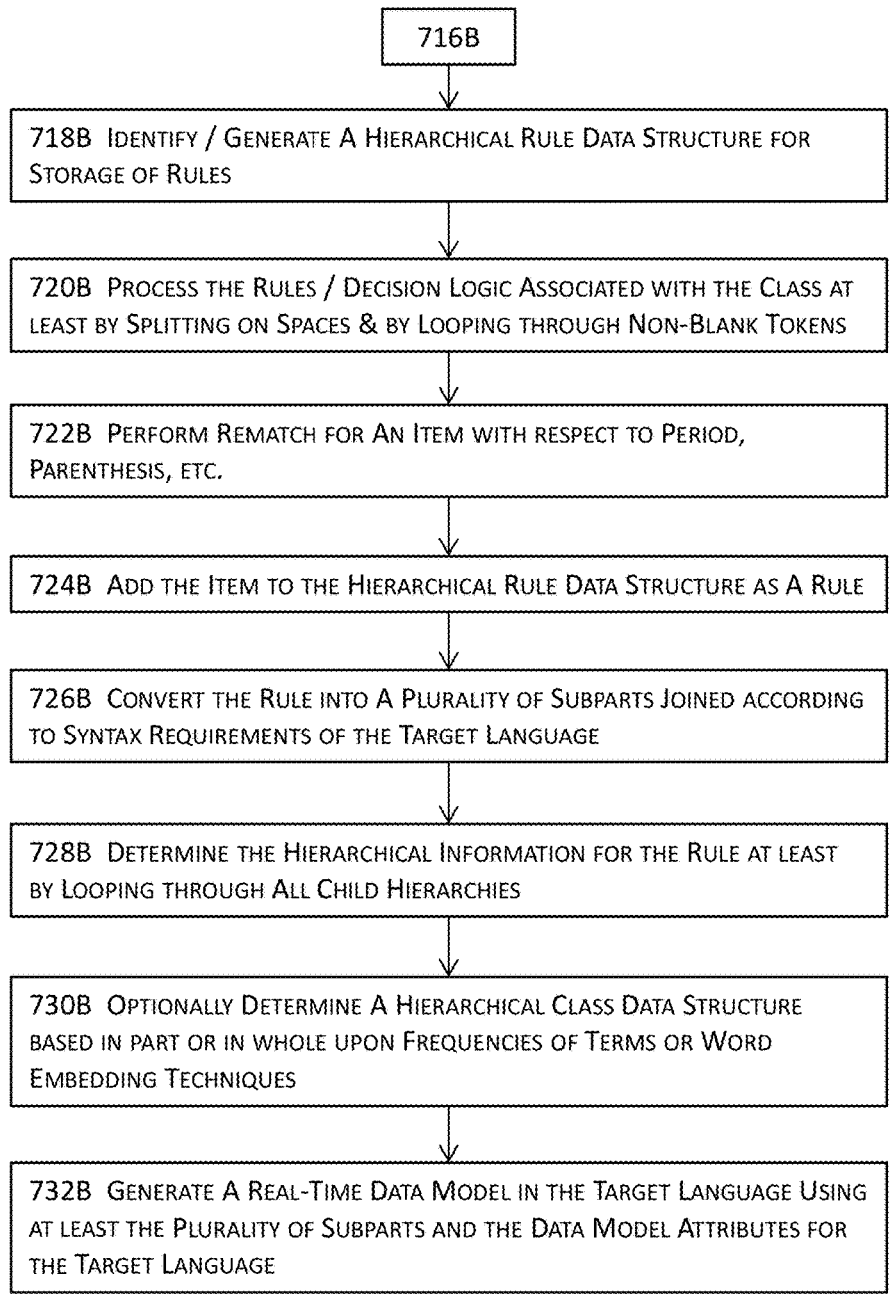

FIGS. 7B-7C jointly illustrate a more detailed block diagram for automatic generation of software application code in a configurable programming language in one or more embodiments. In these embodiments, a data model in a source programming language may be identified or generated at 702B; and a target programming language, platform, or environment (collectively target programming language) may be identified at 704B.

A plurality of data model attributes may be determined at 706B for the target programming language. For example, attributes such as the name, language, format, syntax, etc. of the data model may be first identified from the data model in the source programming language. The corresponding attributes may then be determined at 706B for the target programming language.

As described above, some data models may explicitly include corresponding sets of rules for a plurality of classes, whereas some other data models do not explicitly or implicitly include any such rules at all. For example, data models constructed under the term identification techniques or term embedding techniques described above do not explicitly or implicitly include any such rules, much less rules that correspond to respective classes. As a result, the decision logic and/or patterns may be extracted (e.g., from the classification results) and converted at 708B into a hierarchical set of rules. For example, the decision logic or patterns corresponding to a class determined by these data models may be transformed into a set of rules as described above. Based on the hierarchy of the class in the hierarchical class data structure, this set of rules may be similarly inserted into the corresponding hierarchy in a hierarchical rule data structure.

In some embodiments where the data model does not explicitly or implicitly include any rules, the data model may be optionally transformed into a rule-based data model with the hierarchical set of rules at 710B. One of the advantages of this transformation into rule-based data models is that these rules may be constructed in such a way that the evaluation of these rules only involves simple operations, rather than any iterative processing using artificial intelligence, natural language processing, or machine learning techniques although these techniques may nevertheless be used in constructing the original data models for better accuracy. A derived advantage of such data models is that these rules may be constructed such that the corresponding real-time data models are quickly generated and can be installed on almost any computing systems such as user computing devices, servers, etc. Therefore, the expediency of these real-time models enables the execution of these real-time data models on almost any computing devices and thus conserves network resources.

At 712B, a plurality of hierarchical classes comprising parent classes and respective one or more child classes may be identified from the data model identified or generated at 702B or from the rule-based data model optionally generated at 7106. The plurality of hierarchical classes may be identified from a hierarchical class data structure as previously described in some embodiments. In some other embodiments where no such hierarchical class data structure exists, a hierarchical class data structure may be created to store the plurality of hierarchical classes according to their hierarchical relations.

A class may be identified from the hierarchical data structure at 714B; and a set of tokens or terms as well as the functional or logical relations that jointly defines or represents one or more patterns upon which the decision logic or one or more rules are predicated upon for the class may be determined at 716B. A token may include, for example, expressions (e.g., regular expressions), specific textual syntax, standard textual syntax, one or more sequences of characters and/or meta-characters, etc. that define or represent a pattern resulting in the classification of inputs into a specific class.

A pattern includes the arrangement of information that a matching inquiry needs to conform to example, a pattern may include the terms "eval", "evaluation", or "demo" but does not include any of the terms or tokens "seminar", "webinar", "semiar", "webex", "train", "certificate", "survey", "conference", or "renew". In this example, a matching inquiry needs to include at least one term or token of "eval", "evaluation", or "demo" but cannot include any of "seminar", "webinar", "semiar", "webex", "train", "certificate", "survey", "conference", or "renew". These terms or tokens may be determined by, for example, the aforementioned term identification techniques or term embedding techniques; and the above pattern is extracted by, for example, a pattern extractor from a classification data structure and formulated into a rule that can be evaluated quickly with simple comparison of terms and Boolean operations.

A hierarchical rule data structure may then be identified or generated at 718B to store the rule generated at 716B. The hierarchy at which the rule is located may be determined based on the hierarchy of the class identified at 714B in the hierarchical class data structure. In some embodiments where the class identified at 712B has one or more parent classes, the rule generated at 716B may include or reference the one or more corresponding sets of rules for the one or more parent classes.

This concatenation of sets of rules for parent class and child class is to improve the accuracy of classification so that any input that is classified into the child class also satisfies the corresponding sets of rules for the parent classes of the child class. In some other embodiments, the set of rules for a class does not include or reference the corresponding sets of rules of the parent classes of the class. In these latter embodiments, the classification accuracy may be improved or ensured by traversing the hierarchical rule data structure or the hierarchical class data structure to apply the corresponding sets of rules to the input.

The rules or decision logic associated with the class may be processed at 720B at least by splitting on spaces and by looping through non-blank tokens. This processing of decision logic or rules may be done by invoking, for example, a regular expression processor to translate regular expressions into internal representations that may be executed and matched against textual strings from an input. Some examples of such processing include replacing multiple spaces with a single space, replacing commas with a space, replace Boolean operators (e.g., AND, OR, NOT) with corresponding expressions, escape periods, escape slashes, etc. A rematch may be performed at 722B for the plurality of tokens or items with respect to tokens such as periods, parentheses, etc., and the plurality of items or tokens may be added back to the hierarchical rule data structure as a hierarchical rule for the class identified at 714B.

The plurality of items or tokens and optionally their functional or logical relations may be added to the hierarchical rule data structure as a rule at 724B. This hierarchical rule may be further converted or transformed at 726B into a plurality of sub-parts that may be further arranged according to the syntax requirements of the target programming language. In some embodiments, this conversion or transformation may be done based in part or in whole upon the functional and/or logical relations among the plurality of sub-parts.

The hierarchical information for the rule may be determined at 728B at least by looping through all child hierarchies and/or parent hierarchies of the class identified at 714B. A hierarchical class data structure may be optionally determined at 730B, if not already existing, based in part or in whole upon one or more criteria. For example, the hierarchical structure of a plurality of classes may be determined based at least in part upon the frequency of occurrences of the representative identifier or the associated terms or tokens of a class with each other in some embodiments.

As a practical example, two class identifiers that have a higher frequency of occurrences with N words from each other may be hierarchically arranged as reporting to the same parent class. As another example, the hierarchical structure of a plurality of classes may be determined based at least in part upon the close proximity of the representative class identifiers or the associated terms or tokens of two classes. A practical example includes two class identifiers whose vector representations are determined to be within a threshold distance from each other. In this example, these two classes may also be determined to report to the same parent class.

This process may repeat for every class in the hierarchical data structure until each recognized class at a class hierarchy is associated with a corresponding set of rules at the corresponding rule hierarchy. With these sets of rules corresponding to a plurality of classes determined, a real-time data model may be generated at 732B in the selected target programming language by expressing the rules in the syntactical requirements of the target programming language and arranging these rules according to the relations (e.g., hierarchical relations between rules or classes) using, for example, constructs and/or nested conditional statements.

The following pseudo code illustrates a portion of a data model in a first programming language (XML in this example):

```
<node id="node1" name="Shop/Buy" >
  <node id="node2" name="EasyAcct">
  <node id="node3" name="Eval / Trial">
  <node id="node4" name="General Account Maintenance" >
    <node id="node5" name="Additional Firm">
    <node id="node6" name="Update Account Name">
    <node id="node7" name="Update Address">
    <node id="node8" name="Update Contact info">
    <node id="node9" name="Update Credit Card">
    <node id="node10" name="Update e-mail">
    <node id="node11" name="Delete Contact">
</node>
<node id="node12" name="Renewal">
  <node id="node13" name="Auto-renew">
  <node id="node14" name="DMS">
  <node id="node15" name="DPP">
  <node id="node16" name="Discount">
  <node id="node17" name="E-Signature">
  <node id="node18" name="Easy Acct">
```

```
<node id="node19" name="Fast Path">
    <node id="node20" name="Price / Inquiry">
</node>
```
.
.
.

```
<rule    node-ref="rulenode1"><item    type="match"
    value="updat* chang* modif* delet* correct*"needs to
    see","up to date","up date", uodate"/>
        <item type="match" value="account*"billing address
        "e-mail address", "new address","new phone num-
        ber", "old address", "old phone number","ship to
        address","ship-to-address" "my phone number" "the
        phone number" "address information" "old address"
        address, email, "e-mail" "e-mail", name*, phone,
        contact, crispy, cmpartysub, fax cc card, pmt, billing
        information"/>
```

The following pseudo code illustrates a portion of a real-time data model that is automatically generated by an automatic code generator in a second programming language (JavaScript in this example):

```
function classify(phrase) {
    var classification = [ ];
    model="Smart Routing";
    // Shop/Buy
    {
        // Eval / Trial
        if ( ( phrase.match(/(\beval\b|\bevaluation\bdemo\b)/i ) )
    && !( phrase.match(/(\bseminar|\bwebinar|\bsemiar|\bsemianr|\bweb
ex\b|\btrain|\bcertificate\b|\bsurvey\b|\bconference\b|\brenew)/i ) )) {
            classification.push("Shop/Buy >> Eval / Trial");
        }
        // Seminars/Webinars
        if
( ( phrase.match(/(\bseminar|\bwebinar|\bsemiar|\bsemianr|\bwebex\b|\b
train|\bconference\b|\bCPE\b|\bcertificate\b)/i ) )
    && !( phrase.match(/(\bEasy\sAcct\b|\bEBS\b|\bEasyAcct\b|\beasy|\b_
id_source:apd_lacerte_ts\b|\bPPR\b|\bPay\sPer\sReturn\b|\bPay(-|)Per(-
|)Return\b|\bconference\scall\b|\brenew)/i ) )) {
            classification.push("Shop/Buy >> Seminars/Webinars");
        }
        // Renewal
        if ( ( phrase.match(/(^(?=.*\bauto)(?=.*\bstatus\b).*$)/i ) )) {
            var classCount = classification.length;
            // Auto-renew
            if ( ( phrase.match(/(\bauto\srenew\b)/i ) )
    && !( phrase.match(/(\bauto\spay\b|\bautopay\b|\bEasy\sAcct\b|\bEBS\b|\
bEasyAcct\b|\beasyA|\bEasy\sACCT\b)/i ) )) {
                classification.push("Shop/Buy >> Renewal >> Auto-renew");
            }
            // Price / Inquiry
            if
( ( phrase.match(/(\bdiscou|\bpric|\bcost|\btoo\sexpensive\b|\bexpensive\b|\
bcharge\stoo\smuch\b|\btoo\smuch\smoney\b|\bCheaper\b|\bexpensive\b|\
btoo\smuch\b|\btoo\shigh\b|\bgreed|\bdisc\b)/i ) )
    && !( phrase.match(/(\bEasy\sAcct\b|\bEBS\b|\bEasyAcct\b|\beasy|\b
Costello\b|\brenew)/i ) )) {
                classification.push("Shop/Buy >> Renewal >> Price /
Inquiry");
            }
            if ( ( phrase.match(/(\bREP\b|\bPPR\b)/i ) ) &&
( phrase.match(/(\bDiscoun|\bPric)/i ) )) {
                classification.push("Shop/Buy >> Renewal >> Price /
Inquiry");
            }
            // Discount
            if ( ( phrase.match(/(\bERD\b|\bdiscount\b|\bdisc\b)/i ) )
    && !( phrase.match(/(\bREP\b|\bPPR\b|\bPay(-|)per(-|)return\b)/i ) )) {
                classification.push("Shop/Buy >> Renewal >> Discount");
            }
            // DPP
            if ( ( phrase.match(/(\bdpp\b|\bddp\b|\bdeferred\b)/i ) )) {
                classification.push("Shop/Buy >> Renewal >> DPP");
            }
            // Fast Path
            if ( ( phrase.match(/(\bfast\spath\b|\bfastpath\b)/i ) )) {
                classification.push("Shop/Buy >> Renewal >> Fast Path");
            }
            if ( ( phrase.match(/(\bfast\spath\b|\bfastpath\b)/i ) )) {
                classification.push("Shop/Buy >> Renewal >> Fast Path");
            }
            // Easy Acct
            if ( ( phrase.match(/(\beasy\sacct\b|\beasy\sact\b)/i ) )) {
                classification.push("Shop/Buy >> Renewal >> Easy Acct");
            }
            // DMS
            if ( ( phrase.match(/(\bDMS\b)/i ) )) {
                classification.push("Shop/Buy >> Renewal >> DMS");
            }
            // E-Signature
            if ( ( phrase.match(/(\besig\b|\be(-|)sig\b|\be(-
|)signature\b|\besignature\b)/i ) )) {
                classification.push("Shop/Buy >> Renewal >> E-Signature");
            }
            if (classCount == classification.length)
                { classification.push("Shop/Buy >> Renewal >> Renewal-Other"); }
        }
```

Figure 8A:
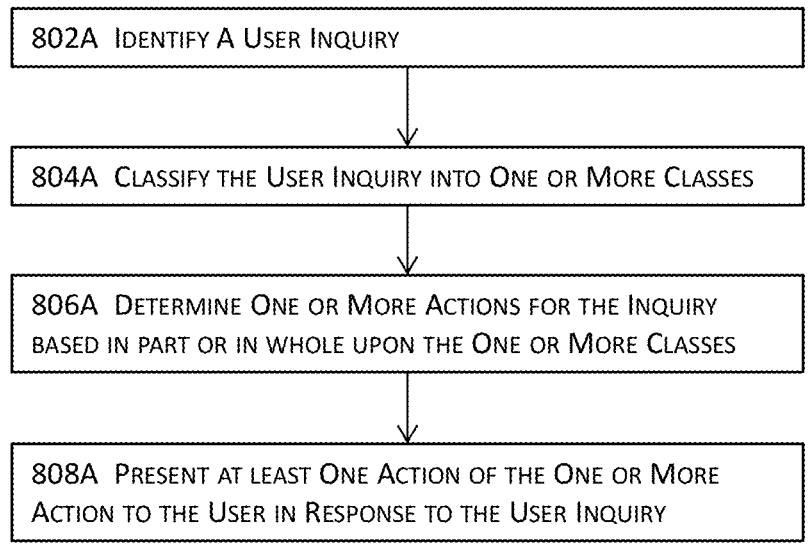
FIG. 8A illustrates a high level block diagram for providing recommendations in response to inquiries with real-time or reactive computing techniques in one or more embodiments.

FIG. 8A illustrates a high level block diagram for providing recommendations in response to inquiries with real-time or reactive computing techniques in one or more embodiments. In these embodiments, a user inquiry may be identified at 802A. This user input may be provided to a data model as an input to be classified. The data model may then classify the user inquiry at 804A using techniques described above. As described above, the data model may be configured in such a way to classify the user inquiry in real-time or in nearly real-time.

One or more actions may be determined at 806A for fulfilling the user inquiry based in part or in whole upon the one or more classes. A view may be prepared to include at least one of the one or more actions and may be presented to the user at 808A to address or respond to the user inquiry. These one or more actions may be determined in a variety of different ways. In some embodiments, these one or more actions may be looked up from a data structure that includes information about a plurality of pre-recognized classes and their corresponding actions. This data structure may be constructed, maintained, and continuously updated and improved through a plurality of classification tasks for a plurality of user inquiries during various interactions of a plurality of users with a software application licensing or delivery model over a long period of time.

In some other embodiments where such a data structure does not yet exist (e.g., the unavailability of a sufficiently long or any history of prior classifications), the association between a plurality of classes and their corresponding actions may be established by using term embedding techniques. More specifically, both the plurality of classes and the plurality of actions may be vectorized into corresponding vector representations in a vector space.

After transforming both the plurality of classes and the plurality of actions may be vectorized into corresponding vector representations in the same vector space, respective distances between the plurality of classes and the plurality of actions may be determined. Because the term embedding techniques employed in the determination of these vector representations result in more similar pieces of information (e.g., classes and actions or description of actions) being transformed into vectors that are in closer proximity of each other, a class may thus be associated with one or more actions whose vector representations are in some close proximity to the class.

Another similar approach for determining one or more actions for a class is to classify the plurality of actions into a plurality of action classes and assign an action class representative to an action class (e.g., determining a representative action or a representative description of an action for an action class). An action class representative may be determined to be the action that is approximately or exactly equidistant to the remaining actions in the same class. The plurality of actions may be classified into a plurality of action classes by applying the term embedding techniques to, for example, the respective description of the plurality of actions in some embodiments. In these embodiments, more detailed descriptions of these actions may lead to more precise classification results.

In some other embodiments, the plurality of actions may be classified by applying the term embedding techniques to, for example, the respective description of the plurality of actions within additional context information about the respective contexts pertinent to the plurality of actions. Such contexts may include, for example, information about the software application licensing or delivery models, the general fields of use of the software application licensing or delivery models, information about users, etc. The information about these contexts may be provided to the term embedding techniques to aid the classification of the plurality of actions and/or the classification of user inquiries.

Figure 8B:
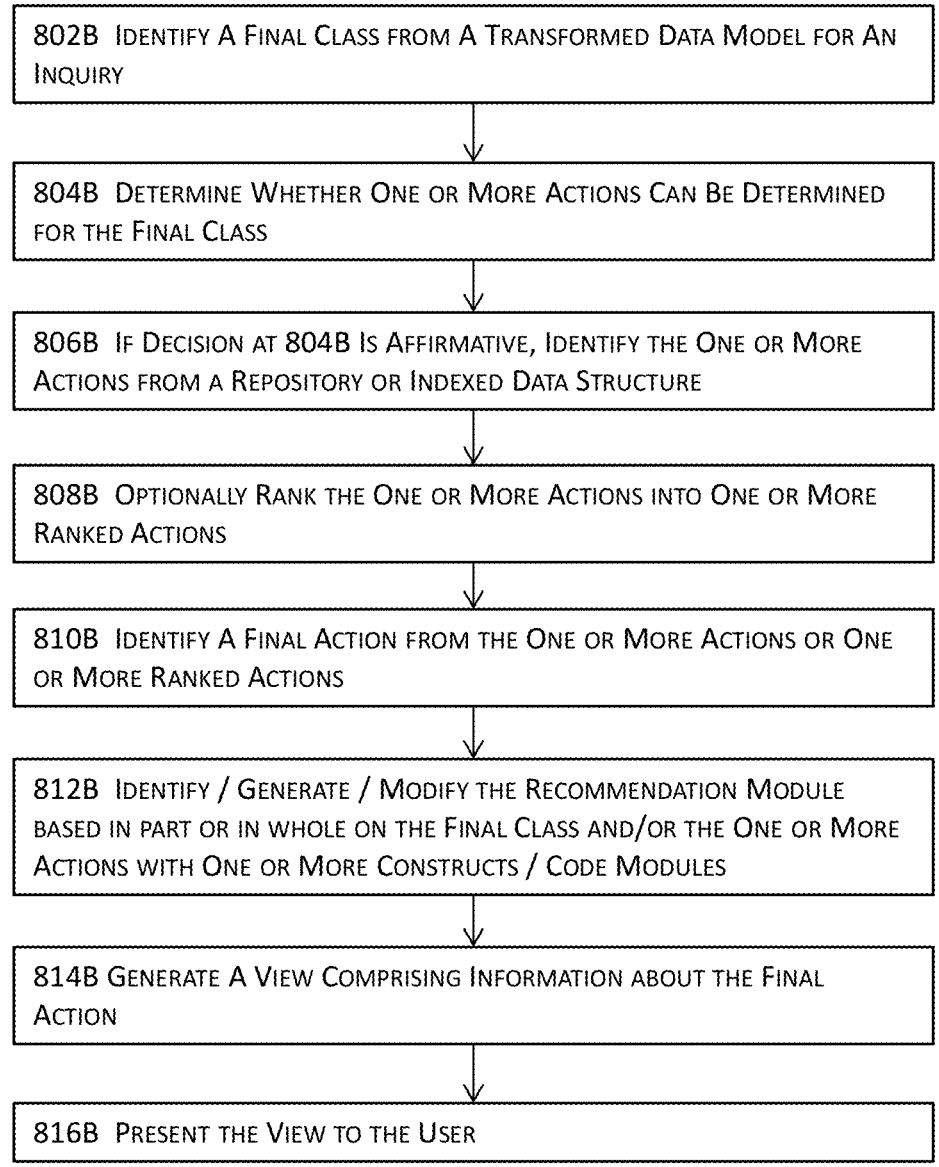
FIG. 8B illustrates a more detailed block diagram for providing recommendations in response to inquiries with real-time or reactive computing techniques in one or more embodiments.

FIG. 8B illustrates a more detailed block diagram for providing recommendations in response to inquiries with real-time or reactive computing techniques in one or more embodiments. In these embodiments, a class into which an inquiry is classified may be identified at 802B from the classification result generated by a data model. A data model (e.g., a real-time data model) may determine whether one or more actions can be determined for the class at a recommendation module at 804B.

An action may include, for example, presentation of one or more media files (e.g., video, pictures, screen shots, help documentation, frequently asked questions (FAQs), etc.) in one or more presentation formats, initiation of one or more guided software application flows with custom flow nodes that address or respond to the inquiry, invocation of a code module to present one or more helper objects to a user, invocation of live technical or support personnel through online chat sessions, telephone sessions, email communications, or any other suitable actions that may fulfill the inquiry from the user, etc. in some embodiments.

In some embodiments, each class in a plurality of classes may be associated with one or more actions; and this association may be pre-established by, for example, prior processing of inquiries, heuristics, etc. and stored in a data structure. For example, the hierarchical class data structure may include one or more columns for each row to include the information or links about the one or more actions associated with the class. In some embodiments, this hierarchical class data structure may even include the physical addresses of these one or more actions to further facilitate the access to these one or more actions.

If the determination results at 804B are affirmative, these one or more actions may be identified at 806B from a repository or from an indexed data structure. In the aforementioned example of including information or links of one or more actions for each class in the hierarchical class data structure, this hierarchical class data structure may be used for improved access to the information of these actions.

These one or more actions identified for a class may be optionally ranked at 808B into one or more ranked actions based in part or in whole upon one or more criteria. These one or more criteria may include, for example, the relative or absolute complexities of these one or more actions, the respective amounts of resources needed for these one or more actions, previous acceptance rate or feedback from users for these one or more actions, the relative or absolute frequencies that these one or more actions are invoked, any other suitable ranking measures, or any combinations thereof.

In some embodiments where the determination results at 804B are negative, this class may be flagged for further domain expert review in some embodiments. In some other embodiments, this class leading to no identified actions and/or the other pertinent information (e.g., the original inquiry, the normalized or processed inquiry, the pertinent rules, etc.) may be gathered into a training or calibration data set or a training instance to further calibrate the data model that classified the user's inquiry into the class identified at 802B. In some other embodiments, the association between classes and their respective one or more actions may be further reviewed to make appropriate adjustments or modifications accordingly.

A final action may be optionally identified at 8106 from the one or more actions or one or more ranked actions in some embodiments. A view may be generated to include information about the final action or to include the execution of the final action at 814B. This view may then be presented at 816B in the user interface of the user computing device in response to the user's inquiry. In some other embodiments, more than one action may be identified and subsequently presented to the user in response to the user's inquiry that is classified into the class identified at 802B. The recommendation module or a smaller portion thereof (e.g., a construct) may be optionally generated (if not yet existing), identified (if already existing), or modified (if already existing and modification is warranted) at 812B to reflect the determination and identification of the one or more actions, the optional one or more ranked actions, and the optional final action for the particular class identified at 802A.

Figure 8C:
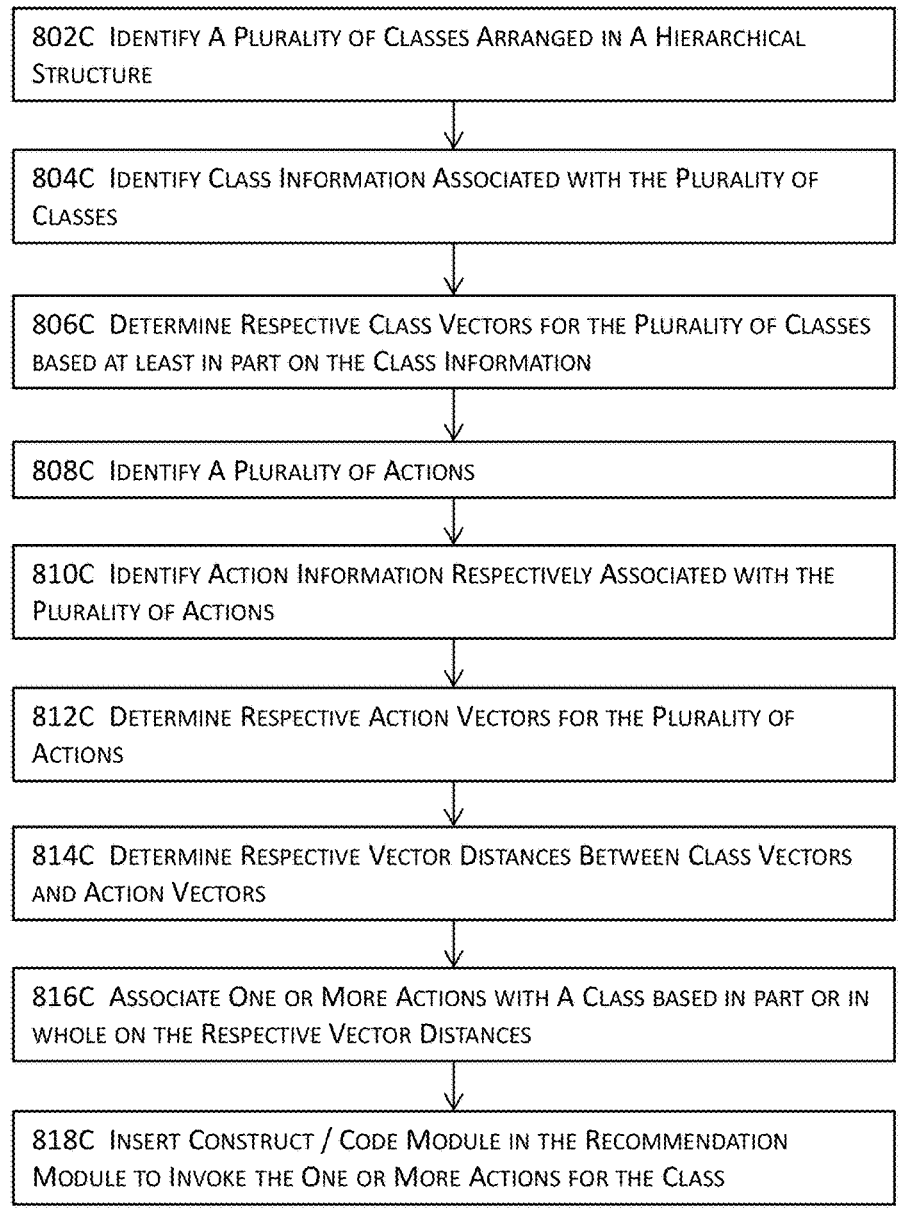
FIG. 8C illustrates another more detailed block diagram for providing recommendations in response to inquiries with real-time or reactive computing techniques in one or more embodiments.

FIG. 8C illustrates another more detailed block diagram for providing recommendations in response to inquiries with real-time or reactive computing techniques in one or more embodiments. In these embodiments, a plurality of classes that are arranged in a hierarchical structure may be identified at 802C. The respective class information that is associated with the plurality of classes may be identified at 804C.

In some embodiments, the respective class information may include, for example, any information that leads to the classification of an input into a particular class. For example, the respective class information may include the plurality of terms or tokens that are used to determine whether an input falls within a particular class, the plurality of terms (e.g., from classification results) that are considered as falling within a particular class, the functional or logical relations among the plurality of terms or tokens, hierarchical information of a specific class, etc.

Respective class vectors may be determined or computed at 806C for the plurality of classes using term embedding techniques based in part or in whole upon the class information identified at 804C. In some embodiments where the hierarchical information for the plurality of classes are identified at 804C as a part of the class information, the coefficients or weights in determining the corresponding vectors of the plurality of classes may be adjusted so that the corresponding vectors correspond to the hierarchical structure of the plurality of classes. For example, the coefficients or weights in determining the corresponding vectors of the plurality of classes may be adjusted so that classes under the same parent class are closer to each other in the vector space than classes under different parent classes, and that the corresponding vectors naturally form groupings that reflect the hierarchies in the plurality of classes.

A plurality of actions may be identified at 808C; and action information that is respectively associated with the plurality of classes may be identified at 810C. The plurality of actions may be further vectorized into a plurality of action vectors at 812C. In some embodiments, an action may be executable but may not be subject to vectorization in and of itself. In these embodiments, an action may be vectorized by applying term embedding techniques to, for example, the description, metadata, or other information about the action.

Respective distances between an action vector and a plurality of class vectors may be determined at 814C where a smaller distance indicates that the action vector is closer to the class vector, and thus the action (from which the action is determined) may be considered as closer to the class (from which the class vector is determined). In this manner, each class may be associated with one or more actions whose vector representations are within close proximity (e.g., within a prescribed threshold distance) of the class. These one or more actions may then be associated with the class at 816C based in part or in whole upon the respective vector distances.

In some embodiments, a construct or a code module may be optionally inserted in the recommendation module at 818C to invoke at least one of the one or more actions for the class. With the addition of the construct or code module, the recommendation module may automatically invoke at least one of the one or more actions associated with the class every time when a class is determined by, for example, a real-time data model for an inquiry.

Figure 9A:
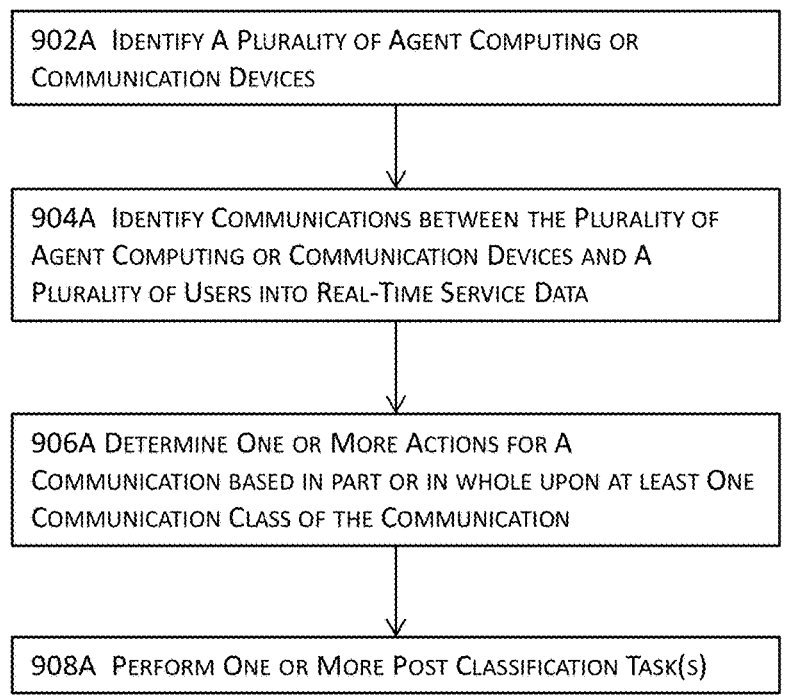
FIG. 9A illustrates a high level block diagram for capturing and classification of digital data and providing recommendations using real-time computing techniques or reactive computing techniques in one or more embodiments.

FIG. 9A illustrates a high level block diagram for capturing and classification of digital data and providing recommendations using real-time computing techniques or reactive computing techniques in one or more embodiments. In these embodiments, a plurality of remote agent computing or communication devices may be identified at 902A. These remote agent computing or communication devices include the communication devices (e.g., telephone, etc.) and computing devices (e.g., computers, tablets, smart phones, etc.) and are primarily used to communicate with users of one or more software application licensing or delivery models.

One or listening modules may be employed to capture communications between the plurality of agent computing or communication devices and a plurality of users of one or more software application licensing or delivery models at 904A. These communications may include digital data (e.g., online chats, messages, emails, etc.), analog data (e.g., telephone conversations) that may be subsequently transformed into a digital form, or logs of activities of users or agents (e.g., searches, flags, opening ticket items, etc.), or any other data that may aid the improvement of any aspects (e.g., functional, business, user satisfaction or retention, etc.) of these one or more software application licensing or delivery models.

One or more actions may be determined for a communication in the communications by, for example a recommendation module based at least in part on at least one communication class into which the communication is classified in real-time or substantially real-time at 906A. The classification of the communication may be performed with any of the classification techniques described herein and operates upon only the smaller portion provided by a user but not upon another portion provided by an agent in the communication.

One or more post classification tasks may be performed at 908A, and at least one of these one or more post classification tasks is performed based in part or in whole upon the one or more actions. These one or more post classification actions may include, for example, determining deviations between the one or more actions determined by, for example, the recommendation module and one or more recommendations provided by an agent, update active learning data for retraining or calibrating various models or modules described herein, initiation of a messaging session, which is transparent to users, with an agent, intervening into the communication session between an agent and a user, etc.

Figure 9B:
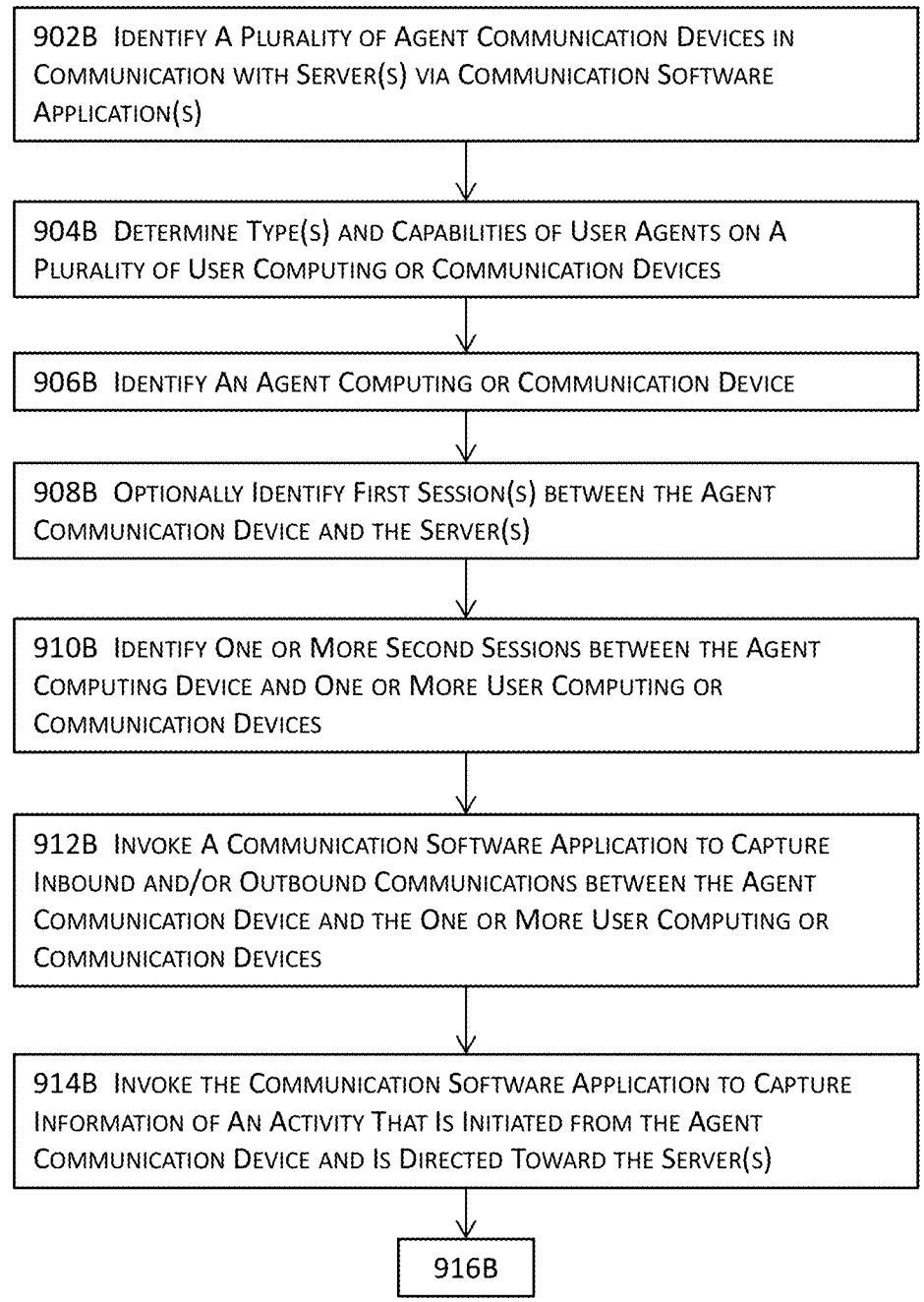
FIGS. 9B-9C jointly illustrate a more detailed block diagram for capturing and classification of digital data and providing recommendations using real-time computing techniques or reactive computing techniques in one or more embodiments.
Figure 9C:
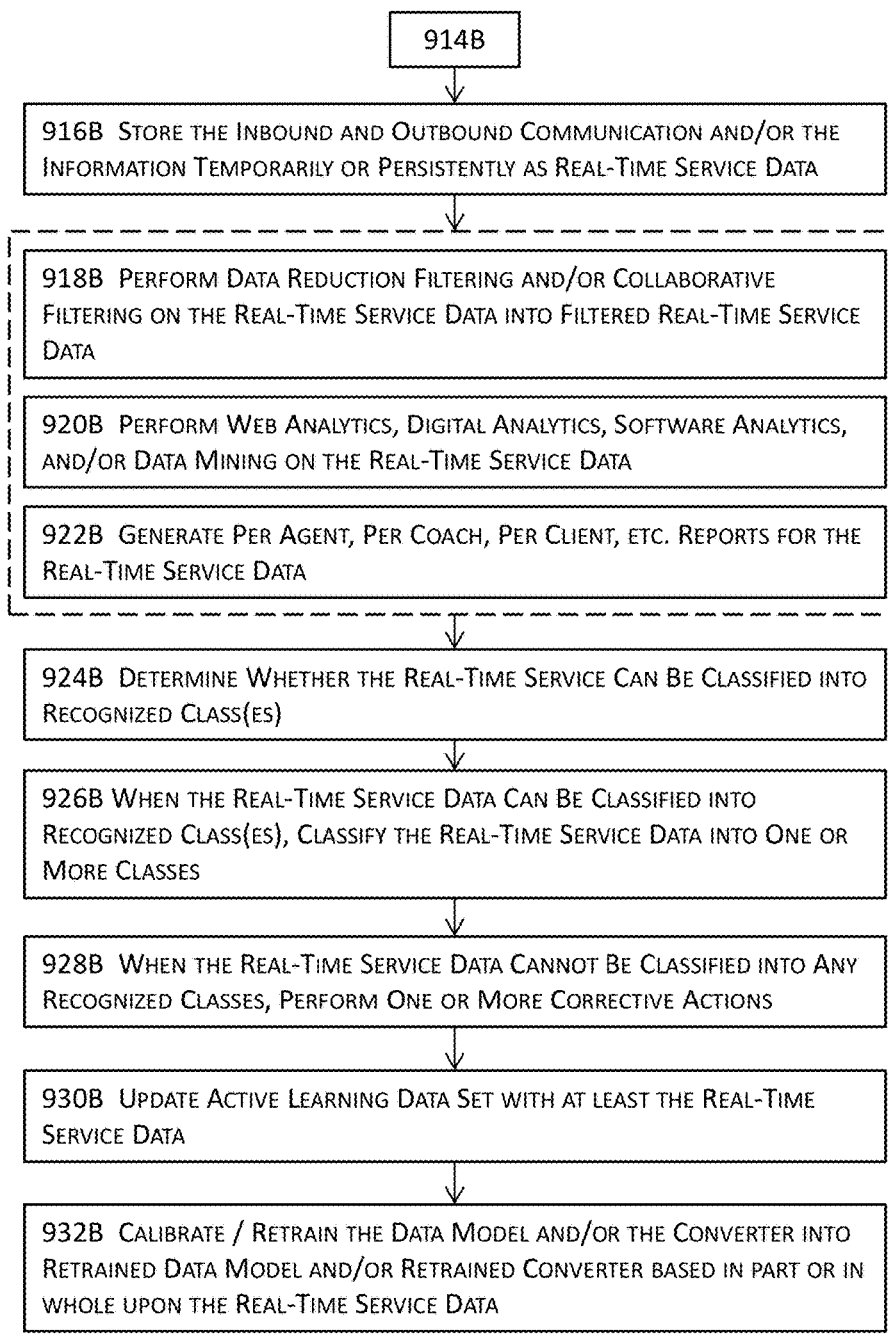

FIGS. 9B-9C jointly illustrate a more detailed block diagram for capturing and classification of digital data and providing recommendations using real-time computing techniques or reactive computing techniques in one or more embodiments. In these embodiments, a plurality of agent computing or communication devices in communication with one or more servers via one or more communication software application modules may be identified at 902B. At 904B, one or more types and capabilities of user agents on a plurality of user computing or communication devices may be determined. An agent computing or communication device may include a plurality of user agents (e.g., browsers, crawlers, etc.) installed thereupon, and the plurality of user agents may have different types and capabilities in some embodiments.

These remote agent computing or communication devices include the communication devices (e.g., telephone, etc.) and/or computing devices (e.g., computers, tablets, smart phones, etc.) and are primarily used to communicate with users of one or more software application licensing or delivery models. A communication software application module may capture the communications between an agent communication or computing node and a user and may be installed either locally on each agent computing or communication node or centrally on or around one or more servers to which the plurality of agent computing or communication nodes are connected.

An agent communication or computing device operated by an agent may be identified at 906B from the plurality of agent communication or computing devices. An agent may include human support personnel, a chatterbot, or an Internet relay chat (IRC) bot. An IRC bot includes a set of program code or an independent program that connects to Internet Relay Chat as a client and so appears to other IRC users as another user. An IRC bot may be configured to perform automated functions. Internet Relay Chat (IRC) includes an application layer protocol that facilitates communications in the form of text.

One or more first sessions between the agent communication or computing device and one or more servers may be optionally identified at 908B. A session includes a semi-permanent interactive information interchange, also known as a dialogue, a conversation, or a meeting, between two or more communicating devices. These one or more first sessions may be identified for a communication software application module to capture the communications between the agent communication or computing device and one or more users of one or more software application licensing or delivery models. As described earlier, the communication software application module may be installed locally or centrally to capture all or some inbound and outbound communications between agents and users. In addition, many types of communications (e.g., online chat sessions, voice over IP communications, emails, etc.) are routed through a server before reaching the destinations. As a result, the identification of these one or more first sessions at 908B may be entirely optional.

One or more second sessions between the agent communication or computing device and one or more respective users may be identified at 910B. In some embodiments, a server or a communication software application module may dynamically poll various communication ports on the plurality of agent computing or communication devices, rather than maintaining static links to the plurality of agent communication or computing devices, in order to conserve network resources.

A communication software application may be invoked at 912B to capture inbound and/or outbound communications between the agent communication or computing device and one or more user devices in communication with the agent communication or computing device. This communication software application may also be termed as a listening module in this application.

The communication software application may further be executed at 914B to capture information of an activity that is initiated from the agent communication or computing device and is directed toward the one or more servers in communication with the agent communication or computing device. Such an activity may include, for example, a search on the server for specific or non-specific items, an inquiry on a server, a general or specific question regarding a particular product or service, opening of a ticket item for expert actions or reviews or for a change order, the issuance of a request for specific actions, etc. In some of these embodiments, the communication software application not only captures information about the activity but also the server's response to the activity at 914B.

The inbound and/or outbound communications and/or the information about the activity may be temporarily or persistently stored at 916B as real-time service data. In some embodiments, information about the agent and/or the agent communication or computing device, the time instant or time period associated with the communications and/or the activity, information about the user and/or the user computing or communication device, etc. In some embodiments, raw data may be stored for such communications and information in addition to or in place of processed and organized information to preserve the integrity of the original records.

Once the communications and information are stored, one or more further processing tasks may be performed on the stored communications and information. In some embodiments, data reduction filtering and/or collaborative filtering may be performed at 9186 on the real-time service data to reduce the real-time service data into reduced or filtered real-time service data. More details about the data reduction filtering and collaborative filtering are described below with reference to FIG. 9E.

In some embodiments, one or more analytics tasks may be performed at 920B on the real-time service data or the filtered or reduced real-time service data. These one or more analytics tasks may include at least one of, for example, Web analytics, digital analytics, software analytics, data mining, any other desired or suitable analytics, or any combinations thereof.

A Web analytics task includes the measurement, collection, analysis, and/or reporting of Web data for understanding, improving, and/or optimizing Web usage. Web analytics may also provide information and results for various types of research and for improvement of the effectiveness of a website or a software application. In addition or in the alternative, Web analytics provides information about the number of users to a website and/or specific software applications presented therein and the number of page views.

Digital analytics includes a set of activities that define, create, collect, verify, and/or transform digital data into reporting, research, analyses, recommendations, optimizations, predictions, and automations. Digital analytics may also include various optimizations for responses to user inquiries where a user inquiry, the recommended actions, and post-action follow-ups are tracked and recorded.

Software analytics includes analytics that is directed specifically to software applications we well as their related software development processes. Software analytics describes, predicts, and improves the development, maintenance (e.g., upgrades, patches, etc.), and management of software application licensing or delivery models at least by gathering, analyzing, and visualizing information collected from various data sources within the scope of software application licensing or delivery models and their respective software development processes.

Data mining may be performed to discover patterns in data sets by using techniques such as artificial intelligence, machine learning, statistics, and database systems. Data mining may also extract information from a data set and transform the extracted information into a data structure that is understood for further use. The system described herein may invoke various database and data management techniques or processes, data pre-processing, model and inference considerations, interestingness metrics, complexity considerations, post-processing of discovered structures, visualization, and/or online updating.

In addition or in the alternative, various reports may be generated at 922B for the real-time service data. For example, various metrics, measurements, and/or statistics may be generated on a per-agent basis, per-client basis, per-manager basis, or any other appropriate basis. In addition to generating reports on an individual basis, these metrics, measurements, and/or statistics may also be aggregated to provide an integral view for a specific item (e.g., an inquiry, a recommended action, etc.)

For example, a report may be generated from the real-time service data (or the filtered or reduced real-time service data) for a particular inquiry or its corresponding class or for a plurality of inquiries or their corresponding classes to determine which areas of a software application licensing or delivery model may need to be improved. As another example, an aggregated report may also be generated for an action or a class thereof to determine the acceptability and/or user feedback of this particular action or class.

At 924B, a data model (e.g., a real-time data model) may determine whether the real-time service data (or the filtered or reduced real-time service data) may be classified into one or more recognized classes. In some embodiments where the determination result at 924B is affirmative, the real-time service data (or the filtered or reduced real-time service data) may be classified into one or more classes at 926B by a data model (e.g., a real-time data model or a data model from which the real-time data model is built).

In some other embodiments where it is determined that the real-time service data (or the filtered or reduced real-time service data) cannot be classified into one or more recognized classes at 924B, one or more corrective actions may be performed at 928B. These one or more corrective actions may include, for example, submission for domain expert reviews, preparing the real-time service data as an active or passive learning or calibration data set or an active or passive learning or calibration instance for the underlying data model, the conversion or transformation module, etc., classifying the real-time service data as a general or catch-all class, etc.

The active or passive learning data set or instance, if available, may be updated with the real-time service data or related information thereof at 930B. In some embodiments where the active or passive learning data set or instance is unavailable, the active or passive learning data set or instance may then be created with the real-time service data or related information thereof at 930B.

In some embodiments where data reduction filtering or collaborative filtering has been performed to transform the real-time service data into filtered or reduced real-time service data, information about these filtering processes may also be incorporated into the active or passive learning data set or instance. For example, terms discarded or modified by a filtering process, information about the term embedding techniques (e.g., coefficients, weights, etc.), information about data models, the contextual information referenced in collaborative filtering, or any other suitable information may also be incorporated into the active or passive learning data set or instance.

The data models, the conversion or transformation module, and/or one or more filtering processes may then be calibrated or retrained ay 932B based in part or in whole upon the active or passive learning data set or instance. As described earlier, if a data model is updated into an updated data model, this updated data model may be further processed by the conversion or transformation module to generate an updated real-time data model.

Figure 9D:
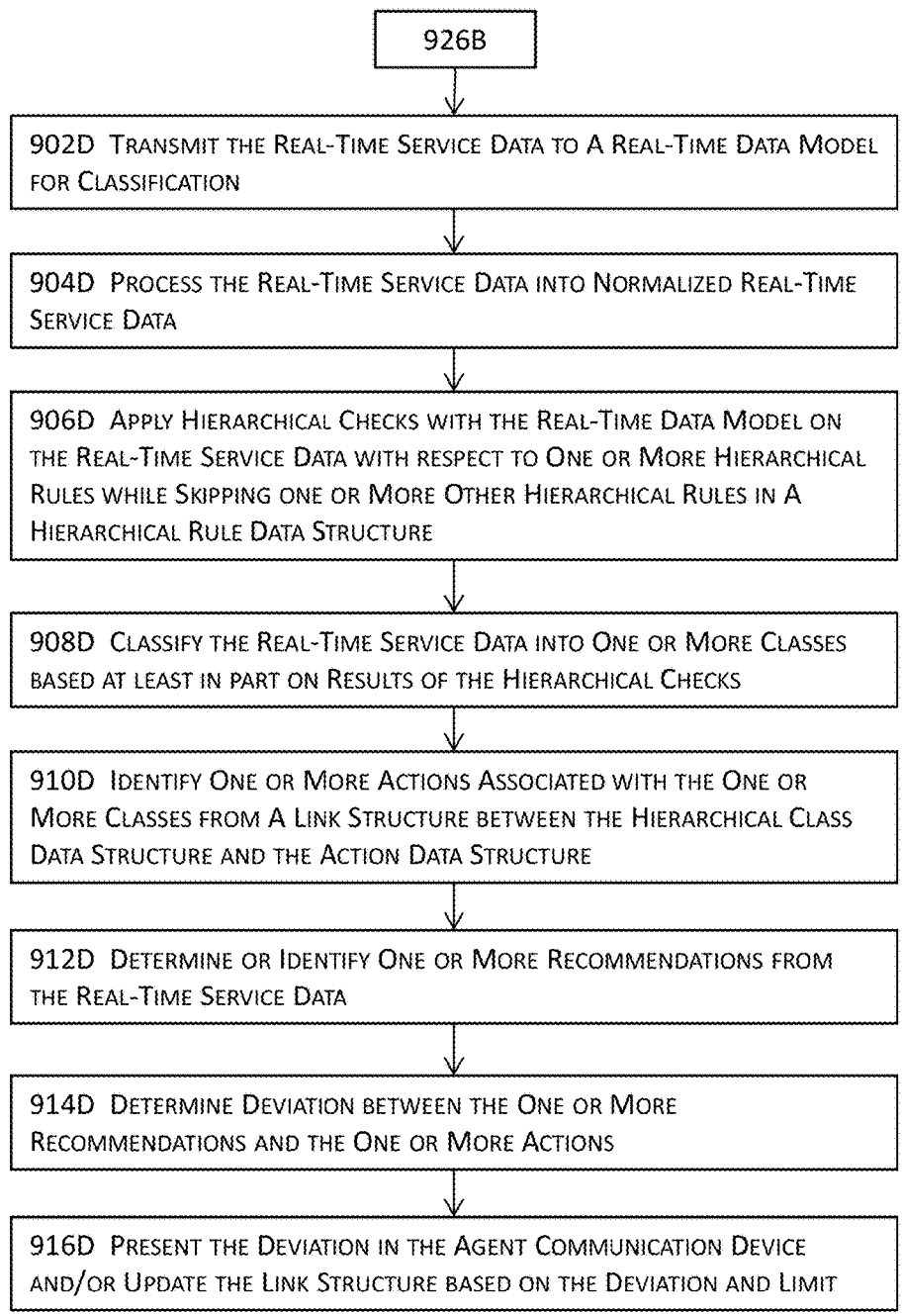
FIG. 9D illustrates a more detailed block diagram for a portion of the block diagram illustrated in FIG. 9C in one or more embodiments.

FIG. 9D illustrates a more detailed block diagram for a portion of the block diagram illustrated in FIG. 9C in one or more embodiments. More specifically, FIG. 9D illustrates more details about classifying real-time service data into one or more classes in FIG. 9C. In these embodiments, the real-time service collected by a listening module may be transmitted to a data model (e.g., a real-time data model or the data model from which the real-time data model is built) at 902D for classification.

Depending on the representation or format of the real-time service data and the syntactical requirements of the data model, the real-time service data may be processed or normalized into normalized real-time service data at 904D. For example, the real-time service data may be filtered to remove information that is irrelevant to or is less likely to contribute to classification. Such information may include, for example, the time and/or date information, the agent's name, etc. The filtered real-time service data may further be processed and transformed into a plurality of tokens that may be further arranged according to the syntactical requirements of the data model responsible for classification.

A data model may hierarchically apply a plurality of checks to the real-time service data or the normalized real-time service data at 906D. For example, a data model may apply a plurality of sets of rules against the real-time service data according to the hierarchical order (e.g., a bottom-up or top-down approach) of the hierarchical class data structure or the corresponding hierarchical rule data structure as described above. The hierarchical application of a plurality of rules eliminates unnecessary utilization of computational resources in reading certain rules into memory as well as consuming the extra processor cycles in applying these certain rules to the real-time service data.

The data model may then classify the real-time service data at 908D into one or more classes based in part or in whole upon the results of the hierarchical application of a plurality of checks to the real-time service data at 906D. Similar to the approach for user inquiries, one or more actions may be identified at 910D and associated with the one or more classes into which the real-time service data has been classified. These one or more actions are determined by the fully automated software application modules described here based on the portion of the real-time service data pertaining to user inquiries, without regard to the agent's response which may also be captured in the real-time service data. That is, these one or more actions are determined by the fully automated software modules as more appropriate to respond to a user's inquiry in real-time or nearly real-time.

One or more recommendations provided by the agent in response to the user's inquiry may be determined or responded from the real-time service data at 912D. The difference between these one or more recommendations determined or identified at 912D and those one or more actions determined or identified at 910D is that these one or more recommendations are provided by the agent and captured by a listening module as a part of the real-time service data, whereas those one or more actions determined or identified at 910D are determined by various software application modules that classify the user inquiry in the real-time service data and then identify those one or more actions based on the classification results.

The deviations, if any, between the one or more actions determined at 910D and the one or more recommendations determined at 912D may be determined at 914D. The deviations indicate the differences between what the agent actually provided in response to a user's inquiry and what various software application modules described herein determined. In some embodiments, the deviations may be presented to the agent in a user interface on the agent computing or communication device at 916D.

These deviations may be presented to the agent in a completely transparent way for the user who submitted the user's inquiry that is captured in the real-time service data in some embodiments. This type of notification to an agent may be done when various software application modules determine that the deviations fall below an acceptable threshold.

In some other embodiments where the modules have computed the one or more actions at 910D or the deviations at 914D with sufficiently high confidence level or score, these software application modules may determine that the one or more recommendations provided by the agent may not better serve the user's inquiry. In these embodiments, the techniques described herein may present the one or more actions in addition to or in the alternative of the one or more recommendations provided by the agent.

In some other embodiments where the modules have computed the one or more actions at 910D or the deviations at 914D with sufficiently low confidence level or score, these software application modules may determine that these one or more actions determined at 910D may be less accurate than the one or more recommendations provided by the agent. In these embodiments, the one or more actions determined at 910D, the one or more recommendations determined at 912D, and other pertinent information may be provided to a training or learning module or a calibration module that uses this data to retrain or calibrate the data model, the conversion or transformation module, the real-time data model, the automatic code generator, the recommendation module, or any combinations thereof at 916D.

Figure 9E:
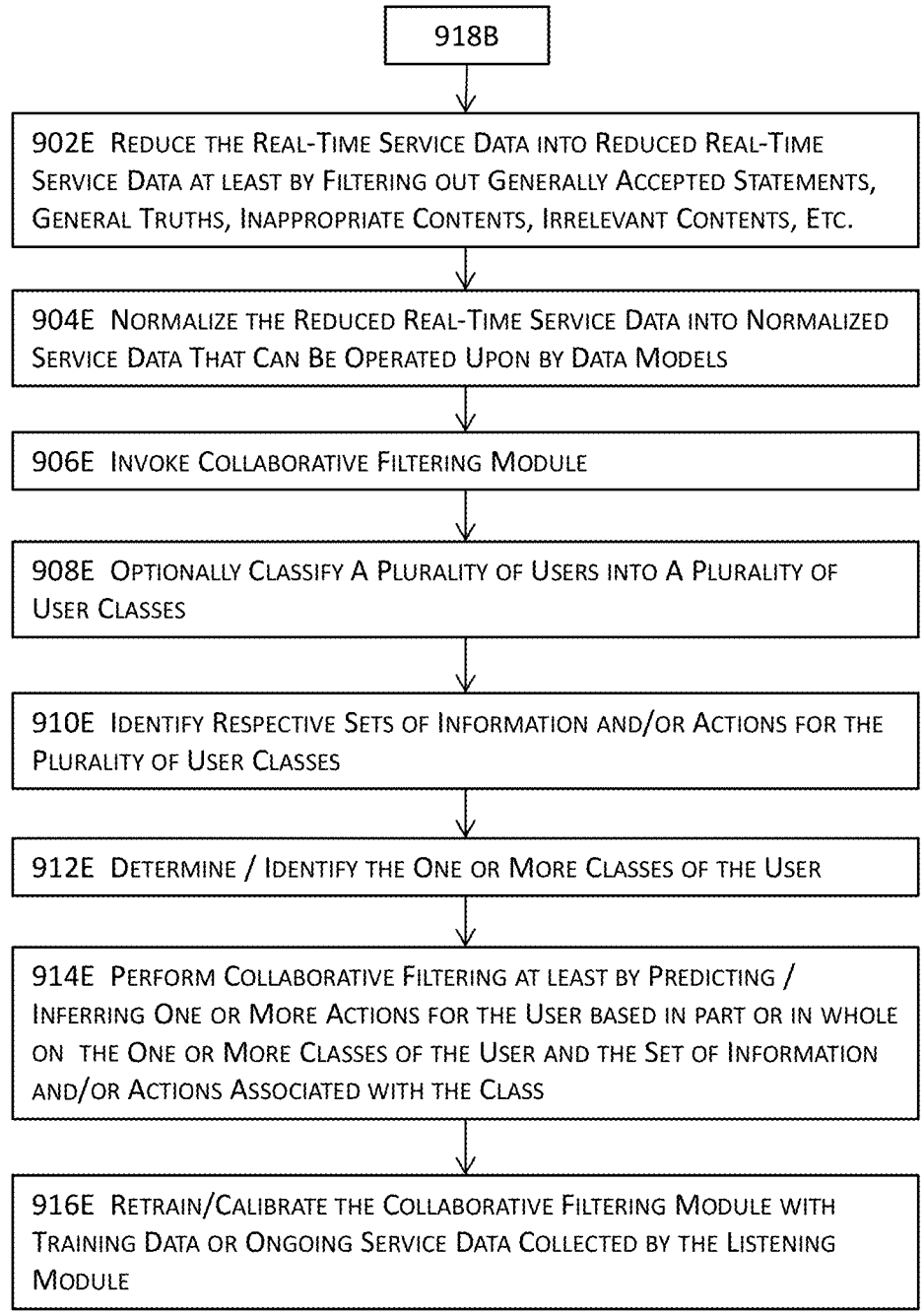
FIG. 9E illustrates another more detailed block diagram for a portion of the block diagram illustrated in FIG. 9C in one or more embodiments.

FIG. 9E illustrates another more detailed block diagram for a portion of the block diagram illustrated in FIG. 9C in one or more embodiments. More specifically, FIG. 9E illustrates more details about performing one or more filtering processes on the real-time service data. In these embodiments, the real-time service data may be reduced into reduced real-time service data at 902E at least by filtering out a portion of the real-time service data with a reduction filtering process.

For example, the reduction filter process may remove statements deemed acceptable by general users, general truths, inappropriate contents, irrelevant contents, and/or contents that are less likely to contribute to classification, or any combinations thereof in some embodiments. By reducing the real-time service data into reduced real-time service data, the computing system no longer needs as much memory footprint to hold the reduced real-time service data. Nor does the computing system need to spend as many processor cycles in processing the reduced real-time service data.

The real-time service data or the reduced real-time service data may be further normalized at 904E into normalized real-time service data. One of the objectives of normalization is to formulate the real-time service data or the reduced real-time service data into the type of data that may be operated upon by data models.

In some embodiments where collaborative filtering is performed, a collaborative filter module may be invoked at 906E. Collaborative filtering includes a process of providing automatic predictions or filtering about the interests of a user by collecting information such as preferences or taste information from a plurality of other users. In a sense, the interests of a user are thus predicted in a collaborative way because such interests are predicted with information from a plurality of other users.

In some embodiments, a collaborative module determines two users may be sufficiently similar in a first aspect if the collaborative module has already determined that these two users were similar (e.g., with sufficiently close vector representations) in one or more other aspects. Collaborative filtering may also include filtering for information or patterns by using collaboratively collected or determined information or data among multiple users, agents, user inquiries, etc. from large data sets.

The collaborative filtering module may function in tandem with a data model to optionally classify a plurality of users into a plurality of user classes at 908E. Any information describing the plurality of users may be used as input to a data model for classification. For example, information about the professions, the geographical locations, etc. of a plurality of users may be used to classify the plurality of users into user classes. These user classes may be used to indicate similarity among users in the same user class; and the collaborative filtering module may leverage this similarity in making various determinations.

Respective sets of information and/or respective sets of actions may be identified at 910E for the plurality of user classes. These respective sets of information may include, for example, the basis, patterns, tokens, terms, etc. upon which the plurality of user classes are determined. The respective sets of actions may be determined in an identical or substantially similar manner as the one or more actions for a class into which a user's inquiry is classified.

One or more user classes may be determined at 912E for a user whose communications with an agent are captured in the real-time service data. These one or more user classes may be determined by, for example, converting or transforming information about the user (e.g., the same type of information that was used in determining the plurality of user classes) into a vector representation and by identifying these one or more user classes that are in close proximity with the vector representation.

The collaborative filtering process may be performed at 914E by predicting or inferring one or more actions for the user based in part or in whole upon the one or more user classes of the user, the respective set of information identified at 910E and corresponding to the one or more user classes, and/or the respective set of actions also identified at 910E and corresponding to the one or more user classes.

In some embodiments, the collaborative filtering module may be made aware of the contexts by classifying a plurality of users into user classes with contextual information such as information about the software application licensing or delivery models or any other information pertaining to the plurality of users but not used in the classification of the plurality of users. The collaborative filtering module may also be made context aware by modifying the classification results with contextual information as well as the aforementioned term embedding techniques.

Like one or more other modules described herein, the collaborative filtering module may also be continuously retrained or calibrated at 916E with training data, training instances, or ongoing real-time service data collected by a listening module.

Figure 10A:
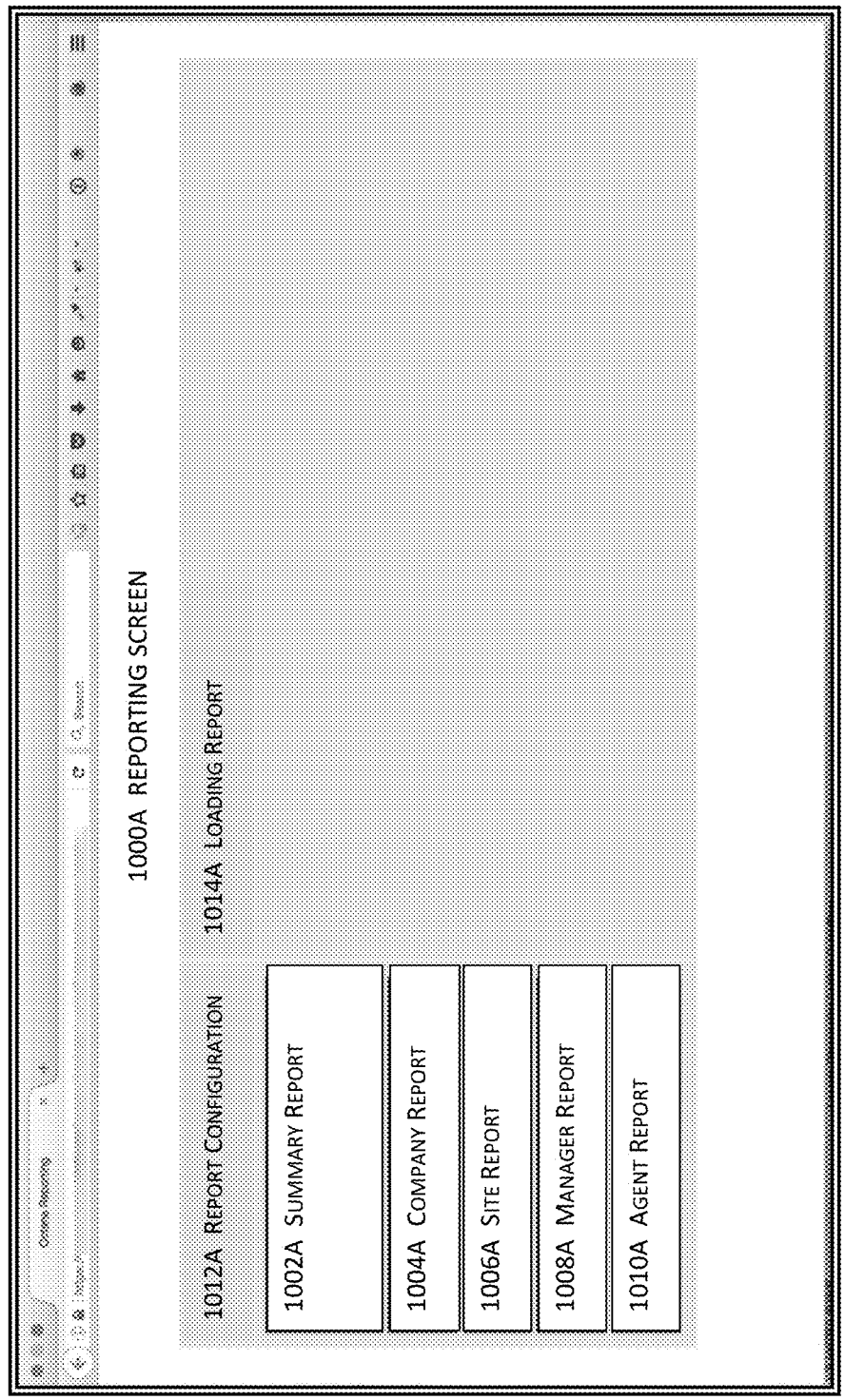

FIGS. 10A-10E illustrate some examples of capturing and classification of digital data and providing recommendations using real-time computing techniques or reactive computing techniques in one or more embodiments. FIG. 10A illustrates an example user interface that includes a reporting screen 1000A for various reports that may be generated from real-time service data.

This reporting screen 1000A may include, for example, a configuration section 1012A for configuring reports to be generated or presented. The configuration section 1012A may provide the options of a summary report 1002A, a report for a company 1004A, a report for a site 1006A, a report for a manager 1008A, and a report for an agent 1010A. This reporting screen 1000A may further include a report loading screen 1014A to show a report configured through the report configuration section 1012A.

Figure 10B:
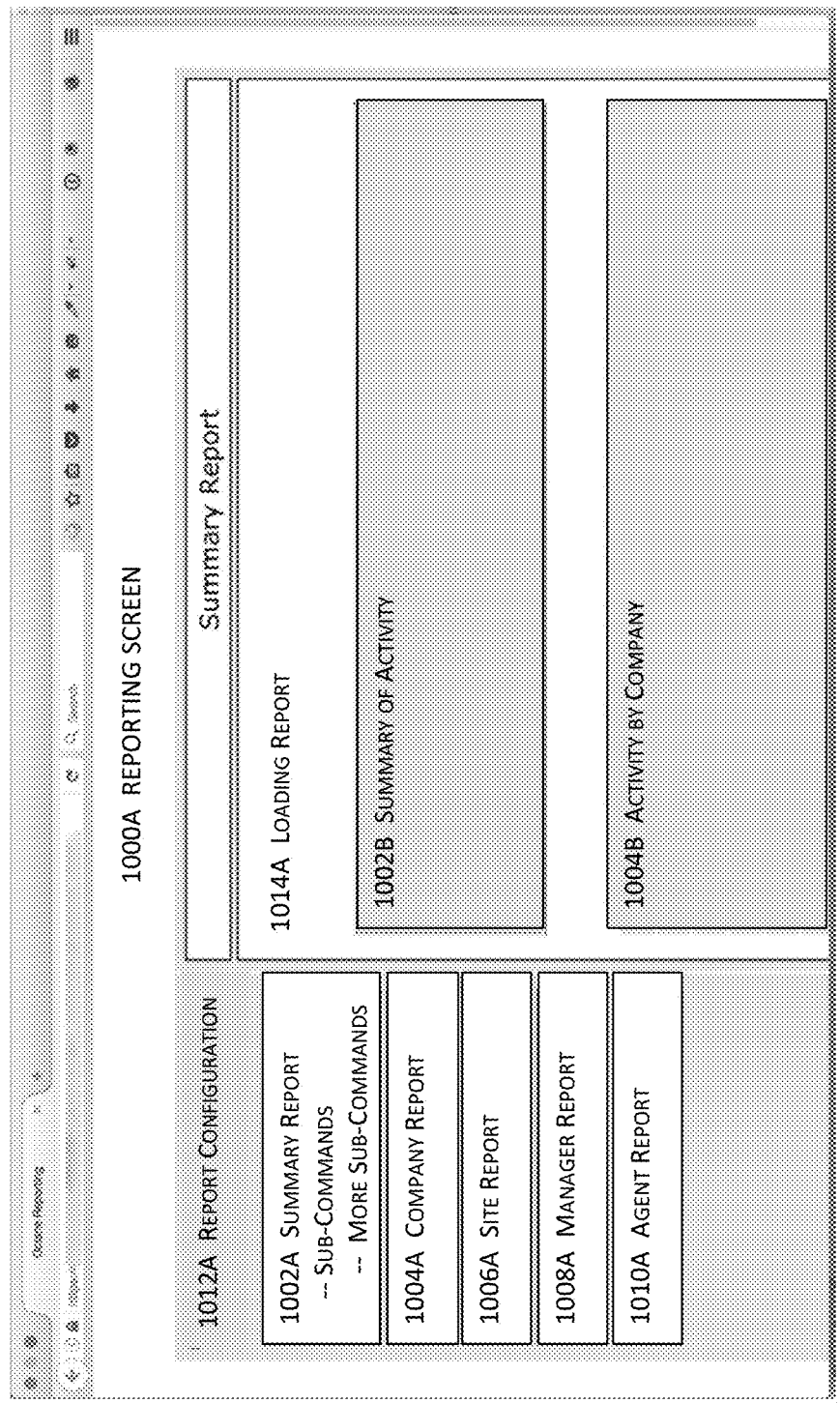

FIG. 10B illustrates the example reporting screen 1000A after some manipulations. In this example, the summary report 1002A option in the report configuration section 1012A of the reporting screen 1000A illustrates expanded, nested command structures where a user may configure a summary report via these expanded, nested commands. The report loading screen 1014A is also expended in response to the selection of one or more reports and configuration options. In this example illustrated in FIG. 10B, the report loading screen 1014A now includes a report of activities 1002B and a report for activities by companies 1004B.

FIG. 10C illustrates some examples of the report of activities 1002B and the report for activities by companies 1004B. As shown in FIG. 10C, the report of activities 1002B includes a variety of information such as the respective numbers of primary accesses, the respective numbers of contributions (e.g., article feedback, missing contents, engine feedback, etc.), the respective numbers of voting records (e.g., votes up, votes down, total votes, etc.), the respective numbers of miscellaneous data (e.g., the number of emails sent or received, the number of favorites added, the number of favorites classified, etc.)

The report for activities by companies 1004B also includes a variety of information listed by companies that deploy one or more software application licensing or delivery models of the developer. For example, this report 1004B lists the respective numbers of searches, the respective numbers of views, the respective numbers of votes up, the respective numbers of votes down, the respective numbers of emails, the respective numbers of favorites added, and the respective numbers of favorites classified by companies "A", "B", "C", "D", "E", etc.

FIG. 10D illustrates an example section of real-time service data 1000D. In this example, each entry preceded by a bullet point indicates a real-time service data entry occurred or captured at a specific time as indicated by the entry. Each entry also lists the name of the agent in communication with a user, the agent's identification, the manager (represented by "C" in the entries), the company of the user with whom the agent is communicating (represented by "Co" in the entries), the product (represented by "P" in the entries), and the location information (represented by "L" in the entries). Each of these entries is classified in real-time. Entries such as 1002D that cannot be classified into one or more pre-recognized classes may be flagged as shown in entry 1002D. In this example, these entries are classified into a catchall class "GLOBAL OTHER". These entries may be flagged for further review by domain experts or tweaks of various modules or models described above.

Figure 10E:
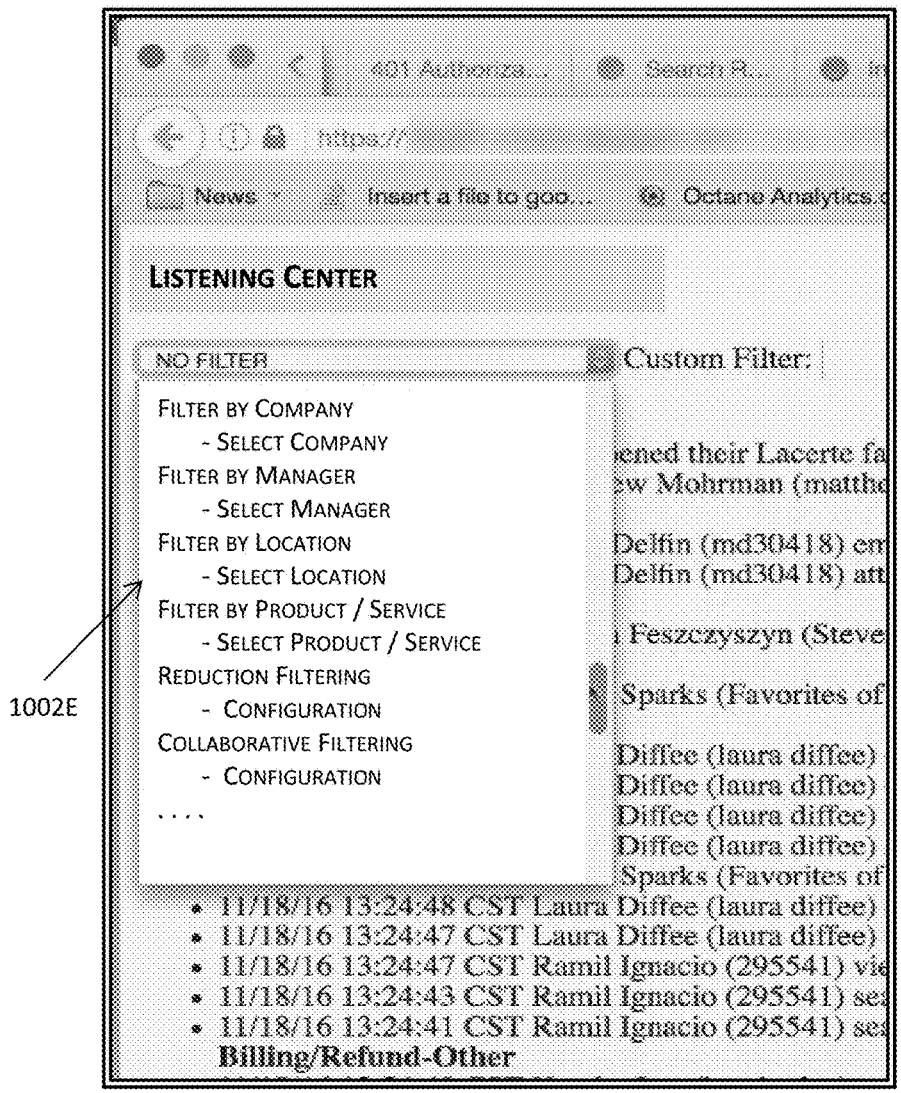

FIG. 10E illustrates some non-limiting and non-exhaustive examples of options 1002E for filtering real-time service data. In FIG. 10E, these filtering options include filter by company, filter by manager, filter by location, filter by product or service, reduction filtering, collaborative filtering, etc. where each option further includes an expandable list of commands or further configuration options.

FIGS. 10E-10I illustrate some examples of providing recommendations in response to inquiries with real-time or reactive computing techniques in one or more embodiments. More specifically, these examples illustrate some examples of the functionalities and capabilities of the chatterbot features described herein.

Figure 10F:
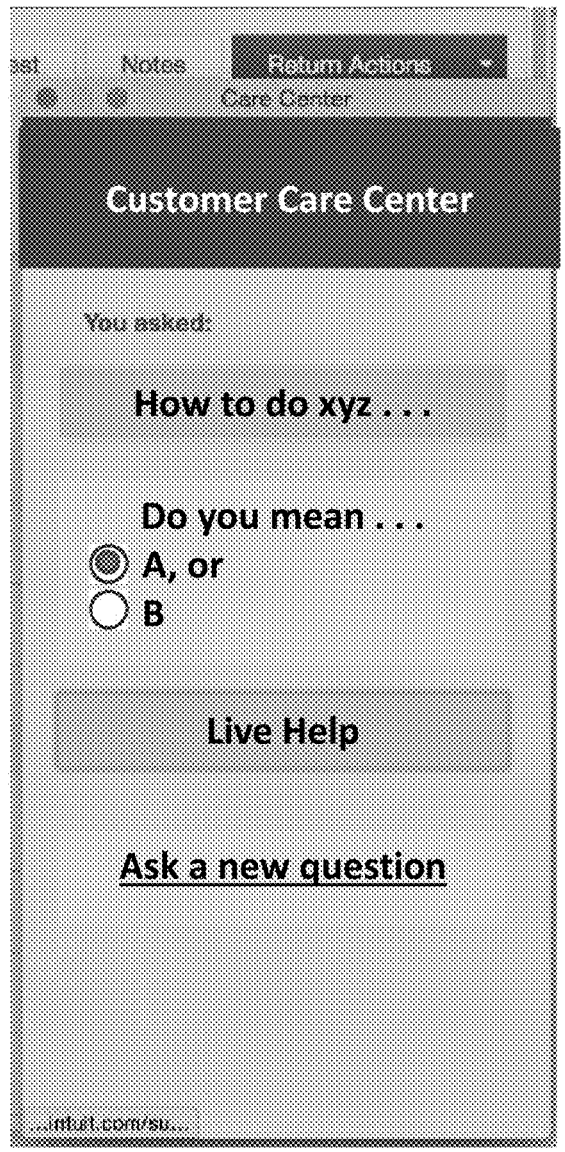

FIG. 10F illustrates an example pop-up window 1002F showing that a user asked "how to do xyz . . . ". The chatterbot module receives and forwards this user inquiry to a real-time data model that attempts to classify this user inquiry to determine one or more actions in response to this user inquiry. In this example, the data model determines that no actions may be deterministically determined with the user inquiry alone and thus identifies a first link "A" and a second link "B" that may be further used to aid the deterministic classification of the user's inquiry.

In this example, the chatterbot module randomly picks a question template from a plurality of question templates and asks the user "Do you mean . . . A, or B" and provides two radio buttons for the user to click to indicate the user's response to the chatterbot question. This pop-up window also includes a button "Live Help" that links the user to a human support personnel as well as a clickable like "Ask a new question" for the user to submit a different inquiry.

Figure 10G:
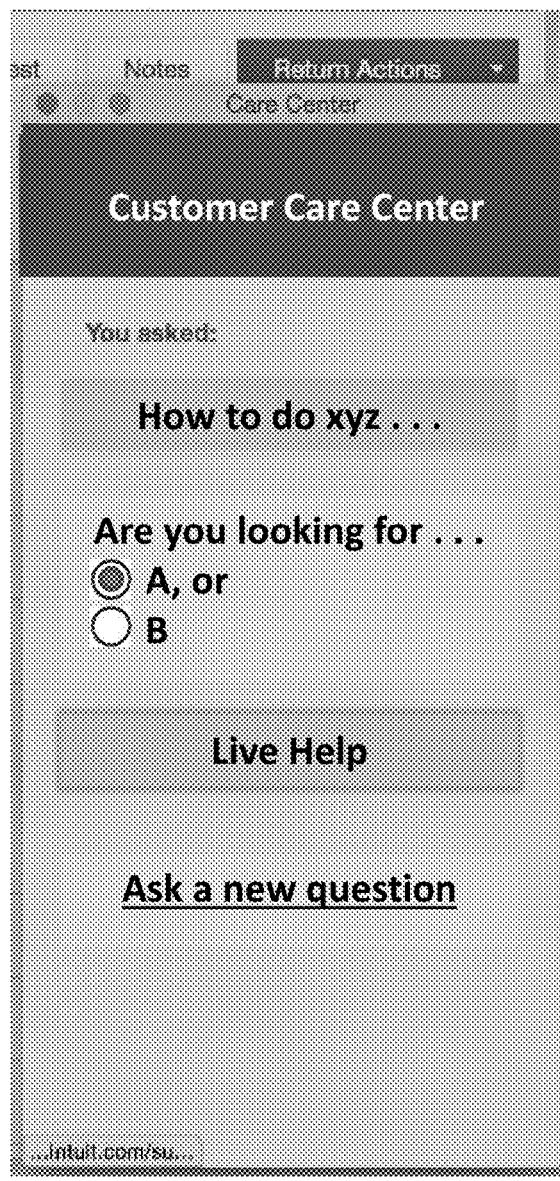

FIG. 10G illustrates the random selection of a question template from a plurality of question templates. In this pop-up window 1002G, the chatterbot module randomly selects a different question template to ask the same question to the user. Unlike the question "Do you mean . . . A, or B" in FIG. 10F, the chatterbot randomly selects the question template for the same question and now asks "Are you looking for A, or B" to the user. By randomly selecting a question template from a plurality of question templates, the chatterbot may better mimic the real human actions or interactions, instead of using the same robotic question repeatedly.

Figure 10H:
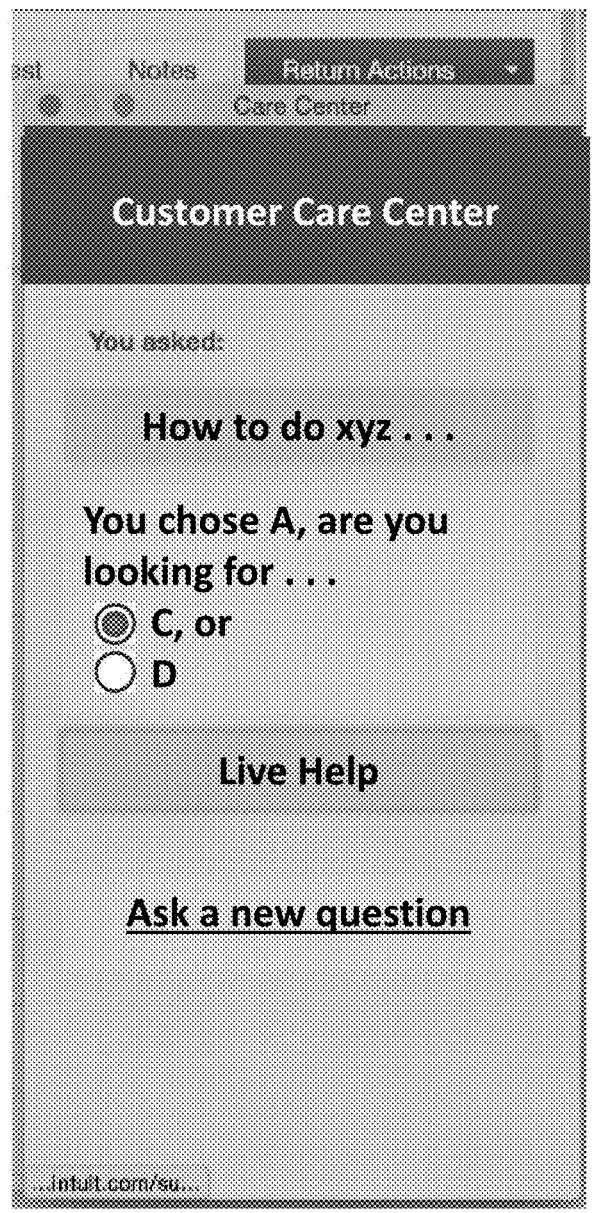

FIG. 10H illustrates the example where the user responded to the chatterbot question in FIG. 10F or 10G by choosing or verbally saying "A". Nonetheless, the data model still cannot deterministically classify the user inquiry into one or more pre-recognized classes. The data model may then identify additional links "C" and D", either of which may lead to deterministic classification results. The data model then invokes the chatterbot module again. The chatterbot module randomly selects a response or question template from a plurality of response or question templates. The chatterbot module then responds to the user with these two links by communicating with the user "You chose A, are you looking for . . . C or D" in the pop-up window 1002H.

Figure 10I:
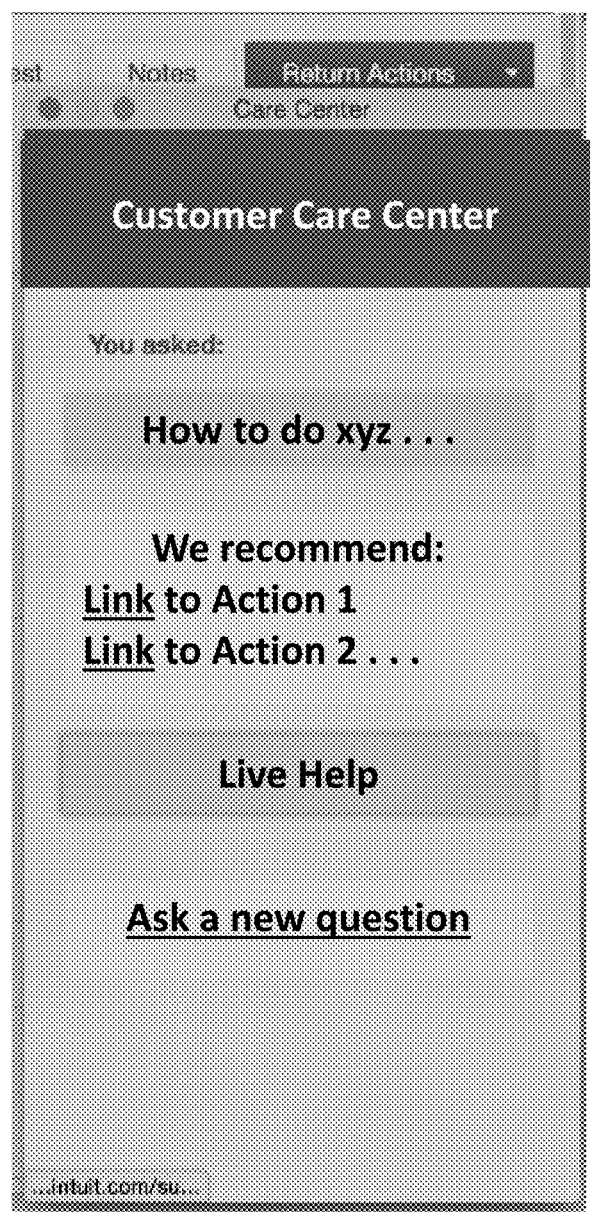

FIG. 10I illustrates the example where the user responded to the chatterbot module question in FIG. 10H. Based on this additional input from the user, the data model can now deterministically classify the user inquiry "how to do xyz . . . " into one or more pre-recognized classes. The data model may the forward the classification result to a recommendation module that identifies two actions (Action 1 and Action 2) for this user inquiry based on the classification result. The recommendation module may then invoke the chatterbot module again to present these two recommended actions in two clickable links as shown in the pop-up window 1002I.

System Architecture Overview

Figure 11:
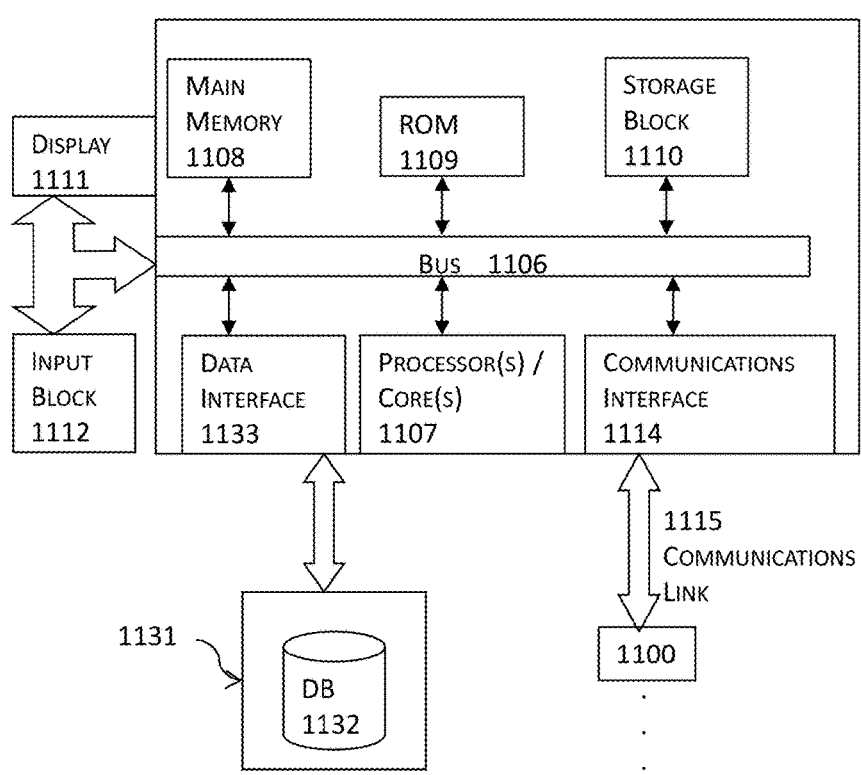
FIG. 11 illustrates an example of a computing system that is configured with specific modules to perform various techniques described herein in one or more embodiments.

FIG. 11 illustrates a block diagram of an illustrative computing system 1100 suitable for implementing various processes as described in the preceding paragraphs with reference to various figures. The illustrative computing system 1100 may include an Internet-based computing platform providing a shared pool of configurable computer processing resources (e.g., computer networks, servers, storage, applications, services, etc.) and data to other computers and devices in a ubiquitous, on-demand basis via the Internet.

For example, the computing system 1100 may include or may be a part of a cloud computing platform in some embodiments. Computer system 1100 includes a bus 1106 or other communication module for communicating information, which interconnects subsystems and devices, such as processor 1107, system memory 1108 (e.g., RAM), static storage device 1109 (e.g., ROM), disk drive 1110 (e.g., magnetic or optical), communication interface 1114 (e.g., modem or Ethernet card), display 1111 (e.g., CRT or LCD), input device 1112 (e.g., keyboard), and cursor control (not shown).

According to one embodiment, computing system 1100 performs specific operations by one or more processor or processor cores 1107 executing one or more sequences of one or more instructions contained in system memory 1108. Such instructions may be read into system memory 1108 from another computer readable/usable storage medium, such as static storage device 1109 or disk drive 1110. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1107, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A modules described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a module described herein may be implemented as an application-specific integrated circuit (ASIC) in some embodiments.

In these embodiments, a module may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of module. A module described herein or an equivalent thereof may perform its respective functions alone or in conjunction with one or more other modules. A module described herein or an equivalent thereof may thus invoke one or more other modules by, for example, issuing one or more commands or function calls. The invocation of one or more other modules may be fully automated or may involve one or more user inputs.

The term "computer readable storage medium" or "computer usable storage medium" as used herein refers to any non-transitory medium that participates in providing instructions to processor 1107 for execution. Such a medium may take many forms, including but not limited to, non-volatile media and volatile media. Non-volatile media includes, for example, optical or magnetic disks, such as disk drive 1110. Volatile media includes dynamic memory, such as system memory 1108. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1100. According to other embodiments of the invention, two or more computer systems 1100 coupled by communication link 1115 (e.g., LAN, PTSN, or wireless network) may perform the sequence of instructions required to practice the invention in coordination with one another.

Computer system 1100 may transmit and receive messages, data, and instructions, including program, i.e., application code, through communication link 1115 and communication interface 1114. Received program code may be executed by processor 1107 as it is received, and/or stored in disk drive 1110, or other non-volatile storage for later execution. In an embodiment, the computing system 1100 operates in conjunction with a data storage system 1131, e.g., a data storage system 1131 that includes a database 1132 that is readily accessible by the computing system 1100. The computing system 1100 communicates with the data storage system 1131 through a data interface 1133. A data interface 1133, which is coupled with the bus 1106, transmits and receives electrical, electromagnetic or optical signals that include data streams representing various types of signal information, e.g., instructions, messages and data. In embodiments of the invention, the functions of the data interface 1133 may be performed by the communication interface 1114.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

I claim:

1. A computer implemented method for capturing and classification of digital data and providing recommendations using real-time computing techniques or reactive computing techniques, comprising:
   identifying a plurality of agent computing or communication devices in communication with a server computer;
   identifying a plurality of communications between the plurality of agent computing or communication devices and a plurality of user communication or computing devices of a plurality of users into real-time service data;
   determining, at a recommendation module stored at least partially in memory and functioning in tandem with at least one microprocessor of a computing system, one or more actions for a communication of the plurality of communications based in part or in whole upon at least one communication class into which the communication is classified; and
   performing one or more post-classification tasks based in part or in whole upon the one or more actions determined at the recommendation module.

2. The computer implemented method of claim 1, further comprising:
   determining types and capabilities of a plurality of user agents on a plurality of user computing or communication devices.

3. The computer implemented method of claim 2, further comprising:
   identify a plurality of agent computing or communication devices in communication with the server;
   identify an agent computing or communication device from the plurality of agent computing or communication devices;

identifying one or more first sessions between the agent computing or communication device and the server; and identifying one or more second sessions between the agent computing or communication device and one or more user computing or communication devices.

4. The computer implemented method of claim 3, further comprising:

capturing, at a listening module stored at least partially in the memory and functioning in tandem with the at least one microprocessor, communications between the agent computing or communication device and the one or more user computing or communication devices;

capturing, at the listening module, information about an activity initiated from the agent computing or communication device and directed toward the server; and storing the communications or the information about the activity as the real-time service data.

5. The computer implemented method of claim 4, further comprising:

performing data reduction filtering on the real-time service data to transform the real-time service data into reduced real-time service data.

6. The computer implemented method of claim 5, further comprising:

performing one or more analytics tasks that comprise a web analytics task, a software analytics task, a digital analytics task, or a data mining task on the reduced real-time service data or the filtered real-time service data; and generating one or more reports based in part or in whole upon the reduced real-time service data or the filtered real-time service data.

7. The computer implemented method of claim 5, further comprising:

performing collaborative filtering on the real-time service data or the reduced real-time service data to transform the real-time service data or the reduced real-time service data into filtered real-time service data.

8. The computer implemented method of claim 7, further comprising:

classifying the plurality of users into a plurality of user classes;

identify respective sets of information or respective sets of actions for the plurality of user classes;

determining or identifying one or more user classes for a user of the plurality of users and one or more communications involving the user; and predicting or inferring, at a recommendation module stored at least partially in memory and functioning in tandem with the at least one microprocessor, one or more actions for the user based in part or in whole upon the one or more classes of the user, the respective sets of information, or the respective sets of actions for the plurality of user classes.

9. The computer implemented method of claim 8, further comprising:

identifying one or more recommendations provided by an agent computing or communication device to the user; and determining deviation between the one or more actions and the one or more recommendations.

10. The computer implemented method of claim 9, further comprising at least one of:

presenting the deviation in a user interface of the agent computing or communication device in a communication channel transparent to the user; or intervening a communication session between the user computing or communication device and the agent computing or communication devices with information about the deviation.

11. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for capturing and classification of digital data and providing recommendations using real-time computing techniques or reactive computing techniques, the set of acts comprising:

identifying a plurality of agent computing or communication devices in communication with a server computer;

identifying a plurality of communications between the plurality of agent computing or communication devices and a plurality of user communication or computing devices of a plurality of users into real-time service data;

determining, at a recommendation module stored at least partially in memory and functioning in tandem with at least one microprocessor of a computing system, one or more actions for a communication of the plurality of communications based in part or in whole upon at least one communication class into which the communication is classified; and performing one or more post-classification tasks based in part or in whole upon the one or more actions determined at the recommendation module.

12. The article of manufacture of claim 11, the set of acts further comprising:

determining types and capabilities of a plurality of user agents on a plurality of user computing or communication devices;

identifying a plurality of agent computing or communication devices in communication with the server;

identifying an agent computing or communication device from the plurality of agent computing or communication devices;

identifying one or more first sessions between the agent computing or communication device and the server; and identifying one or more second sessions between the agent computing or communication device and one or more user computing or communication devices.

13. The article of manufacture of claim 12, the set of acts further comprising:

capturing, at a listening module stored at least partially in the memory and functioning in tandem with the at least one microprocessor, communications between the agent computing or communication device and the one or more user computing or communication devices;

capturing, at the listening module, information about an activity initiated from the agent computing or communication device and directed toward the server;

storing the communications or the information about the activity as the real-time service data;

performing data reduction filtering on the real-time service data to transform the real-time service data into reduced real-time service data.

14. The article of manufacture of claim 13, the set of acts further comprising:

performing collaborative filtering on the real-time service data or the reduced real-time service data to transform the real-time service data or the reduced real-time service data into filtered real-time service data;
classifying the plurality of users into a plurality of user classes;
identifying respective sets of information or respective sets of actions for the plurality of user classes;
determining or identifying one or more user classes for a user of the plurality of users and one or more communications involving the user; and
predicting or inferring, at a recommendation module stored at least partially in memory and functioning in tandem with the at least one microprocessor, one or more actions for the user based in part or in whole upon the one or more classes of the user, the respective sets of information, or the respective sets of actions for the plurality of user classes.

15. The article of manufacture of claim 14, the set of acts further comprising:
identifying one or more recommendations provided by an agent computing or communication device to the user;
determining deviation between the one or more actions and the one or more recommendations; and
at least one of:
presenting the deviation in a user interface of the agent computing or communication device in a communication channel transparent to the user; or
intervening a communication session between the user computing or communication device and the agent computing or communication devices with information about the deviation.

16. A system for capturing and classification of digital data and providing recommendations using real-time computing techniques or reactive computing techniques, comprising:
a plurality of modules, at least one of which is stored at least partially in memory and comprises at least one microprocessor including one or more processor cores executing one or more threads;
a non-transitory computer accessible storage medium storing thereupon program code that includes a sequence of instructions that, when executed by the at least one micro-processor or processor core, causes the at least one micro-processor or processor core at least to:
identify a plurality of agent computing or communication devices in communication with a server computer;
identify a plurality of communications between the plurality of agent computing or communication devices and a plurality of user communication or computing devices of a plurality of users into real-time service data;
determine, at a recommendation module stored at least partially in memory and functioning in tandem with at least one microprocessor of a computing system, one or more actions for a communication of the plurality of communications based in part or in whole upon at least one communication class into which the communication is classified; and
perform one or more post-classification tasks based in part or in whole upon the one or more actions determined at the recommendation module.

17. The system of claim 16, wherein the program code includes further instructions that, when executed by the at least one micro-processor or processor core, cause the at least one processor or processor core at least further to:
determine types and capabilities of a plurality of user agents on a plurality of user computing or communication devices;
identify a plurality of agent computing or communication devices in communication with the server;
identify an agent computing or communication device from the plurality of agent computing or communication devices;
identify one or more first sessions between the agent computing or communication device and the server; and
identify one or more second sessions between the agent computing or communication device and one or more user computing or communication devices.

18. The system of claim 17, wherein the program code includes further instructions that, when executed by the at least one micro-processor or processor core, cause the at least one processor or processor core at least further to:
capture, at a listening module stored at least partially in the memory and functioning in tandem with the at least one microprocessor, communications between the agent computing or communication device and the one or more user computing or communication devices;
capture, at the listening module, information about an activity initiated from the agent computing or communication device and directed toward the server;
store the communications or the information about the activity as the real-time service data;
perform data reduction filtering on the real-time service data to transform the real-time service data into reduced real-time service data.

19. The system of claim 18, wherein the program code includes further instructions that, when executed by the at least one micro-processor or processor core, cause the at least one processor or processor core at least further to:
perform collaborative filtering on the real-time service data or the reduced real-time service data to transform the real-time service data or the reduced real-time service data into filtered real-time service data;
classify the plurality of users into a plurality of user classes;
identify respective sets of information or respective sets of actions for the plurality of user classes;
determine or identify one or more user classes for a user of the plurality of users and one or more communications involving the user; and
predict or infer, at a recommendation module stored at least partially in memory and functioning in tandem with the at least one microprocessor, one or more actions for the user based in part or in whole upon the one or more classes of the user, the respective sets of information, or the respective sets of actions for the plurality of user classes.

20. The system of claim 19, wherein the program code includes further instructions that, when executed by the at least one micro-processor or processor core, cause the at least one processor or processor core at least further to:
identify one or more recommendations provided by an agent computing or communication device to the user;
determine deviation between the one or more actions and the one or more recommendations; and
at least one of:
present the deviation in a user interface of the agent computing or communication device in a communication channel transparent to the user; or intervene a communication session between the user computing or communication device and the agent computing or communication devices with information about the deviation.

* * * * *